(12) United States Patent
Shattil

(10) Patent No.: US 12,513,012 B1
(45) Date of Patent: Dec. 30, 2025

(54) LINEAR NETWORK CODING FOR BLOCKCHAINS

(71) Applicant: Tybalt, LLC, Boulder, CO (US)

(72) Inventor: Steve Shattil, Cheyenne, WY (US)

(73) Assignee: Tybalt, LLC, Boulder, CO (US)

( * ) Notice: Subject to any disclaimer, the term of this patent is extended or adjusted under 35 U.S.C. 154(b) by 305 days.

(21) Appl. No.: 18/090,430

(22) Filed: Dec. 28, 2022

Related U.S. Application Data

(60) Provisional application No. 63/295,326, filed on Dec. 30, 2021, provisional application No. 63/295,334, filed on Dec. 30, 2021.

(51) Int. Cl.
*H04L 9/00* (2022.01)
*H04L 9/32* (2006.01)

(52) U.S. Cl.
CPC .............. *H04L 9/50* (2022.05); *H04L 9/3218* (2013.01)

(58) Field of Classification Search
CPC ....................................................... H04L 9/50
See application file for complete search history.

(56) References Cited

U.S. PATENT DOCUMENTS

| | | | |
|---|---|---|---|
| 6,331,837 B1 | 12/2001 | Shattil | |
| 7,076,168 B1 | 7/2006 | Shattil | |
| 7,430,257 B1 | 9/2008 | Shattil | |
| 7,529,198 B2 | 5/2009 | Jain et al. | |
| 7,743,253 B2 | 6/2010 | Lauter et al. | |
| 7,787,514 B2 | 8/2010 | Shattil | |
| 7,965,761 B2 | 6/2011 | Shattil | |
| 8,068,426 B2 | 11/2011 | Sundararajan et al. | |
| 8,098,751 B2 | 1/2012 | Shattil | |
| 8,451,756 B2 | 5/2013 | Lucani et al. | |
| 8,516,344 B2 | 8/2013 | Kim | |
| 8,553,784 B2 | 10/2013 | Huang et al. | |
| 8,670,390 B2 | 3/2014 | Shattil | |
| 8,711,978 B2 | 4/2014 | Kim | |
| 8,780,693 B2 | 7/2014 | Kim et al. | |
| 8,929,550 B2 | 1/2015 | Shattil | |
| 8,942,082 B2 | 1/2015 | Shattil | |
| 8,953,612 B2 | 2/2015 | Liu et al. | |
| 8,958,309 B2 | 2/2015 | Kim | |
| 9,088,351 B2 | 7/2015 | Liu et al. | |
| 9,112,916 B2 | 8/2015 | Summerson et al. | |
| 9,165,013 B2 | 10/2015 | Medard et al. | |
| 9,185,529 B2 | 11/2015 | Medard et al. | |
| 9,191,371 B2 | 11/2015 | Chang et al. | |

(Continued)

OTHER PUBLICATIONS

US 10,673,758 B2, 06/2020, Shattil (withdrawn)

(Continued)

*Primary Examiner* — Khang Do
(74) *Attorney, Agent, or Firm* — Steven J Shattil

(57) ABSTRACT

In a blockchain, transacting a record comprises performing linear network coding on the record or on a data file corresponding to the record, to produce a plurality of coded data parts; and storing at least one of the plurality of coded data parts on the blockchain or storing a proof of knowledge on the blockchain, the proof of knowledge derived from the coded data parts. Linear network coding coefficients might be derived from cryptographic hashes of the plurality of coded data parts. An all-or-nothing transform can use the cryptographic hashes to provide the proof of knowledge.

20 Claims, 21 Drawing Sheets

(56) References Cited

U.S. PATENT DOCUMENTS

| | | | |
|---|---|---|---|
| 9,225,471 | B2 | 12/2015 | Shattil |
| 9,270,421 | B2 | 2/2016 | Shattil |
| 9,325,805 | B2 | 4/2016 | Shattil |
| 9,402,209 | B1 | 7/2016 | Vivanco et al. |
| 9,473,226 | B2 | 10/2016 | Shattil |
| 9,485,063 | B2 | 11/2016 | Shattil |
| 9,537,759 | B2 | 1/2017 | Calmon et al. |
| 9,602,246 | B2 | 3/2017 | Mendes et al. |
| 9,628,231 | B2 | 4/2017 | Shattil |
| 9,647,800 | B2 | 5/2017 | Lucani et al. |
| 9,673,920 | B2 | 6/2017 | Shattil |
| 9,722,776 | B2 | 8/2017 | Nguyen et al. |
| 9,749,388 | B2 | 8/2017 | Mahdaviani et al. |
| 9,768,842 | B2 | 9/2017 | Shattil |
| 9,787,614 | B2 | 10/2017 | Heide et al. |
| 9,819,449 | B2 | 11/2017 | Shattil |
| 9,860,022 | B2 | 1/2018 | Krigslund et al. |
| 9,941,996 | B2 | 4/2018 | Yang et al. |
| 9,954,859 | B2 | 4/2018 | Niset et al. |
| 10,014,882 | B2 | 7/2018 | Sen et al. |
| 10,034,200 | B2 | 7/2018 | Narasimha et al. |
| 10,069,746 | B2 | 9/2018 | Anderson et al. |
| 10,237,782 | B2 | 3/2019 | Yang et al. |
| 10,355,720 | B2 | 7/2019 | Shattil |
| 10,389,568 | B1 | 8/2019 | Shattil |
| 10,425,135 | B2 | 9/2019 | Shattil |
| 10,452,621 | B2 | 10/2019 | Medard et al. |
| 10,484,171 | B2 | 11/2019 | Hu et al. |
| 10,516,617 | B2 | 12/2019 | Anderson et al. |
| 10,530,574 | B2 | 1/2020 | Shi et al. |
| 10,958,530 | B1* | 3/2021 | Bowers ............... G06F 7/72 |
| 11,025,312 | B2 | 6/2021 | Shattil |
| 11,075,786 | B1 | 7/2021 | Shattil |
| 11,108,705 | B2 | 8/2021 | Fouli et al. |
| 11,223,508 | B1 | 1/2022 | Shattil |
| 11,297,657 | B2 | 4/2022 | Lahouti et al. |
| 11,893,626 | B2* | 2/2024 | Youb ............... G06F 16/1805 |
| 12,069,180 | B1* | 8/2024 | Racz ............... G06F 16/2255 |
| 2005/0152391 | A1 | 7/2005 | Effros et al. |
| 2006/0224760 | A1* | 10/2006 | Yu ............... H04L 67/108 709/231 |
| 2010/0260189 | A1 | 10/2010 | Ansari et al. |
| 2011/0051729 | A1 | 3/2011 | Wei et al. |
| 2011/0142141 | A1 | 6/2011 | Huang et al. |
| 2011/0243324 | A1* | 10/2011 | Lima ............... H04L 9/0819 380/212 |
| 2012/0096124 | A1 | 4/2012 | Medard et al. |
| 2012/0236763 | A1 | 9/2012 | Lucani et al. |
| 2013/0073850 | A1* | 3/2013 | Zaverucha ............. H04L 9/0869 713/168 |
| 2013/0230058 | A1 | 9/2013 | Summerson et al. |
| 2013/0232397 | A1 | 9/2013 | Summerson et al. |
| 2014/0016469 | A1 | 1/2014 | Ho et al. |
| 2014/0036657 | A1 | 2/2014 | Suter et al. |
| 2014/0269485 | A1 | 9/2014 | Medard et al. |
| 2014/0269503 | A1 | 9/2014 | Medard et al. |
| 2014/0269505 | A1 | 9/2014 | Medard et al. |
| 2014/0328342 | A1 | 11/2014 | Berman et al. |
| 2015/0146615 | A1 | 5/2015 | Yu et al. |
| 2015/0358118 | A1 | 12/2015 | Krigslund et al. |
| 2016/0134546 | A1 | 5/2016 | Anderson et al. |
| 2016/0154970 | A1 | 6/2016 | Calmon et al. |
| 2016/0182088 | A1 | 6/2016 | Sipos et al. |
| 2016/0191402 | A1 | 6/2016 | Anderson et al. |
| 2016/0359770 | A1 | 12/2016 | Heide et al. |
| 2017/0118674 | A1 | 4/2017 | Narasimha et al. |
| 2017/0127463 | A1 | 5/2017 | Narasimha et al. |
| 2017/0195914 | A1 | 7/2017 | Yang et al. |
| 2017/0317986 | A1 | 11/2017 | Hu et al. |
| 2017/0364450 | A1* | 12/2017 | Struttmann ............ H04L 9/3297 |
| 2017/0364698 | A1* | 12/2017 | Goldfarb ............... H04L 9/3239 |
| 2017/0364700 | A1* | 12/2017 | Goldfarb ............... H04L 9/3247 |
| 2017/0364701 | A1* | 12/2017 | Struttmann ......... G06F 21/6218 |
| 2018/0046815 | A9 | 2/2018 | Calmon et al. |
| 2018/0121286 | A1* | 5/2018 | Sipos ............... H03M 13/373 |
| 2018/0205552 | A1* | 7/2018 | Struttmann ........... G06F 21/602 |
| 2018/0212764 | A1* | 7/2018 | Shi ...................... H04N 21/6377 |
| 2019/0288850 | A1* | 9/2019 | Beecham ............ G06F 21/6209 |
| 2019/0297649 | A1 | 9/2019 | Lahouti et al. |
| 2019/0319797 | A1* | 10/2019 | Suresh ................. H04L 9/0869 |
| 2020/0177311 | A1* | 6/2020 | Ho ....................... H03M 13/05 |
| 2020/0213106 | A1* | 7/2020 | Kang .................. H04L 9/0643 |
| 2020/0351220 | A1 | 11/2020 | Fouli et al. |
| 2020/0382625 | A1 | 12/2020 | Medard et al. |
| 2021/0058989 | A1* | 2/2021 | Simsek ................. H04L 47/283 |
| 2021/0105342 | A1 | 4/2021 | Ballif et al. |
| 2021/0209077 | A1* | 7/2021 | Snellman ............. G06F 16/219 |
| 2021/0258375 | A1* | 8/2021 | Cai ....................... H04L 63/123 |
| 2022/0069987 | A1 | 3/2022 | Medard et al. |
| 2023/0108366 | A1* | 4/2023 | Tang .................. G06Q 20/3829 705/66 |
| 2023/0179435 | A1* | 6/2023 | Heinecke .................. H04L 9/50 380/28 |
| 2023/0188355 | A1* | 6/2023 | Collins ................. H04L 9/3297 713/168 |
| 2023/0419327 | A1* | 12/2023 | Wu ..................... G06Q 20/4016 |
| 2024/0129120 | A1* | 4/2024 | Carr ....................... G06F 21/602 |

OTHER PUBLICATIONS

S. Dasgupta, et al.; "Design of a polynomial ring based symmetric homomorphic encryption scheme"; Perspectives in Science (2016) 8, 692-695.

D. Charles, et al.; "Signatures for Network Coding"; International Journal of Information and Coding Theory 2006(1): 25; Mar. 2006.

N. Cai, et al.; "Secure Network Code for Adaptive and Active Attacks with No-Randomness in Intermediate Nodes"; IEEE Transactions on Information Theory ( vol. 66, Issue: 3, Mar. 2020).

X. Chu, et al.; "Practical Random Linear Network Coding on GPUs"; International Conference on Research in Networking, 2009, pp. 573-585.

M.N. Krohn, et al.; "On-the-Fly Verification of Rateless Erasure Codes for Efficient Content Distribution"; IEEE Symposium on Security and Privacy, 2004. Proceedings. May 2004.

M. Adeli, et al.; "Secure Network Coding with Minimum Overhead Based on Hash Functions"; IEEE Comm Letters, vol. 13, No. 12. Dec. 2009.

A. Kirsch, et al.; "Hash-Based Techniques for High-Speed Packet Processing"; Algorithms for Next Generation Networks, 2010; 181-218.

R. Dougherty, et al.; "Insufficiency of Linear Coding in Network Information Flow"; IEEE Transactions on Information Theory, vol. 51, No. 8, Aug. 2005.

T. Ho and D.S. Lun; "Network Coding: An Introduction"; Cambridge University Press; 1st edition (Apr. 14, 2008).

S-Y.R. Li, et al.; "Linear Network Coding"; IEEE Transactions on Information Theory, vol. 49, No. 2, Feb. 2003.

Y. Liu and Y. Morgan; "Security against Passive Attacks on Network Coding System—A Survey"; Computer Networks (2018), doi: 10.1016/j.comnet.2018.03.013.

C. Gkantsidis, et al.; "Network Coding for Large Scale Content Distribution"; Proceedings IEEE 24th Annual Joint Conference of the IEEE Computer and Communications Societies. Mar. 2005.

C. Fragouli and E. Soljanin; "Network Coding Applications"; Foundations and Trends in Networking, vol. 2, No. 2 (2007) 135-269.

J. Katz, B. Waters; "Compact Signatures for Network Coding"; International Association for Cryptologic Research http://eprint.iacr.org/2008/316, Oct. 2009.

E. Yilmaz, R. Knopp; "Hash-and-Forward Relaying for Two-Way Relay Channel"; 2011 IEEE International Symposium on Information Theory Proceedings; Jul. 31, 2011-Aug. 5, 2011.

Y. Liu and Y. Morgan; "Security Analysis of Subspace Network Coding"; Journal of Information Security, 2018, 9, 85-94. Jan. 23, 2018.

S. Katti, et al.; "XORs in The Air: Practical Wireless Network Coding"; IEEE/ACM Transactions on Networking Year: 2008 | vol. 16, Issue: 3.

(56) References Cited

OTHER PUBLICATIONS

V. Cerf, et al.; "Delay-Tolerant Network Architecture: The Evolving Interplanetary Internet"; IPN Research Group, <draft-irtf-ipnrg-arch-01.txt> Aug. 2002.

P.A. Chou, et al.; "Practical Network Coding"; Allerton Conference on Communication, Control, and Computing | Oct. 2003.

A. Gabizon, et al., "PlonK: Permutations over Lagrange-bases for Oecumenical Noninteractive arguments of Knowledge" Cryptology ePrint Archive, Paper 2019/953; year = {2019}.

T. Ho, et al., "On the utility of network coding in dynamic environments," in Proc. Int. Workshop on Wireless Ad-Hoc Networks, Oulu, Finland, May/Jun. 2004, pp. 196-200.

T. Ho, et al., "A Random Linear Network Coding Approach to Multicast", IEEE Transactions on Information Theory, vol. 52, No. 10, Oct. 2006.

A. Tavory, et al., "Bounds on linear codes for network multicast," Electronic Colloquium on Computational Complexity, vol. 10, No. 033, 2003.

Q. Dong, et al.; "Practical network coding in wireless networks"; Proceedings of the 13th Annual International Conference on Mobile Computing and Networking, MOBICOM 2007, Montréal, Quebec, Canada, Sep. 9-14, 2007.

ETSI TS 136.211 V13.0.0; LTE; Evolved Universal Terrestrial Radio Access (E-UTRA); Jan. 2016.

ETSI TS 138 211 V15.3.0; 5G NR, Physical channels and modulation (Oct. 2018).

3GPP TR 22.803 V12.2.0; 3rd Generation Partnership Project; Technical Specification Group Services and System Aspects; Feasibility study for Proximity Services (ProSe) (Release 12) (Jun. 2013).

\* cited by examiner

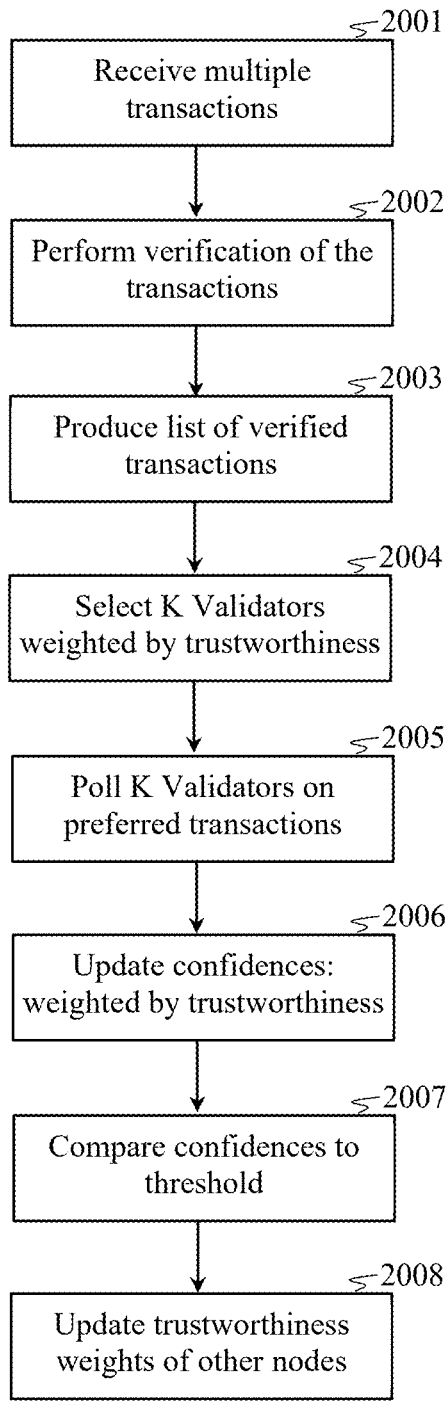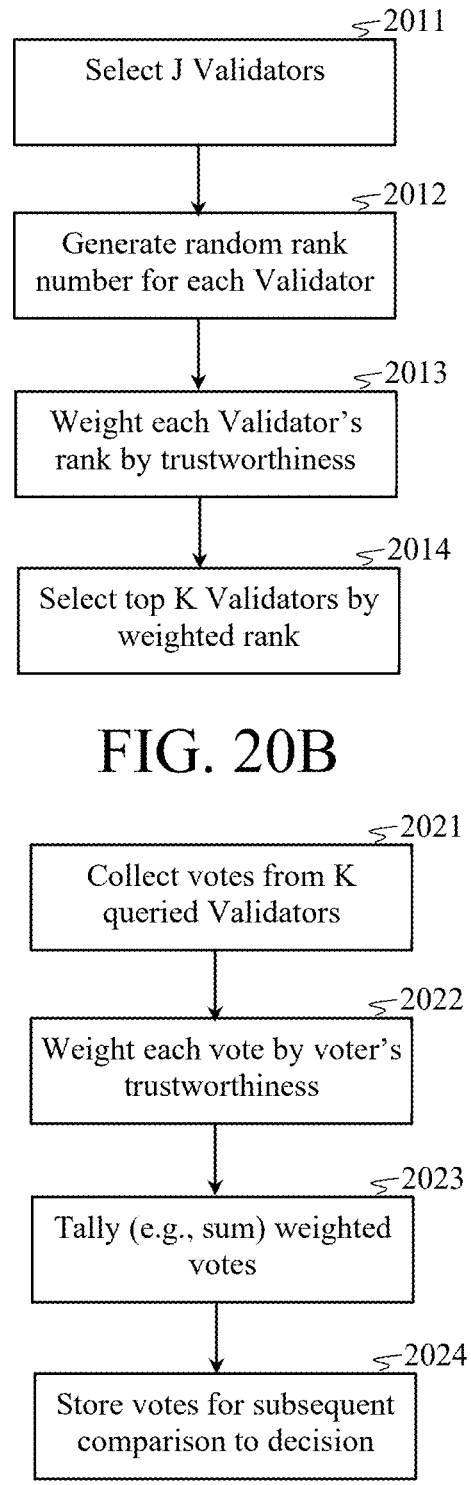
FIG. 20A
FIG. 20B
FIG. 20C

LINEAR NETWORK CODING FOR BLOCKCHAINS

CROSS REFERENCE TO RELATED APPLICATIONS

This application claims priority to Provisional Appl. No. 63/295,326, filed Dec. 30, 2021, and this application claims priority to Provisional Appl. No. 63/295,334, filed Dec. 30, 2021; all of which are hereby incorporated by reference in their entireties and all of which this application claims priority under at least 35 U.S.C. 120 and/or any other applicable provision in Title 35 of the United States Code.

INTRODUCTION

I. Field

Aspects of the present disclosure relate to compressing data, bundling data, encrypting data, decrypting data, encoding data, decoding data, proving knowledge of certain information, verifying knowledge of certain information, consensus mechanisms for verifying information, ensuring data integrity, ensuring data security, ensuring anonymity, and managing the aforementioned aspects in a decentralized network. Disclosed aspects can relate to linear network coding, transmitting and/or receiving data over data networks, storing data in memory, accessing stored data from memory, managing transactions in a decentralized network, rollups, cryptographic proofs, and mobile ad-hoc blockchains.

II. Background

Blockchains allow a network of users to make a digital ledger of data and share the data among the other users in the network. Unlike previous database structures, the blockchain database is maintained by a multitude of independent nodes spread across a large distributed network. When a transaction is recorded into the blockchain database, it is very difficult, if not impossible, to change or remove that data from the database, since the data is stored in more than one node in the distributed network. Therefore, data is added into the blockchain database by multiple users and changing the recorded data would require each of these users (or a majority of the users) to agree to the change. This distribution of control to add, edit, and remove data from the blockchain database creates trust amongst users in the network, especially when users are not familiar with one another.

When you buy a non-fungible token. i.e., NFT (e.g., an ERC721 token), the token itself is stored on the blockchain, but because on-chain storage of large files is very expensive, the art or media that the token correlates to is usually stored off-chain. While the token portion of NFTs is fundamentally decentralized, the storage method for the metadata and media that an NFT hashes to is determined by the platform or artist who mints it. So depending on the chosen storage method, the media aspect of many NFTs may hinge entirely on companies maintaining centralized servers. This is a problem for collectors who want to be sure that they still own their NFT even if the centralized company that minted it stops operating.

Since HTTP URLs are location-based (i.e., they link to a specific site where the owner controls the data), they are centralized by nature. NFTs that rely on HTTP URL metadata files can never be truly "ownable" in a complete form, as they will always rely on the issuing organization continuing to operate their server. Using the example of Beeple's "Crossroad" minted on Nifty Gateway, the token points to an HTTP URL hosted on Nifty's servers that contains Crossroad's metadata. The metadata text points further to another HTTP URL that contains Crossroad's actual visual media, which is hosted on a cloud-based media service, but still served by Nifty's servers. This means that if Nifty were to ever go out of business and shut off its servers, the owner of Crossroad's NFT would really just be left with a token referring to a dead HTTP URL. Both the metadata and the image attached to the NFT are reliant on Nifty's continued operation.

IPFS, or InterPlanetary File System, is a protocol for sharing and storing data centered around a decentralized peer-to-peer network. This allows for content-addressable storage (CAS), which means that content itself can be hashed (cryptographically encoded) and referenced. Theoretically, media stored using CAS via a protocol like IPFS can be completely decentralized while still being verifiable and unalterable. But reality isn't that simple. Files hosted on IPFS must be hosted intentionally by a node in the IPFS network. Major, centralized NFT markets utilizing IPFS for storage currently act as the node intentionally hosting those files through their own private gateways. This means that even if an NFT references directly to media stored on IPFS, that media still might be reliant on a specific centralized marketplace's IPFS node staying online. Take, for instance, Beeple's "Everydays: The First 5000 Days," which sold for $69M through Christie's and was minted on MakersPlace. Here, the NFT references metadata reachable through a public IPFS gateway, meaning that it is likely safe regardless of whether or not MakersPlace stays in business. The image reference, however, is stored through MakersPlace's private gateway. So if MakersPlace ever stops hosting their IPFS node, there's a good chance that the "Everydays" NFT token will refer to confirmed metadata, albeit for an image that can no longer be reached.

A number of NFT projects, including Avastars and Art Blocks, have been designed to live entirely on-chain, meaning that storage of both the metadata and visual media aspects are completely decentralized. In short, NFT projects that live entirely on-chain allow for the purest form of digital "ownership" that NFTs have always promised.

NFT42, the team behind Avastars, launched an NFT minting platform, InfiNFT, capable of minting completely decentralized NFTs with on-chain metadata and image storage. Unfortunately, full on-chain media storage isn't cost-effective in many circumstances, especially for NFTs correlating to larger media files, so the majority of NFT projects need to find workarounds if they want to ensure the longevity of their products.

Some aspects of the disclosure include techniques to store and provide access to information an owner intends to keep private, but in a public ledger that can be seen and audited by authorized entities or individuals. Privacy laws require certain information to be kept private. Various aspects of the disclosure can ensure compliance with those privacy laws by provisioning the data in a format that is only accessible in compliant manners. As another example, there are businesses and governments that do not want their private information, knowledge, or trade secrets to become known.

NFTs on public blockchains are currently not suitable for use in the vast majority of business applications because the data is not confidential and/or the cost of storing the data on-chain is prohibitively expensive. The ability to keep data confidential, yet provide unrestricted access to authorized entities, would be especially useful in many other circumstances. Disclosed aspects can provide a small memory footprint for the on-chain data while ensuring that only authorized users can access the off-chain data, thus enabling blockchains to be a viable means for storing and facilitating access to confidential data.

In some aspects, data may be set to private (not viewable by users without access), public (viewable by everyone), or a hybrid of the two (some information is public and some information is private). There are circumstances that a public blockchain should be used and can be totally transparent for everyone to see. There are also some cases where confidentiality of at least some of the information is desirable.

Some aspects can use multiple layers of encryption so that portions of the data can be limited and accessible to certain users. In a hybrid mode of operation, some of the information can be public or transparent, while other information can be obfuscated or private.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Incorporation by reference, as used herein, is intended to be interpreted under 37 CFR 1.57 and MPEP 2163.07(b), and not ignored or disregarded, particularly during the examination of the application. Instead of repeating information contained in another document, this disclosure incorporates the content of the noted documents by reference to those documents. The information incorporated is as much a part of this disclosure as if the text was repeated in the disclosure, and should be treated as part of the text of the disclosure. If any terminology in this Specification is defined more broadly than its extrinsic definition or its definition in any document incorporated by reference herein, the terminology is to be interpreted according to its broader definition.

Any later-filed patent application(s) filed by Applicant which claims priority to this application is intended to have the benefit of priority claim under 35 U.S.C. 120 and 35 U.S.C. 112.

Applicant advises the reader that features disclosed in different parts of the instant disclosure can be connected or combined, particularly when the disclosure mentions that such feature can be connected or combined. For the avoidance of any doubt, Applicant intends that the reader be able to fit together teachings in the instant disclosure, as well as to fit together teachings from other sources that are incorporated by reference herein. Specifically, the Applicant intends that a person of ordinary skill in the art be defined as in KSR Int'l Co. v. Teleflex Inc., 550 U.S. 398 (2007): "[I]n many cases a person of ordinary skill will be able to fit the teachings of multiple patents together like pieces of a puzzle."

The reader is advised that descriptions of at least one of the claimed features may occur throughout the disclosure, possibly in multiple portions of the disclosure, and that at least one claimed feature may be explained in more than one sentence and in more than one paragraph. For the avoidance of any doubt, different features recited in a claim may find support in different parts of the disclosure or in more than one figure. The reader is specifically instructed to consider that multiple portions and/or paragraphs of the disclosure that describe any particular claimed feature should be regarded as constituting disclosure(s) of that feature. Furthermore, even if there are intervening sentences and/or paragraphs between descriptions of any claimed feature, it does not obviate nor disqualify the disclosure of the feature or its relationship to any other feature disclosed herein, unless explicitly stated otherwise.

Any of the claimed features may be shown in more than one Figure of the disclosure. The reader is specifically instructed to consider that since multiple Figures might disclose any particular claimed feature, and descriptions of those Figures might occur in different paragraphs of the disclosure, it does not obviate nor disqualify the disclosure of the feature as "hopping from one place to another in the effort to show a claimed feature" even though the corresponding "paragraphs, figures, and portions (are) scattered".

A claimed feature may be shown and/or described with respect to one or more other features with which it may interoperate, and/or with one or more other features which perform an inverse or complementary function of the claimed feature. The reader is specifically instructed to consider that any description of such one or more other features may include a description of the claimed feature, and such description of the one or more other features is intended to be understood in the inverse or complementary sense as it relates to the claimed feature, unless specifically stated otherwise. The reader is specifically advised that any description of a claimed feature as it pertains to any other feature does not obviate or disqualify the disclosure of the claimed feature on the basis of "hopping from one place to another in the effort to show a claimed feature" even though the corresponding "paragraphs, figures, and portions (are) scattered".

All publications disclosed herein are incorporated by reference in their entireties.

All patent applications and patents mentioned in this disclosure are hereby incorporated by reference in their entireties, including: U.S. Pat. Nos. 8,670,390, 9,225,471, 9,270,421, 9,325,805, 9,473,226, 8,929,550, 7,430,257, 6,331,837, 7,076,168, 7,965,761, 8,098,751, 7,787,514, 9,673,920, 9,628,231, 9,485,063, patent application Ser. Nos. 10/145,854, 14/789,949, Pat. Appl. No. 62/197,336, patent application Ser. Nos. 14/109,928, 14/944,399, 14/967,633, Pat. Appl. No. 60/286,850, patent application Ser. Nos. 14/709,936, 14/733,013, 14/789,949, 13/116,984, 15/218,609, 15/347,415, 15/988,898, 16/021,001, 16/307,039, 16/751,946, 16/712,954, 16/157,615; Pat. Appl. No. 62/510,987, Pat. Appl. No. 62/527,603, Pat. Appl. No. 62/686,083, Pat. Appl. No. 62/778,894, Pat. Appl. No. 62/853,051, Pat. Appl. No. 62/662,140, Pat. Appl. No. 62/536,955, Pat. Appl. No. 63/176,207, PCT/US20/45773, PCT/US20/14862, PCT/US20/34071, PCT/US19/37399, and PCT/US16/43852.

Some disclosed aspects can solve the following problems:
1. Security: Access to a single node can compromise a private blockchain.

With Linear Network Coding (LNC), each record is partitioned into multiple original packets, and the original packets can be randomly (or pseudo-randomly) combined to make each coded packet. Each coded packet is then stored on a different node. In order to access or authenticate a record, one must access a sufficient number of nodes to collect enough coded packets to decode the original packets.

If each data file is partitioned into 1000 coded packets, and only one packet is stored on each node, an intruder would need to compromise 1000 nodes. The coding can employ various types of all-or-nothing package transforms, so someone who compromises 999 nodes is no closer algorithmically to breaking the code than someone who compromised only a single node. In public blockchains, the records are available to anyone. The benefit of storing LNC records in a public blockchain and/or in a public file sharing network is that it 1) reduces storage requirements on each node; 2) minimizes communication bandwidth overhead; and 3) distributes network demand to avoid bottlenecks and reduce latency.

2. Transparency:

Blockchains are not suitable for most business applications because the data is not confidential. LNC encodes sensitive data and provides the owner of the data with the key to decode it. Thus, the confidentiality of the data is now in the owner's hands, and the owner can distribute the key as they please.

3. Scalability

LNC reduces the redundancy of conventional blockchains, so nodes only require a fraction of the storage capacity. Furthermore, coded records can be bundled into coded blocks, and coded blocks can be bundled into coded superblocks, and so on, each layer being a compressed version of its contents and having its own set of keys. This multi-layer encoding might take more processing power to decode, but old records are seldom accessed, so this can be configured to provide an equitable trade-off between storage overhead and processing overhead.

4. Energy Consumption

LNC can reduce energy consumption by relying on Layer-2 blockchains that employ proof-of-stake (which uses about 1% of the power of Proof of Work), and then combining Layer-2 records (e.g., into a rollup) to produce a proof or key that unambiguously verifies the individual records in the rollup. Reliance on off-chain storage for the bulk of data, and the reduced redundancy enabled by LNC can dramatically reduce energy consumption. While disclosed aspects might reduce storage requirements (and associated networking loads) in exchange for increased computational processing, this can be an equitable trade-off, as Moore's Law shows that processing capability doubles approximately every 18 months. Thus, technology advances are working toward better energy efficiency for computer processing activities.

In the disclosed aspects, a computer system may associate data one-to-one or many-to-one with an NFT. A computer system may associate NFT(s) one-to-one or many-to-one with the data. A smart contract may be based at least in part on a blockchain. NFTs may be generated (e.g., sequentially) from a sequential group of data. Linear network coded data may be generated (e.g., sequentially) from a sequential group of original data (such as a sequence or stream of data). An NFT may be immutable. A computer system may associate, using a blockchain, metadata for the off-chain data corresponding to an NFT, and may retrieve the metadata for the NFT in a decentralized manner. A computer system may securely transfer one or more NFTs or keys between authenticated users. A computer system may store public metadata and/or private metadata, either of which may be associated with the NFT. A computer system may return metadata to a user, upon verifying a proof of knowledge associated with the user. A computer system may allow updates to the public metadata and/or the private metadata in response to verifying a proof of knowledge associated with the user.

A key (e.g., a key corresponding to a user, a key corresponding to particular data, a key corresponding to an NFT minter, or a key corresponding to a particular NFT) or an initialization vector disclosed herein may comprise an international mobile equipment identity (IMEI), an eSIM identifier, an IP address, a MAC ID, a MAC address, a mobile subscriber number, an international mobile subscriber identity (IMSI), a temporary mobile subscriber identity (TMSI), a mobile subscription identification number (MSIN), an integrated services digital network (ISDN) number, Extended Unique Identifier (EUI), and/or some other identity, address, and/or serial number corresponding to a particular device, which might include a hash of any of the aforementioned numbers.

A rollup NFT may be provisioned to comprise a plurality (e.g., bundle, batch, block) of NFTs. The rollup NFT might comprise on-chain and off-chain data. The rollup NFT's on-chain data might comprise linear network coded NFTs (produced by encoding data corresponding to the plurality of NFTs). The rollup NFT's on-chain data might comprise an AONT rollup packet produced from data (e.g., AONT packets, coded packets, proofs, commitments, witnesses, and/or other data) corresponding to the plurality of NFTs. The rollup NFT's on-chain data might include metadata. A computer system may allow updates to public metadata and/or private metadata in response to verifying a proof of knowledge associated with a user. A computer system may update public metadata and/or private metadata in response to adding an NFT to the plurality of NFTs in the rollup. The metadata might include a Merkle tree or a Merkle tree value(s), such as a root hash. In some aspects, the computer system may provide a separate ledger with one or more smart contracts that is used to map between a rollup NFT and multiple contained (i.e., rolled-up) NFTs. Note that the mapping may or may not use a decentralized database.

Some aspects of the present disclosure provide a blockchain-based data compression solution. In one aspect, a service party can compress original data to be stored using an operator that partitions original data into a first plurality of original data parts based on a desired compression ratio; employs an operator to generate a second plurality of coded data parts that each comprises a linearly independent combination of the original data parts; partitions the coded data parts into a first number (at least one) $N_s$ of coded data parts and a second number $N_L$ (more than one) of coded data parts, where $N_s < N_L$ (typically $N_s \ll N_L$); and communicates the $N_s$ coded data part(s) to at least one node device on the blockchain. The second plurality is equal to or greater than the first plurality. The operator may narrow the solution space of the $N_s$ coded data part(s) by employing a function of the original data (which may comprise a previous coded data part) that imposes one or more constraints in the solution space. For example, the operator may employ a one-way function of the previous coded data parts to generate at least one of the second plurality of coded data parts. Corresponding server node(s) on the blockchain verifies the $N_s$ coded data part(s). For example, the node(s) might employ a checksum and/or error correction code. The node(s) may perform the verification of the $N_s$ coded data part(s) based on a smart contract corresponding to the checksum, error correction code, and/or the operator to ensure that the compressed data to be stored meets the data format requirement, thereby avoiding abnormal data such as garbled and misaligned data. In this way, through the operator and the distribution of the subset ($N_s$ coded data part(s)) of the coded data parts, original data is compressed to a reduced-dimensionality data set, but with a constrained solution space in which the correct solution (i.e., the original data) can be verified with a high degree of confidence.

Further, there is also provided a blockchain-based data decoding solution. When the node(s) on the blockchain receives the $N_L$ coded data parts (e.g., $N_L$ keys, or a smaller number of keys, e.g., one, produced by using the $N_L$ keys to partially solve the set of linear equations represented by the second plurality of coded data parts), it is possible to restore the compressed (coded) data into the original data using a decoding process based on the operator. Due to the constraints, the restored data can be determined to be the original data with a high degree of confidence. In some aspects, the restored data may be processed for verification. For example, principle component analysis (and/or kurtosis, skewness, higher-moment analysis), cyclostationary analysis, correlation analysis, covariance analysis, and/or other analyses might be performed to verify that the restored data has structure that distinguishes it from unstructured data that dominates the solution space.

In one example, an original data file is partitioned into a plurality of data parts (e.g., packets, or blocks O). Aspects can operate in a block cipher mode, wherein each data part is a whole block size, the last part of the data being padded to a full block if it is smaller than the whole block size. Linear network coding is performed on the original packets O to produce a system of linear equations, C=cO, where C represents linear-network coded packets (or blocks), and c is a coefficient matrix. The coefficient matrix c may be computed from a cryptographic hash function. For example, a coefficient vector $c_n$ for each $n^{th}$ coded packet $C_n$ might be computed from the cryptographic hash of a previous coded packet, e.g., $C_{n-1}$. This process can effectively chain together the coded packets C via cryptographic hashes. Thus, coding is serial, whereas decoding can be parallelized. In some instances, chaining might comprise XORing each block to be encoded with the previous coded block and/or uncoded block(s). Disclosed aspects might be configured to employ any combination of modes, such as propagating cipher block chaining, extended cipher block chaining, key feedback mode, Davies-Meyer hashing, stream cipher, output feedback, counter mode (e.g., integer counter mode, segmented integer counter mode), Galois counter mode, cipher feedback mode, Authenticated Encryption with Associated Data, encrypt-then-authenticate-then-translate mode, integrity-aware cipher block chaining, Integrity-aware parallelizable mode, Offset codebook mode, and/or counter with cipher block chaining message authentication code.

In some aspects, a one-way compression algorithm might be substituted in place of linear network coding (such as to produce the coded packets) and/or in place of AONT (such as to produce the AONT packet). In some aspects, a one-way compression algorithm might be performed with the linear network coding (such as to produce the coded packets) and/or with the AONT (such as to produce the AONT packet). A compression function mixes two fixed length inputs and produces a single fixed length output of the same size as one of the inputs. The mixing can be done in such a way that full avalanche effect is achieved. That is, every output bit depends on every input bit. One-way compression functions are often built from block ciphers. Some methods to turn any normal block cipher into a one-way compression function are Davies-Meyer, Matyas-Meyer-Oseas, Miyaguchi-Preneel (single-block-length compression functions) and MDC-2/Meyer-Schilling, MDC-4, Hirose (double-block-length compression functions). Hirose also provides a proof in the Ideal Cipher Model. The sponge construction can be used to build one-way compression functions. A Verifier might verify a candidate original data by performing the one-way compression on the original data, followed by comparing the result with the known result corresponding to the original data.

In the aforementioned cipher modes, the original data O may be input as plaintext into any of these modes and the resulting ciphertext output employed as original data in the disclosed linear network coding aspects. In some aspects the coded data produced by any of the disclosed linear network coding aspects may be input as plaintext into any of the aforementioned cipher modes, and the resulting ciphertext output employed as the coded data in the any of the disclosed linear network coding aspects. A hash function may be employed in any of the aforementioned cipher modes to provide a cryptographic hash of each ciphertext output, the hashes being used for provisioning coefficients in the linear network coded packets and/or provisioning the AONT packet.

Any of various padding schemes may be employed. The simplest is to add null bytes to the plaintext to bring its length up to a multiple of the block size, but care must be taken that the original length of the plaintext can be recovered; this is trivial, for example, if the plaintext is a C style string which contains no null bytes except at the end. Slightly more complex is the original DES method, which is to add a single one bit, followed by enough zero bits to fill out the block; if the message ends on a block boundary, a whole padding block will be added. Most sophisticated are CBC-specific schemes such as ciphertext stealing or residual block termination, which do not cause any extra ciphertext, at the expense of some additional complexity. Schneier and Ferguson suggest two possibilities, both simple: append a byte with value 128 (hex 80), followed by as many zero bytes as needed to fill the last block, or pad the last block with n bytes all with value n. In stream ciphers, the last partial block of plaintext is XORed with the first few bytes of the last keystream block, producing a final ciphertext block that is the same size as the final partial plaintext block. This characteristic of stream ciphers makes them suitable for applications that require the encrypted ciphertext data to be the same size as the original plaintext data, and for applications that transmit data in streaming form where it is inconvenient to add padding bytes. In some aspects, ciphertext stealing (CTS) may be used.

A mask generation function may be used in place of cryptographic hash functions disclosed herein. The output of a mask generation function should be pseudorandom, that is, if the seed to the function is unknown, it should be infeasible to distinguish the output from a truly random string. Mask generation functions, as generalizations of hash functions, are useful wherever hash functions are. However, use of a MGF is desirable in cases where a fixed-size hash would be inadequate. Examples include generating padding, producing one time pads or keystreams in symmetric key encryption, and yielding outputs for pseudorandom number generators.

The first coded packet $C_1$ might be computed from a linear combination of a first coefficient vector $c_1$ with the original data O, wherein the first coefficient vector $c_1$ might be computed from a key (i.e., an initialization vector, or starting vector), such as a random vector, a private key, a public key, some publicly known or deterministic vector, and/or a vector derived (e.g., hashed) from one or more previously coded packets, such as the last ($N^{th}$) coded packet $C_N^{[j-1]}$ from a previous (e.g., j-1) original data file. The coefficient vectors $c_2, \ldots, c_N$ might be computed from some combination of the hashes of one or more previous coded packets C and the key(s).

The linear network coding might further comprise an all-or-nothing (AONT) (e.g., package) transform (e.g., coding). In one instance, a coded packet $C_{N+1}$, or block, referred to as an extra packet or block, or as an AONT packet or block, is provided. In some aspects, the coded packet $C_{N+1}$ might be used as a commitment or witness in a proof. The blocks $C_1$ to $C_N$ can be referred to as the pseudo-message. In some aspects, undoing the package transform can require hashing every block of the pseudo-message (possibly except the last), and XORing all the hashes with the last block to recover the key. The key can then be used to recover the original blocks. For example, the key might be the initialization vector (IV) and/or the key might be used in a process to XOR each original or coded block with the block's index encrypted by the key. Optimal Asymmetric Encryption Padding (OAEP) and/or other techniques might be used to provision the all-or-nothing transform. Variations of the AONT can replace the XOR with another group operation.

The IV can be a block of bits, similar to that used in standard encryption modes to randomize the encryption and hence produce distinct ciphertexts, even if the same plaintext is encrypted multiple times. In contrast, some disclosed aspects exploit the plaintext (i.e., original data) to randomize the coding for different original data, but advantageously employ the same IV in order that the same ciphertext (i.e., coded data) corresponding to the same plaintext is produced. Unlike the aforementioned standard encryption modes, disclosed aspects might verify that a particular original data corresponds to a coded data, or AONT packet, or proof. In some aspects, the IV might be a key that identifies the user (e.g., the owner of the original data) or may be particular to the original data. The IV might be stored in the AONT packet.

The IV does not necessarily need to be secret in the aforementioned standard cryptographic uses. In typical block cipher modes, it is important that an IV is never reused under the same key, i.e., it must be a cryptographic nonce. In contrast, in some disclosed aspects, the IV is secret so it can be used to verify data authenticity, authenticate a user, and/or used for other verification. In some aspects, the IV may have randomness or pseudo-randomness properties. Such properties can useful for scrambling the original data to provision randomness in the coding process.

It should be appreciated that error-detection (e.g., checksums, coding, and the like) and/or error-correction coding (e.g., erasure codes, Reed-Solomon codes, and the like) may be performed on the packets (e.g., the original packets and/or the coded packets). In the disclosed aspects, the original packets and/or the coded packets might be encrypted.

The $C_{N+1}$ packet might be stored on the blockchain, delivered to the user, and/or stored on a file sharing network or other storage system or service. The $C_{N+1}$ packet might be batched with other $C_{N+1}$ packets and provisioned into a rollup that is stored or effects a state change on the blockchain.

The coded packets $C_1, \ldots, C_N$ might be delivered to the user, and/or stored on a file sharing network or other storage system or service. When stored on a file-sharing network, the coded packets $C_1, \ldots, C_N$ might be content-addressable (e.g., employ content addressable storage (CAS) or fixed content storage (FCS)). In one instance, a cryptographic hash function's digest generated from the Original data O is provisioned to identify (e.g., serves as the content address for) each of the coded packets $C_1, \ldots, C_N$ in the storage system. The address may further comprise an identifier configured to uniquely identify each of the individual coded packets $C_1, \ldots, C_N$. The identifier might comprise a packet index and/or a nonce. The identifier might comprise a function (e.g., hash) of a data structure that includes the packet index and/or a nonce and the digest generated from the Original data.

In one example, a system of linear equations that represents linear network coded original data vector O is:

$$C = cO$$

where c is an MXN coefficient matrix, O is the NX1 original data vector, and C is the MX1 coded data vector (typically, M≥N) can be interpreted as an equation over polynomials.

$$\begin{bmatrix} C_0 \\ C_1 \\ \vdots \\ C_{M-1} \end{bmatrix} = \begin{bmatrix} c_{0,0} & c_{0,1} & \cdots & c_{0,N-1} \\ c_{1,0} & c_{1,1} & \cdots & c_{1,N-1} \\ \vdots & \vdots & \ddots & \vdots \\ c_{M-1,0} & c_{M-1,1} & \cdots & c_{M-1,N-1} \end{bmatrix} \begin{bmatrix} O_0 \\ O_1 \\ \vdots \\ O_{N-1} \end{bmatrix}$$

For the generalization $x_n = O_n$, $n = 0, \ldots, N-1$, in the system of linear equations, polynomials $p_n(x)$ of degree <M can be provisioned. A proof can be generated from the polynomials. The proof might be stored on a blockchain. The polynomials might be verified via an interactive or non-interactive proof by a Verifier. In one example, an on-chain smart contract might be programmed to act as the Verifier. A polynomial evaluation proof may be based on a commitment relative to a set of points. The $C_{N+1}$ packet might be employed in the proof. In one example, a commitment or witness might comprise the $C_{N+1}$ packet and/or hashes of the coded packets $C_1, \ldots, C_N$. Proofs can be made non-interactive, such as by using the Fiat-Shamir heuristic.

A decoder can collect the coded packets $C_1, \ldots, C_N$ and the $C_{N+1}$ packet, determine the coefficient matrix c from the coded packets $C_1, \ldots, C_N$, such as by computing the cryptographic hash (or some other transform function) of each coded packet (e.g., $\{h_1, \ldots, h_N\}$), and then using those computations to decode the $C_{N+1}$ packet to recover the IV. The resulting system of linear equations $$O = c^{-1}C$$

can be solved (e.g., by Gaussian elimination or some other suitable process) to recover the vector O of original data packets. A data integrity check of the original data may be performed, such as by comparing the hash of O with the IV, using the IV to decrypt the solution of the linear equations, and/or performing statistical analysis on the decoded and/or decrypted result. The decoder might comprise a Verifier, or vice versa.

In some disclosed aspects, a Verifier is configured to verify that a particular proof of knowledge of a polynomial, a $C_{N+1}$ packet, a set of hashes (e.g., $\{h_1, \ldots, h_N\}$), and/or a set of coded packets $C_1, \ldots, C_N$ corresponds to a particular original data file, or vice versa. In one example, at least the $C_{N+1}$ packet and the set of hashes (e.g., $\{h_1, \ldots, h_N\}$) corresponding to coded packets $C_1, \ldots, C_N$ are provided to the Verifier. Furthermore, a candidate original data file O' is provided to the Verifier. The Verifier might compute the IV from the hashes and $C_{N+1}$ packet, if the IV is not provided. If the IV is the hash of the original data, then the hash of the candidate original data can be compared to the IV: $f_h(O')$ =?IV. In one example, the Verifier performs linear network coding on the candidate original data O', produces a candidate set of hashes (e.g., $\{h'_1, \ldots, h'_N\}$) therefrom, and compares the candidate set $\{h'_1, \ldots, h'_N\}$ to the set $\{h_1, \ldots, h_N\}$ corresponding to O. In another example, the Verifier performs linear network coding on the candidate original data O', produces a candidate AONT packet ($C'_{N+1}$) therefrom, and compares the candidate AONT packet ($C'_{N+1}$) to the $C_{N+1}$ packet.

In some disclosed aspects, a Prover has a polynomial p provisioned from the system of equations corresponding to original data O. The polynomial p might be employed as a private key, and a public key P can be produced from p. The Public key might encrypt the coded packets and/or the AONT packet. In some aspects, the Prover makes a commitment using p. In one aspect, a cryptographic hash set comprising one or more hashes might be computed using coefficients of p (e.g., $f_h(p)=\{h_1, \ldots, h_N\}$). The hashes $\{h_1, \ldots, h_N\}$ might be XORed with the IV by the Prover. For example, if the IV is the hash of O (IV=$f_h$(O)), then an AONT packet can be expressed as $$C_{N+1} = f_{XOR}(IV, h_1, \ldots, h_N)$$

Verifier is provided with a candidate original data file O'. The Verifier might process O' in the same manner as the Prover, and then XOR the candidate IV (IV') and candidate hashes $\{h'_1, \ldots, h'_N\}$ produced from the processing of O' to produce a candidate AONT packet, $C'_{N+1}$ to compare with $C_{N+1}$. Alternatively, the Prover might compare IV' with IV and/or $\{h'_1, \ldots, h'_N\}$ with $\{h_1, \ldots, h_N\}$.

In one example, a method for transacting a record on a blockchain, comprises performing linear network coding on the record or on a data file corresponding to the record, to produce a plurality of coded data parts; and storing at least one of the plurality of coded data parts on the blockchain.

In another example, a method for transacting a record in a blockchain, comprises performing an all-or-nothing transform on the record or on a data file corresponding to the record, to produce a plurality of coded data parts; and storing at least one of the plurality of coded data parts on the blockchain.

In another example, a method for transacting a record in a blockchain, comprises performing linear network coding on the record or a data file corresponding to the record, to produce a plurality of coded data parts; and storing, on the blockchain, a cryptographic proof of knowledge of at least one of the plurality of coded data parts, a polynomial derived from the linear network coding, an all-or-nothing transform (AONT) packet corresponding to the coded data parts, or an initialization vector employed in the linear network coding.

In another example, a method for transacting a record in a blockchain, comprises performing linear network coding on the record or on a data file corresponding to the NFT, to produce a system of linear equations; converting the system of linear equations to a polynomial form; producing a zero-knowledge proof from the polynomial form; and storing the zero-knowledge proof on the blockchain.

In another example, a method for transacting a record in a blockchain, comprises retrieving, from the blockchain, a coded data part or a proof, verifying that the coded data part or the proof corresponds to at least one of an ownership key of the record or a data file corresponding to the record; and upon verifying, causing a computer to transmit the ownership key to a second party; wherein the coded data part or the proof comprises a data structure produced from performing at least one of linear network coding and an all-or-nothing transform on the record or on the data file.

In another example, a method for storing a record in a blockchain, comprises performing linear network coding on the record or on a data file corresponding to the record, to produce a plurality of coded data parts; and distributing the plurality of coded data parts for storage on a file-sharing network.

In another example, a method for processing a record or a data file associated with the record, comprises encrypting the record or the data file with a key to produce encrypted data; performing linear network coding on the encrypted data, to produce a plurality of coded data parts; performing all-or-nothing coding on the plurality of coded data parts to produce a package data part comprising a function of the key and cryptographic hashes of the plurality of coded data parts; and storing the package data part on the blockchain.

In another example, a method for processing a record or a data file associated with the record, comprises gathering a plurality of coded data parts of the record or the data file, wherein the coded data parts are linear network coded data parts of the record or the data file; constructing a system of linear equations using the plurality of coded data parts and a corresponding coefficient matrix; solving the system of linear equations to produce a decoded data; and comparing a metric of the decoded data with a metric of the record or the data file to determine correctness of the decoded data.

In some aspects, new linear network coding might be performed on the original data, but with a new or updated parameter, such as the IV. The new linear network coding might be performed upon transferring the file, record, or asset indicated by the record to another user, and/or wherein the asset state changes (e.g., when the condition of the asset, the physical location of the asset, the availability of the asset, a status of the asset, or a state of the asset changes). This might update a state in a smart contract. Metadata associated with any of the previous user, record, asset state, etc. might be provisioned with or into the linear network coded data.

In some aspects, multiple layers of linear network coding might be provisioned. Each layer of coding might include its own AONT packet, IV, key, proof, signature, etc. This encoding might be employed as a type of secret sharing, or secret splitting, wherein the original data can be recovered only when a sufficient number, of possibly different types, of shares are combined. Any of various types of secret sharing or threshold signatures might be employed, such as to enable multiple users to access the original data and/or ensure that only a minimum number of collaborating users can decode the coded data. Access to the original data might be provisioned using group signatures or ring signatures, wherein such a signature might be made by any of a predetermined group of users that are authorized to access the original data. Verification then satisfies the usual soundness and completeness conditions, but in addition, the signatures can be signer-ambiguous in the sense that the verifier should be unable to determine the identity of the actual signer.

In some aspects, disclosed coding can be configured to employ a more flexible technique called sliding window coding, where coding is performed across a dynamic set of packets. Sliding window coding removes the limitation of fixed blocks by creating a variable-sized sliding window. Source, or native, packets can be added or removed from the sliding window dynamically. Coded packets associated to a given sliding window position (i.e., first packet index) and size can be inserted into the stream. Coding parameters, such as the window definition, window size, redundancy rate, and transmission policy may depend on a number of factors, such as receiver feedback, streaming requirements, CSI, congestion control, load control, etc. Such coding parameters might be conveyed with the coded packets, such as in one or more AONT packets.

Any of the methods disclosed herein might be performed by an apparatus, comprising at least one computer processor and at least one non-transitory computer-readable memory communicatively coupled to the at least one computer processor, the at least one non-transitory computer-readable memory comprising computer program code stored thereon.

At least one non-transitory computer-readable memory comprising computer program code stored thereon might be configured to cause at least one computer processor to perform any of the methods disclosed herein.

Aspects disclosed herein may be implemented using smart contracts. The smart contract is a computer protocol intended to be deployed on a blockchain and applied to propagate, verify, or execute the contract in a digital manner. By declaring a service logic in the smart contract, corresponding operation may be performed. The smart contract allows trusted transactions without a third party. These transactions are traceable and irreversible. Smart contracts may provide security superior to traditional contract methods and reduce other transaction costs associated with the contracts.

Protocols and methods in the illustrative aspects scale well with file size, demand for services, and network size, and are highly efficient in message complexity, providing higher throughput and lower latency than conventional systems. Such protocols comprise programmable functionality that transforms a general-purpose processing system (e.g., computer or computer network) into a special-purpose processing system having measurably improved performance. Such improved performance in how processing system aspects operate is quantified by reduced time for the processing system to complete a specific task, reduced number of operations each node in the processing system must perform, reduced amount of data each node must store, reduced amount of communication bandwidth overhead required in the processing system's network, improved network performance metrics corresponding to reduced and/or distributed demand for network resources, and the like. Different aspects can achieve different performance benefits. Some of these benefits can include improved data security. Disclosed aspects can improve one or more of the elements of data and information protection, namely confidentiality, integrity, and availability. Confidentiality in this context means that the data is only available to authorized parties, which can include improved resistance to the data being deciphered by an unauthorized party. Data integrity refers to the certainty that the data is not tampered with or degraded during or after submission. It is the certainty that the data has not been subject to unauthorized modification, either intentional or unintentional. There are two points during the transmission process during which the integrity could be compromised: during the upload or transmission of data or during the storage of the document in the database or collection. For example, data integrity can refer to resistance of the data to spoofing. For a system to demonstrate availability, it must have properly functioning computing systems, security controls and communication channels. Various aspects enhance availability, such as via disclosed key management techniques and blockchain technologies.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Disclosed aspects may be implemented as methods or apparatuses within the context of the drawings figures and descriptions. By way of example, but without limitation, blocks depicted in each figure herein can be interpreted as apparatus components of electronic circuitry; programmatic elements in software residing on a non-transitory computer-readable memory; functional elements of circuitry, or firmware and/or software stored in non-transitory memory (or any combination thereof) that cause at least one computer processor and/or programmable circuitry to perform corresponding functions described herein; steps of a method performed by circuitry, at least one computer processor, device, network, or system; or steps of a method that combines, assembles (or causes the assembly of) the blocks to produce an apparatus, program at least one computer processor, configure programmable circuitry, manufacture circuitry, or cause software instructions embodying the steps of the method to be stored on a non-transitory computer-readable medium. In one example, "providing for", "configuring", or "provisioning" can describe assembling blocks to manufacture an ASIC, an FPGA, an article of manufacture (such as a non-transitory computer-readable memory), and/or a UE. In another example, "providing for", "configuring", or "provisioning" can describe producing and/or assembling functional blocks to make a transmitter, receiver, or transceiver. In another example, "providing for", "configuring", or "provisioning" can describe producing and/or assembling hardware, firmware, software, and/or a virtual machine. In another example, "providing for", "configuring", or "provisioning" can describe producing and/or assembling corresponding functional components configured to operate in a gNodeB, a remote radio head, a base station controller, a relay, a hub, a gateway, an access point, a transmit receive point, a UE, a virtual antenna array, a network node, a network device, a router, a server, or any combination thereof.

FIG. 20A shows functional aspects of an apparatus and method configured for participating in a consensus protocol with a plurality of additional processing nodes.

FIG. 20B shows a method of selecting validators using, at least in part, a trustworthiness metric for each candidate validator node.

FIG. 20C shows part of a method for employing a consensus protocol based, at least in part, on trustworthiness of the nodes participating in the consensus protocol.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
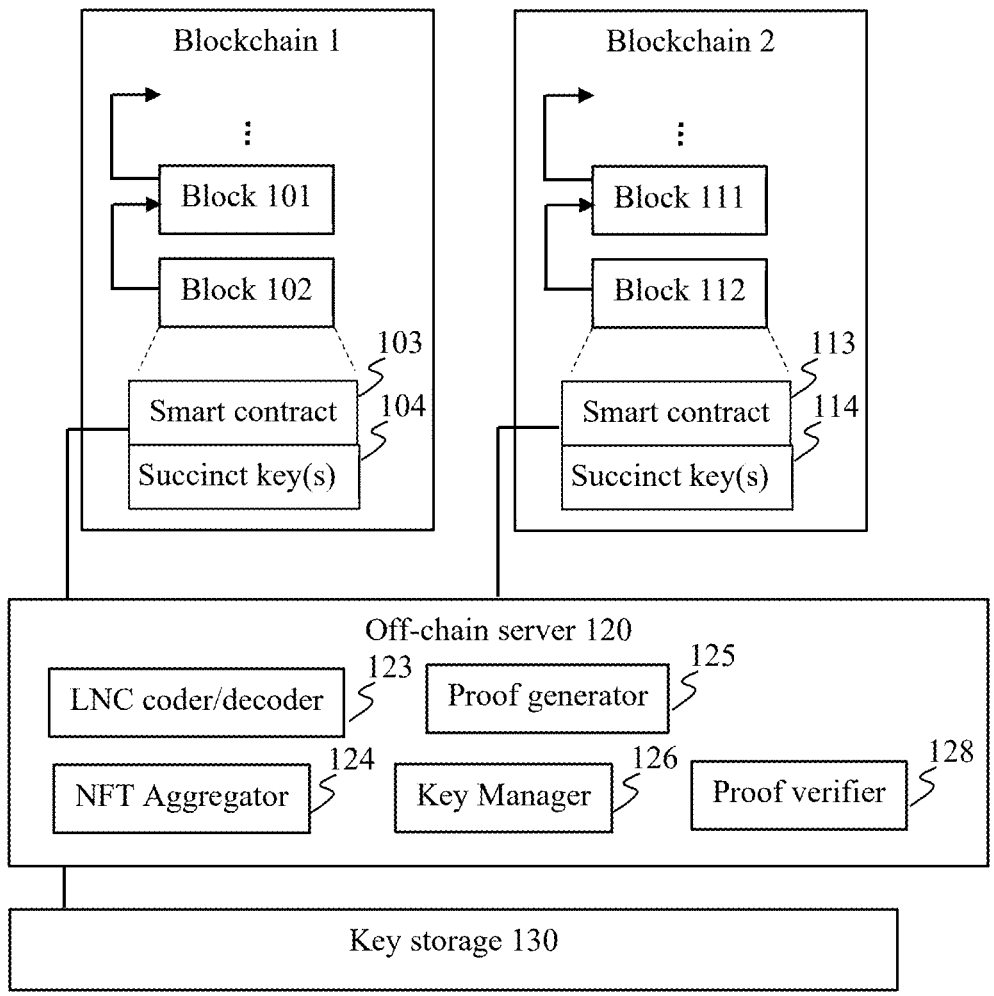
FIG. 1 illustrates an operational architecture for implementing an enhanced blockchain operating system, as well as other blockchain-related operations disclosed herein.

Aspects of the present disclosure include apparatus, methods, processing systems, and computer readable mediums for compressing data, encoding data, encrypting data, transmitting data, receiving data, storing data, retrieving data from storage, decrypting data, decoding data, and/or decompressing data, among other applications. Aspects of the present disclosure can be configured for numerous applications and use cases, including file sharing networks, Cloud storage, distributed ledger, and/or blockchain, among other applications and use cases.

Aspects of the present disclosure can relate to 1) reducing data bandwidth overhead for decentralized storage, 2) effectively compressing original data by producing a succinct footprint that unambiguously identifies the original data and which is subsequently stored in memory, 3) encrypting and transmitting and/or storing data in a manner that provides for information-theoretic security, 4) controlling and/or provisioning access credentials (e.g., keys) for stored data, and/or 5) verifying/validating the content of stored data and/or access credentials.

Unlike elliptical-curve encryption and cryptographic hash functions, which are computationally secure, disclosed Linear Network Coding techniques can provide information-theoretic security, which means that encryption is secure against adversaries with unlimited computing resources and time. This makes linear network coding quantum secure, whereas elliptical-curve and cryptographic hashes are only quantum "resistant". Specifically, each linear-network coded packet projects the original data onto a reduced dimensionality space. This feature, in combination with constraints imposed by chaining the coefficient vectors of the coded packets, ensures both confidentiality and data integrity if an adversary intercepts fewer than the total number of coded packets. This coding mode can be configured to be strongly non-separable, which means that it is infeasible to determine even one message block without decrypting all of the ciphertext (coded) blocks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In FIG. 1, an NFT auction house (or some other organization) might deploy their smart contract on a Layer 1 blockchain (Blockchain 1), such as Ethereum, and retail clients might operate accounts on a Layer 2 blockchain (Blockchain 2) to perform NFT transactions (e.g., native minting, transfers, and atomic swaps of NFTs). Since the overwhelming majority of rollup fees are due to the costs of publishing data on Ethereum, accounts on Blockchain 2 (and/or off-chain servers) can make thousands of NFT transactions, while only a single update (or data record) needs to be published to Ethereum for those thousands of transactions.

Conventional rollups can only offer a linear increase in throughput, as all data still must be propagated to all full nodes. But to bring true scalability, an exponential gain in throughput is needed. Linear network coding disclosed herein enables each node to store only a small coded portion of each record instead of each full record. In some aspects, rollups might be implemented with the improvement of linear network coding.

A distribution scheme distributes the coded packets to the multiple nodes, and an aggregation scheme collects the coded packets stored on different nodes and processes the collected packets to recover the original packets (e.g., record). This can be implemented for managing NFT content off-chain, such as in a file sharing network, e.g., IPFS. This can be implemented for managing blockchain data on-chain amongst blockchain server nodes. Using such disclosed aspects, the overall network bandwidth efficiency can be greatly increased, and demand for network resources can be distributed more uniformly across the network.

Off-chain and/or Layer 2 data availability might be secured by Blockchain 2's token holders, which may track the state of the data by signing blocks that confirm data availability. Data availability metric can include an indication of the number (and sufficiency of) coded packets corresponding to each original data set. The operations employed in disclosed aspects can include interactive or non-interactive proofs (e.g., SNARKs, STARKs, PLONKs, SNORKs, and others) and/or zero-knowledge (zk) proofs, which can include interactive or non-interactive zk proofs, such as zk-SNARKs, zk-STARKs, zk-PLONKs, zk-SNORKs and others. Such aspects provide for placing succinct (tiny) proofs of computations and/or data on-chain, wherein disclosed aspects can comprise applications that are configured to compile the proofs. For example, every transaction might be verified by a smart contract on Blockchain 1 (e.g., Ethereum mainnet) by means of verifying the proof of the validity of the block, batch, and/or record.

The following documents are incorporated by reference in their entireties: A. Gabizon, et al., "PlonK: Permutations over Lagrange-bases for Oecumenical Noninteractive arguments of Knowledge";

In FIG. 1, each blockchain can includes one or more server nodes, which employ a blockchain operating system process in the context of storing, retrieving, and executing operations, including coding and decoding instructions disclosed herein. Each blockchain network may include various hardware and software elements in a supporting architecture suitable for performing disclosed aspects.

Each server node can include one or more servers and/or other devices configured to run a blockchain application. User devices (e.g., clients) interacting with a server node may include, but are not limited to, personal computers, mobile phones, handheld device, tablet computers, desktop computers, laptop computers, wearable computing devices, dedicated specialized devices (e.g., gaming machines, set top boxes, etc.) or any other form factor, including any combination of computers or variations thereof. Blockchains 1 and 2 represent digital ledgers that are open for a user to enter and record data into blocks 101-102, and 111-112. Blockchains a and 2 may be added by multiple users and recorded by multiple server nodes, such as server nodes in a distributed and/or decentralized network.

As illustrated in FIG. 1, blocks include block entries, such as 103 and 104 associated with block 102. Block entries 103-104 may include various records and/or DApp code stored as a smart contract, operating system code stored as a smart contract, and any other type of block entry of smart contract combination or variation thereof. For instance, user activity may cause a block entry to be created or updated by, for example, minting or transferring an NFT. In this instance, NFT content associated with such a transaction (possibly bundled with other transactions), may be linear network coded, and then a key or proof generated therefrom can be stored as block entry 104 and/or 114 in blockchain 1 and/or 2 on a server node in the distributed network environment. The values stored as records 104 and/or 114, can include proving keys, verification keys, proving variables, verification variables, generators, cryptographic pairings, and/or random samples. Program code stored as smart contracts 103 and/or 113 might include a variable polynomial check, a variable values consistency check, and/or a valid operations check. In some instances, program code stored as smart contracts 103 might call functions on blockchain 2 or off-chain functions, such as to generate proofs and/or validate proofs, and/or perform linear network coding and/or decoding, and/or bundling transactions to produce rollups. Such aspects can provision the majority of processing and/or data off-chain (and/or on a layer-2 blockchain), and employ succinct proofs to verify the integrity of the off-chain (and/or layer-2) computations and/or data.

Block entries can include keys, or proofs, of the NFT content (e.g., data). In some aspects, data portions include keys to linear network coded data in accordance with disclosed aspects. In some aspects, block entries comprise program code (e.g., smart contracts, DApps, etc.). The program code can comprise software instructions, that when executed on at least one processor, cause the processor to perform methods disclosed herein. The program code might connect to off-blockchain program code to effect the disclosed operations. In some instances, the program code LNC-encodes original data into coded data pieces, which comprises a small key (or proof of the data and the encoding), and a large key or multiple keys (comprising the coded data). The program code may store the small key in a block 102 and/or 112. The program code may perform a checksum or error correction on the small key and/or the large key. Reed-Solomon encoding may be integrated into the coding and decoding aspects disclosed herein. The program code may provision distribution and/or storage of the large key (such as individual ones of the aforementioned multiple keys) to a key storage system 130, which may be the owner of the NFT or a storage service, such as a Cloud storage or file-sharing network.

The program code may perform (or call off-chain processes to perform) verification of a zero-knowledge proof, wherein a user (prover) purports to be a key-bearer of the large key or a one or more of the aforementioned multiple keys. Upon verification, the program code may effect LNC decoding of the original data, in order to recover the original data and possibly perform subsequent verification of the decoded (i.e., purported original) data. The program code may verify the decoded (i.e., purported original) data, and may possibly return a confidence measure thereof.

The program code instructions can comprise components which make up each of block entries and may be broken into code segments based on a transaction request authorization and a set of conditions which must be met to access and/or execute the instructions. For example, instructions may each include a value, function, address, and state.

In operation, a blockchain network can receive a transactional request to generate, append to, or update a record in a block of the blockchain (or to be added to the blockchain) responsive to LNC coding, LNC decoding, and/or key verification for LNC-coded data; and the request may include instructions and one or more conditions. The transactional request may include program code which may execute or cause to execute (e.g., by calling off-chain program code) various LNC coding and/or decoding, proof generation, proof setup, and/or proof verification.

In some aspects, the instructions may include conditions to authenticate access to LNC coding or decoding functionality. For example, an on-chain smart contract might conditionally allow a user to access an off-chain LNC coding function if the user provides the requisite fee and supplies a file (e.g., NFT content) to be encoded. The instructions might authenticate access to LNC decoding for a particular file provided the user (prover) is able to provide the requisite proof of knowledge of the corresponding key.

In some aspects, the instructions may include scripts to schedule resources (e.g., computational resources, storage, communication resources (e.g., data bandwidth, latency, quality of service, bit error rate, etc.) for functionalities required to execute any of the disclosed applications. In yet another aspect, the instructions may include scripts used to perform communications with other user accounts, data storage resources, and/or program code interacting with the blockchain network. In one example, the instructions may provide for distributing LNC-coded data across nodes in a file-sharing network and/or aggregating (e.g., collecting; performing error detection and/or correction; verifying keys and/or data) LNC-coded data and/or keys in the file-sharing network. In some aspects, the instructions may include scripts which may be executed by one or more nodes in blockchain network.

In a next operation, blockchain network can authenticate a transactional request in the distributed network of nodes based on a proof associated with the transactional request. The transactional request may include a key-pay or encrypted code verifying the identity and authorized privileges of the user making the transactional request. Next, blockchain network can provision storage of the LNC-coded data (and possibly, program code), such as off-chain. The program code can be executed when a set of conditions are met. A blockchain database may be maintained by a multitude of independent users spread across blockchain network. In one example, proofs and corresponding program code instructions can be stored in a block entry. The set of instructions may include terms of the smart contract which would need to be met in order to produce and/or execute the program code instructions. For example, program code instructions to decode the LNC-encoded data or transfer ownership of the corresponding NFT may only be executed when a user proves ownership of the NFT's key and when an instruction from a DApp is received.

In a next operation, blockchain network can authenticate the transactional request in the distributed network of nodes based on a proof associated with the transactional request. The transactional request to later execute the instructions to transfer the NFT and/or decode the data may also require that the proof be verified. In some aspects, the authentication of the transactional request may generate an additional block entry or effect an update to a Merkle tree (e.g., root).

In a next operation, blockchain network can evaluate the blockchain and/or off-chain resources for one or more scripts associated with the transactional request. The one or more scripts may include scripts to execute various functionalities for a DApp. For example, the one or more scripts may include code, which when executed, may schedule resources for the DApp application and/or verify the user for the DApp. In other example scenarios, the one or more scripts may include code which when executed may enable one DApp to transfer and receive communications with another DApp and/or off-chain program, coordinate user account information, verification, user authentication data, and/or other functionalities which may be executed on the blockchain network and/or off-chain using shared protocols.

The instructions can include APIs which may be used to execute functionalities of a DApp or other system process. In some example scenarios, the instructions may comprise customized kernel instructions. For example, the customized kernel instructions may enable a kernel to be compatible with various protocols used by the DApps.

In one aspect, the block chain network can cause transfer of the decoded original data to the prover. The decoded data may be sent to a user device via a server or one or more nodes in a file-sharing network. It should be noted that various CPUs, memories, databases, and drivers may be used from various servers and devices included in blockchain network and/or external to the blockchain network (i.e., off-chain) to execute instructions from the block entries in blockchain network.

Figure 2:
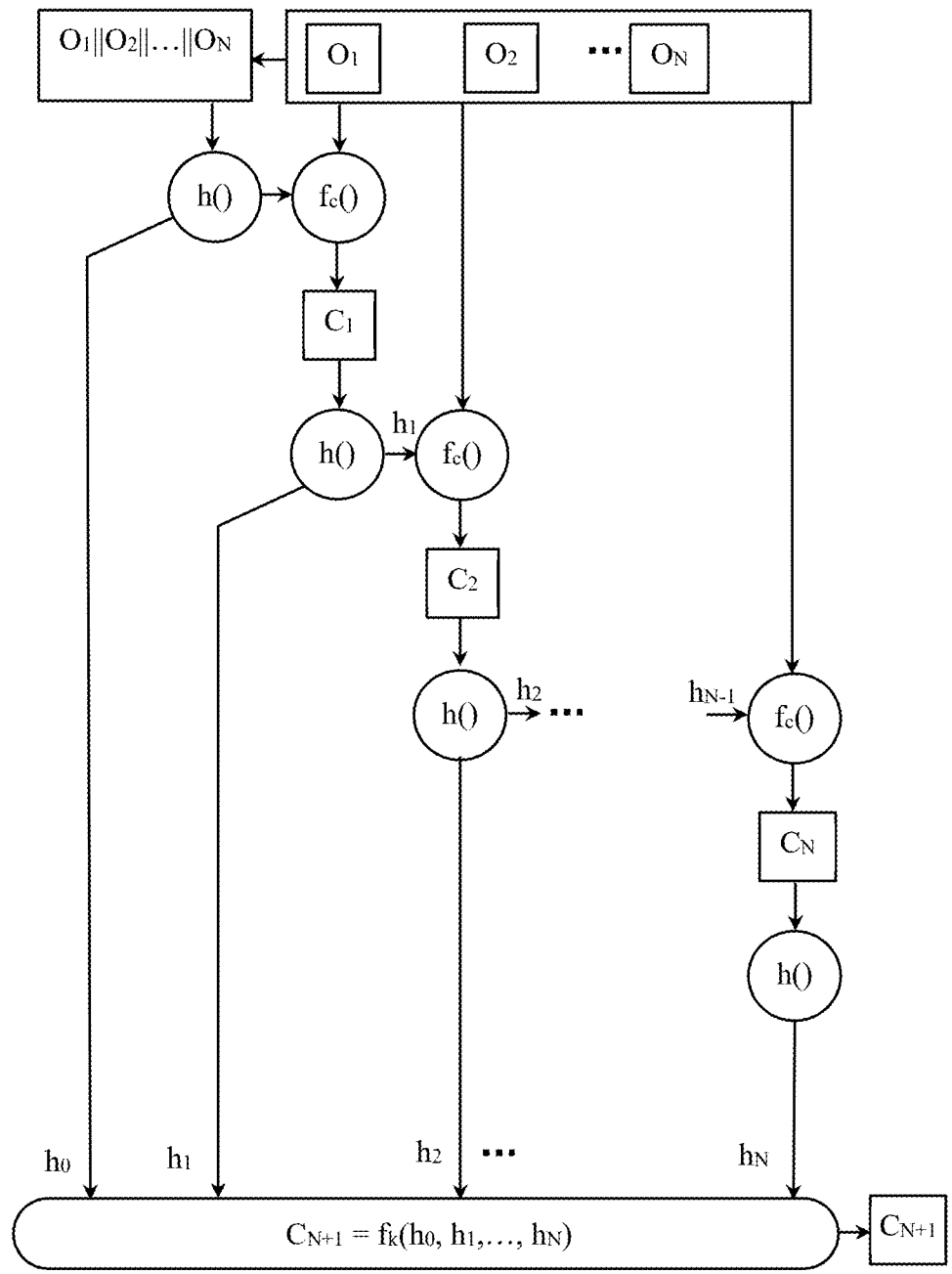
FIG. 2 illustrates a method and apparatus for encoding data according to some aspects of the disclosure.

In FIG. 2, an original data O is processed to produce a plurality N of original data portions (e.g., packets) $O_1, \ldots, O_N$. The original data packets may be processed (e.g., concatenated $[O_1 \| O_2 \| \ldots \| O_N]$, and/or some other operation performed), and a cryptographic hash $h_0 = h(\bullet)$ computed therefrom. This "zeroth" hash $h_0$ can be used to compute, via function $f_c(\ )$, a first set of coefficients $c_1$ for producing a first linear combination $C_1$ of the original data packets. In some instances, $h_0$ might be used to compute a symmetric key for an encryption function $E_k(\ )$ that might encrypt the original data and/or code data (and decrypt this data in a corresponding decoding example). The hash of $C_1$ can be used to compute the next set of coefficients (in this case, $c_2$) for producing a next linear combination (in this case, $C_2$) of the original data packets, and this process is performed for at least $C_1$ to $C_{N-1}$, resulting in coded packets $C_1$ to $C_N$, and a coefficient matrix c comprising N sets (e.g., vectors) of coefficients $c_1$ to $c_N$. Hash value $h_N$ of $C_N$ may be computed: $h_N=h(C_N)$. In some instances, the hash of a concatenation (or XOR, or some other function) of two or more coded packets might be made: e.g., $h_n=f(C_n \| C_{n-1} \| \ldots \| C_{n-k})$. Thus, hash values $h_n, h_{n-1}, \ldots, h_{n-k}$ can each be a function of $C_{n-k}$. This compounds the difficulty of a collision or pre-image attack that might attempt to substitute a counterfeit packet for the coded packet $C_{n-k}$. For decoding, corresponding hash computations can be made on the collected coded packets.

The hash values (e.g., $h_0, h_1, \ldots, h_N$) may all be operated upon via a function $f_k(\ )$ to produce a coded data $C_{N+1}$, which may be referred to as a succinct coded data packet, a package data part, an AONT packet, or other terminology. The function $f_k(\ )$ that produces coded data $C_{N+1}$ can be referred to as a part of an all-or-nothing transform (or transformation, protocol, or encryption) or package transform. Disclosed aspects may employ any of the various all-or-nothing transforms and produce coded packets therefrom, one or more of which can be stored on a blockchain or effect a state change (e.g., in a smart contract) on a blockchain. In one example, function $f_k(\ )$ XOR's the values $h_0, h_1, \ldots, h_N$ together to produce $C_{N+1}$. The coded data $C_1$ to $C_{N+1}$ is output from the process depicted in FIG. 2.

In one example, $C_{N+1}$ is written to a blockchain. The coded packets $C_1$ to $C_N$ can be delivered to a client device (e.g., the owner or supplier of the original data) or stored (e.g., in a file-sharing network) as individual data elements or groups, or as a single data structure. Additional data elements might be added to any of the coded packets, such as sequence numbers, checksums, and/or identifiers. Error-correction coding might be provisioned in or to any of the coded packets. The coded packets may be encrypted.

In some aspects, the original data, individual original data packets, hashes, coefficient sets, and/or coded packets may be encrypted. During a process that decodes the coded data, corresponding decryption may be performed on the original data, individual original data packets, hashes, coefficient sets, and/or coded packets. In some aspects, error-correction coding might be used to encode the original data, original data packets, hashes, coefficient sets, and/or coded packets. During a process that decodes the coded data, corresponding error-correction decoding may be performed on the original data, individual original data packets, hashes, coefficient sets, and/or coded packets.

In some aspects, coded packets $C_1$ to $C_N$ can be employed individually, in groups, or all together to make a commitment and/or a proof. In some aspects, the coefficient matrix c (or coefficient vectors $c_n$, individually, or in groups) can be used to make a commitment and/or a proof. A prover who holds the coded packets $C_1$ to $C_N$ and/or coefficient matrix c may produce a polynomial relationship from the coded packets $C_1$ to $C_N$ and/or coefficient matrix c, and the polynomial relationship may be employed to make commitments and/or proofs. The commitments and/or proofs may be stored on a blockchain.

In some aspects, $C_{N+1}$ might be stored on the blockchain. In some instances, the disclosed aspects might make a commitment and/or proof of knowledge of a polynomial derived from $C_{N+1}$. Any commitments and/or proofs disclosed herein may be stored on a blockchain. In one instance, the prover can provide a proof of knowledge of the hashes $h_n$ in $C_{N+1}$. This might be done by proving knowledge of a polynomial corresponding to said hashes $h_n$, or the secret value $h_0$ stored in $C_{N+1}$, or both. Alternatively, the prover might prove knowledge of a polynomial corresponding to the coefficient matrix or to a system of linear equations of the coded packets $C_1, \ldots, C_N$.

In some aspects, $C_{N+1}$ is not necessary. In such aspects, the corresponding coding and decoding of $C_{N+1}$, such as disclosed herein, can be omitted. In one instance, $h_0$ or the input to h(that produces $h_0$ is known (e.g., public). For example, $h_0$ or the input to h(might be derived from another set of coded packets, a public key, a common reference string (CRS), a known state variable, or some other variable or constant. The prover might prove knowledge of a polynomial corresponding to the coefficient matrix or to a system of linear equations of the coded packets $C_1, \ldots, C_N$.

Figure 3:
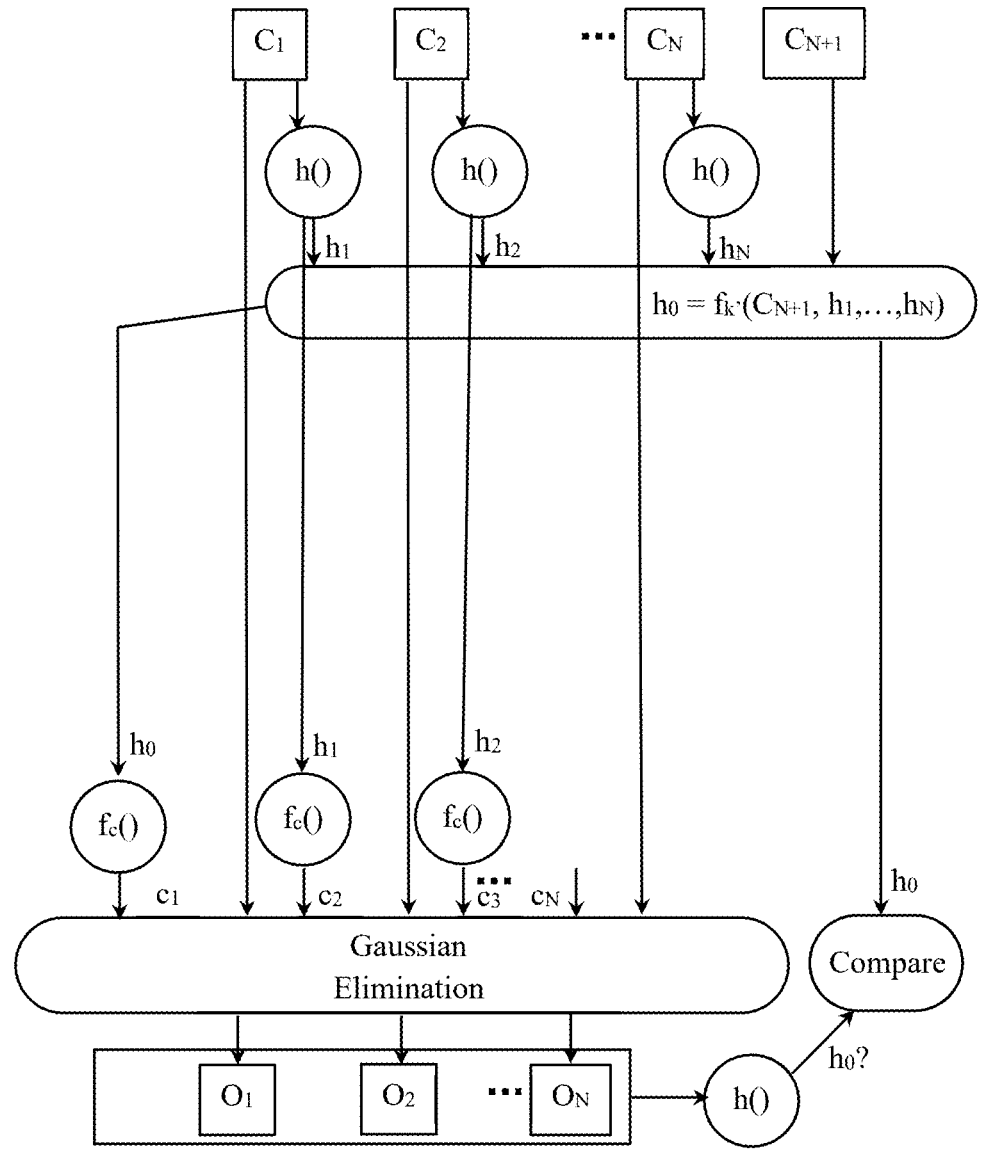
FIG. 3 illustrates a method and apparatus that can provide decoding to original data.

FIG. 3 illustrates method and apparatus aspects of decoding a set of LNC-coded packets $C_1, \ldots, C_{N+1}$. The packets $C_1, \ldots, C_{N+1}$ are gathered or parsed. Error detection (and possibly correction) is performed on the coded packets $C_1, \ldots, C_{N+1}$ to ensure their integrity. A hash h(or other corresponding one-way function operates on $C_1, \ldots, C_N$ to produce (e.g., hash) values $h_1, \ldots, h_N$. A function $f_k(\ )$ operates on $C_{N+1}$ and the values $h_1, \ldots, h_N$ to recover $h_0$. The values $h_0, \ldots, h_{N-1}$ are converted (via function $f_c(\ )$) to coefficient vectors $c_1, \ldots, c_N$. The coefficient vectors $c_1, \ldots, c_N$ and the coded packets $C_1, \ldots, C_{N+1}$ are input to a function (e.g., Gaussian elimination) that solves the system of linear equations represented by its inputs, and produces recovered original packets $O_1, \ldots, O_N$ therefrom. Optionally, the recovered original packets $O_1, \ldots, O_N$ might be verified. For example, h(operates on $O_1, \ldots, O_N$ to produce a candidate $h_0$ value(s), which can be compared to $h_0$ recovered from function $f_k(\ )$. Agreement verifies that the original packets $O_1, \ldots, O_N$ were recovered correctly.

In one example, a keyholder might take the role of a prover, and provide a cryptographic proof to a verifier prior to the decoding, or for the purpose of proving ownership of an NFT prior to transferring the ownership to another party. The prover might prove that its key, e.g., coded packets $C_1, \ldots, C_N$ and/or $C_{N+1}$ are authentic. Verification of the proof might be performed by an on-chain smart contract (possibly calling off-chain functions), and decoding might be performed primarily (or entirely) off-chain.

Figure 4:
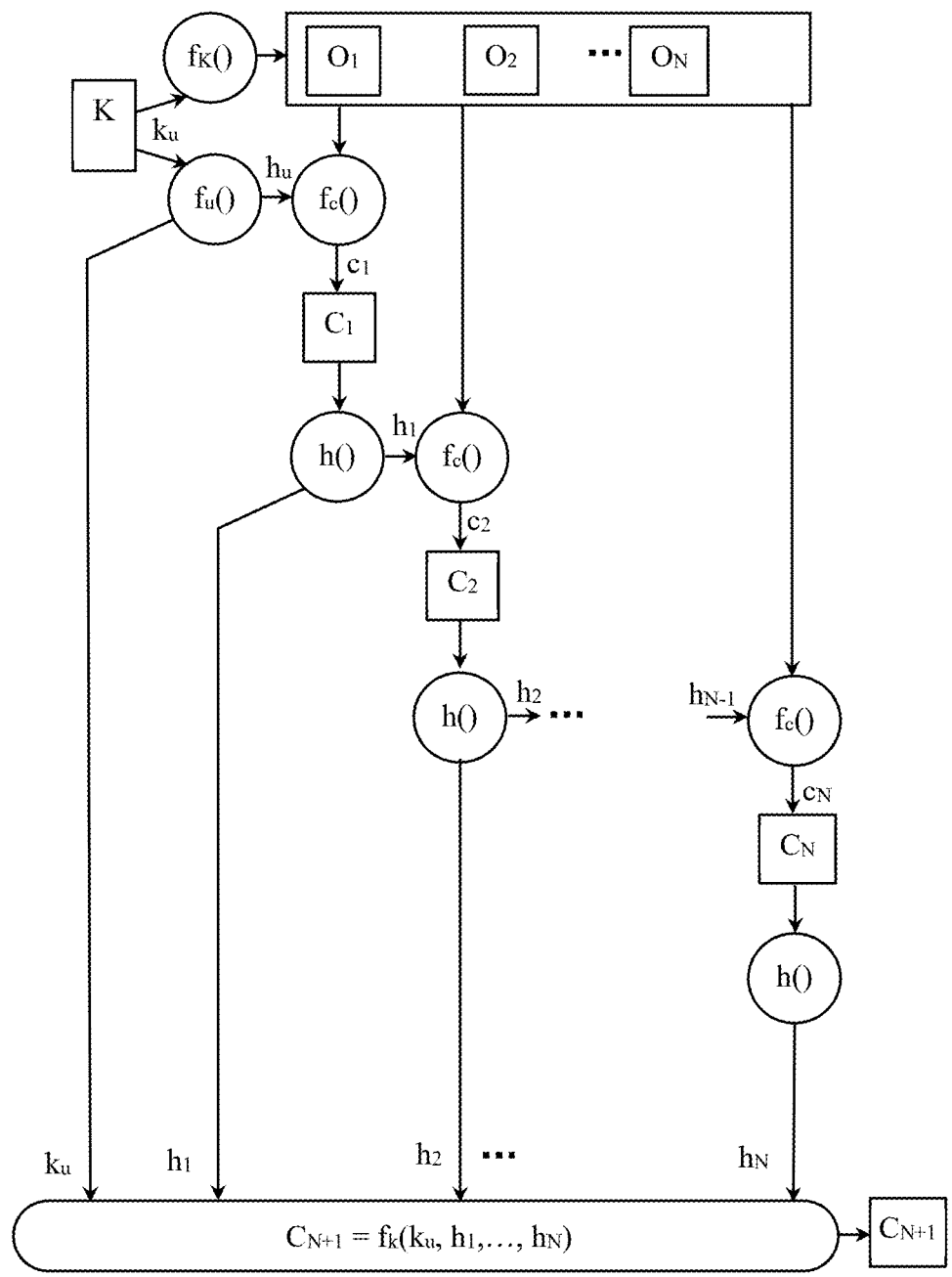
FIG. 4 illustrates a method and apparatus for encoding data according to some aspects of the disclosure.

FIG. 4 illustrates method and apparatus aspects that generate LNC-coded data. Some operations are the same as shown FIG. 2. Differences are highlighted here. A key operation K provides at least one key $k_u$, such as by generating the key(s) or acquiring the key(s) from one or more external source(s). The key(s) might comprise a private key, public key, key pair, and/or symmetric key. The key might be specific to the original data and/or the owner of the original data. The key operation K might be a random or pseudorandom operation, such as a random number generator, a cryptographic hash operation, or any suitable one-way operation.

Optionally, an encoding operation $f_k(\ )$ may use $k_u$ to encode the original data, such that the original data packets $O_1, \ldots, O_N$ are encrypted packets. Optionally, an encoding operation $f_u(\ )$ may use $k_u$ to produce a value(s) $h_u$(e.g., a hash), which can be used to generate, via $f_c(\ )$, the first vector of coefficients $c_1$. The $k_u$ and/or $h_u$ is used in $f_k(\ )$ to produce $C_{N+1}$.

Figure 5:
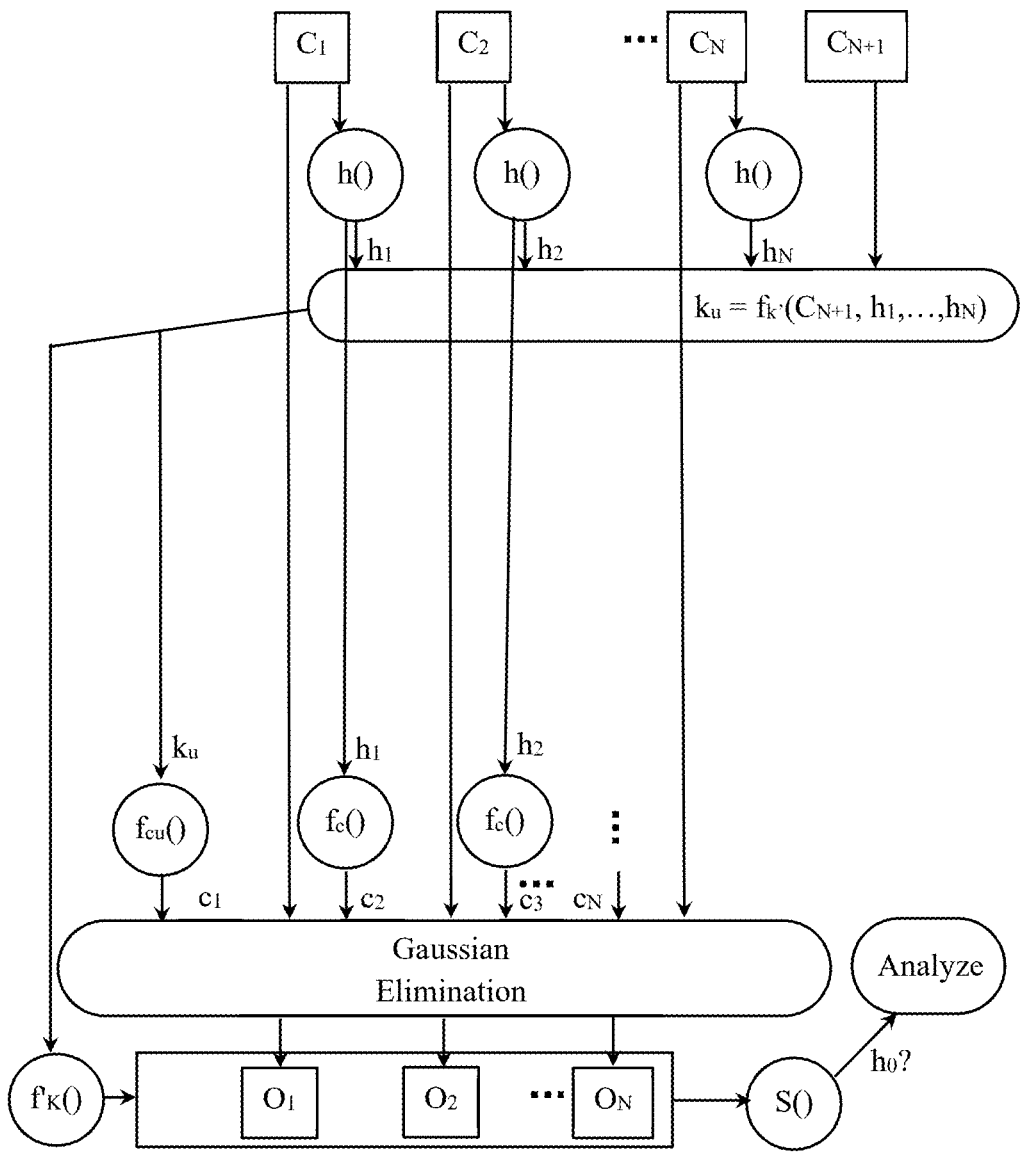
FIG. 5 illustrates a method and apparatus that can provide decoding to original data.

FIG. 5 illustrates method and apparatus aspects of decoding a set of LNC-coded packets $C_1, \ldots, C_{N+1}$. Some operations are the same as shown FIG. 3. Differences are highlighted here. The decoding operation $f_{K'}( )$ produces $h_u$ or the key $k_u$. Coefficient vector $c_1$ is produced from $h_u$ or $k_u$. Here, the coefficient vector $c_1$ is generated from function $f_{cu}( )$ that operates on $k_u$. Also shown is a decryption operator $f'_{K'}( )$ that employs $k_u$ to decrypt the encrypted packets produced from Gaussian elimination, to recover the original data packets $O_1, \ldots, O_N$. Verification can comprise verification of a proof produced by the prover, such as disclosed herein. Verification might (e.g., additionally) comprise some processing operations S( ) and analysis to verify that original data packets $O_1, \ldots, O_N$ were indeed recovered. Processing and analysis might comprise statistical or other types of analyses to determine that the recovered data is not counterfeit data, such as by comparing results of the analysis to external (e.g., public) information that characterizes the original data, or by evaluating statistical properties of the decrypted result to determine if the result resembles random data, in which case, it is likely counterfeit data.

Figure 6A:
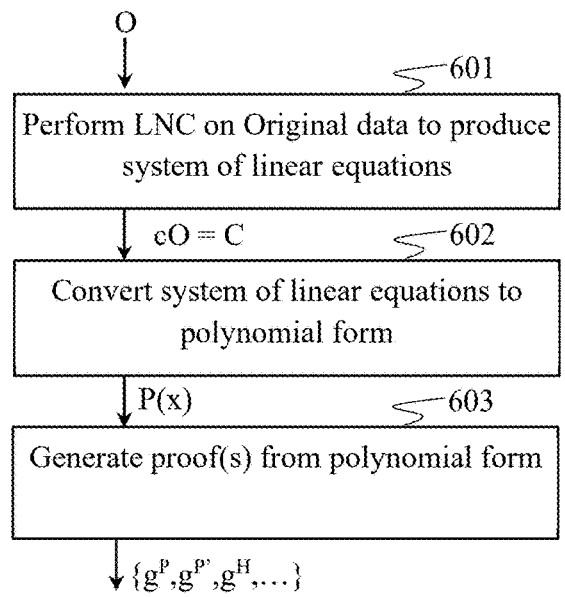
FIG. 6A illustrates method and apparatus aspects for generating a cryptographic proof.

FIG. 6A illustrates method and apparatus expects for generating a cryptographic proof Original data O, such as any type of content (e.g., data) corresponding to an NFT, is operated upon by a linear network coding (LNC) operation 601 to produce a system of linear equations, cO=C. This can involve chaining the coefficient vectors by creating at least some of the coefficient vectors (e.g., $c_{n+1}$) as a function of a one-way function (e.g., cryptographic hash) operating on a previous coded packet $C_n$. The system of linear equations, cO=C, is converted 602 to a polynomial form (illustrated here as P(x)). A cryptographic proof is generated 603 from the polynomial form (e.g., P(x)). Aspects of each of these features are disclosed throughout the written description.

Figure 6B:
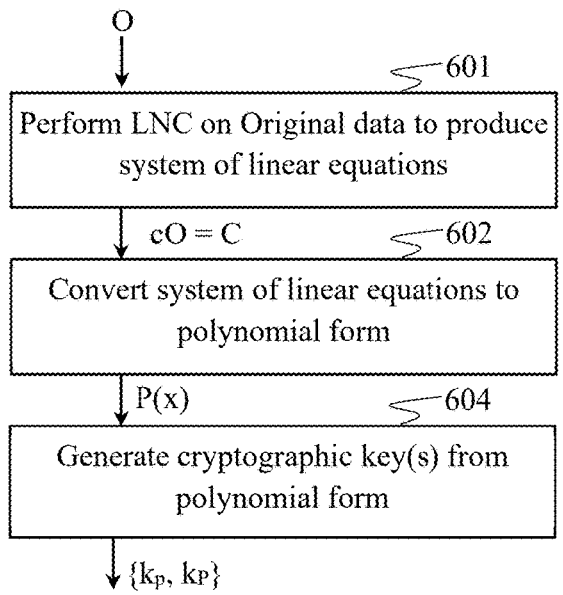
FIG. 6B illustrates method and apparatus aspects for generating cryptographic keys.

In FIG. 6B, cryptographic key(s) is (are) generated 604 from the polynomial form. For example, a public/private key pair might be produced. The key(s) might be used to encrypt (and decrypt) the coded data C. In one instance, one of the keys (such as the private key of a key pair) may be encrypted in the $C_{N+1}$ packet. In another instance, a key (e.g., the public key of a key pair) might encrypt the $C_{N+1}$ packet.

Off-chain server(s) 120 can provide for method and/or apparatus implementations of linear network coding and/or decoding 123 of one or more original data files. A system of linear equations that represents linear network coded original data vector O is:

$$C = cO$$

where c is an MXN coefficient matrix, O is the NX1 original data vector, and C is the MX1 coded data vector (typically, M≥N) can be interpreted as an equation over polynomials. Provisioning of polynomials from LNC data structures can be implemented via proof generator 125 and/or key manager 126, as follows. In some aspects, a private key might be provisioned that comprises the coefficient matrix c.

$$\begin{bmatrix} C_0 \\ C_1 \\ \vdots \\ C_{M-1} \end{bmatrix} = \begin{bmatrix} c_{0,0} & c_{0,1} & \cdots & c_{0,N-1} \\ c_{1,0} & c_{1,1} & \cdots & c_{1,N-1} \\ \vdots & \vdots & \ddots & \vdots \\ c_{M-1,0} & c_{M-1,1} & \cdots & c_{M-1,N-1} \end{bmatrix} \begin{bmatrix} O_0 \\ O_1 \\ \vdots \\ O_{N-1} \end{bmatrix}$$

For the generalization $x_n = O_n$, n=0, ..., N−1, in the system of linear equations, polynomials $p_n(x)$ of degree <M can be provisioned. For example, $p_0(x)$ is the degree <M polynomial that evaluates to $(c_{0,0}, c_{1,0}, \ldots, c_{M-1,0})$ at the coordinates (0, 1, ..., M−1); $p_1(x)$ is the degree <M polynomial that evaluates to $(c_{0,1}, c_{1,1}, \ldots, c_{M-1,1})$ at the coordinates (0, 1, ..., M−1); ... $p_{N-1}(x)$ is the degree <M polynomial that evaluates to $(c_{0,N-1}, c_{1,N-1}, \ldots, c_{M-1,N-1})$ at the coordinates (0, 1, ..., M−1). q(x) is the degree <M polynomial that evaluates to $(C_0, C_1, \ldots, C_{M-1})$ at the coordinates (0, 1 ..., M−1).

Thus, polynomial $p_0(x)$ expresses the set of (x,y) coordinates $((0,c_{0,0}), (1,c_{1,0}), \ldots, (M-1,c_{M-1,0}))$; polynomial $p_1(x)$ expresses the set of (x,y) coordinates $((0,c_{0,1}), (1,c_{1,1}), \ldots, (M-1,c_{M-1,1}))$; ... ; polynomial $p_{N-1}(x)$ expresses the set of (x,y) coordinates $((0,c_{0,N-1}), (1,c_{1,N-1}), \ldots, (M-1,c_{M-1,N-1}))$. Polynomial q(x) expresses the set of (x,y) coordinates $((0, C_0), (1, C_1), \ldots, (M-1, C_{M-1}))$.

In some instances, different ones (or sets) of the aforementioned polynomials may be stored on different nodes (e.g., on-chain; and/or off-chain, such as on one or more server nodes 120, clients, and/or storage network 130). Each one (or set) of these polynomials may be provided with a corresponding commitment. Proofs may be employed. In one example, the aforementioned polynomials corresponding to original data O may be verified via an interactive or non-interactive proof by a Verifier prior to gathering corresponding data from each node, and decoding the original data. An on-chain smart contract might be programmed to act as the verifier.

Lagrange Interpolation (or some more computationally efficient algorithm) converts each set of (x,y) coordinates to its corresponding polynomial $p_n(x)$, n=0, ..., N−1. Other examples include Newton polynomial, Neville's algorithm, or a fast Fourier transform method. Such methods find a polynomial of degree at most d which passes through a set of d+1 points such that for each point $\{x_i, y_i\}_{i \in (d+1)}$, the polynomial evaluated at $x_i$ is equal to $y_i$. This can produce the polynomial equation $$p_0(x)x_0 + p_1(x)x_1 + \ldots + p_{N-1}(x)x_{N-1} = q(x)$$

or variants thereof. In one example, the following polynomial equation can be produced:

$$p_0(x)x_0 + p_1(x)x_1 + \ldots + p_{N-1}(x)x_{N-1} - q(x) = 0$$

In another example, a form of the following polynomial equation can be produced:

$$p_0(x)x_0 + p_1(x)x_1 + \ldots + p_{N-1}(x)x_{N-1} - q(x) = Z(x)H(x)$$

where $Z(x) = (x-0)(x-1) \ldots (x-(M-1))$ is the target polynomial, which has cofactors (x−x(m)), m=0, ..., (M−1). This example can also be expressed as:

$$P(x) = Z(x)H(x)$$

P(x) has all the roots of Z(x). This fact may be the subject of a proof There is some polynomial H(x) that may be found via division H(x)=P(x)/Z(x).

In another example, $p_0(x)x_0 + p_1(x)x_1 + \ldots + p_{N-1}(x)x_{N-1}$ is provisioned as L(x)R(x), and the following form of polynomial equation can be produced:

$$L(x)R(x) = Z(x)H(x) + q(x)$$

In another example, $p_0(x)x_0 + p_1(x)x_1 + \ldots + p_{N-1}(x)x_{N-1}$ is provisioned as L(x)+R(x), and the following form of polynomial equation can be produced:

$$L(x) + R(x) = Z(x)H(x) + q(x)$$

A polynomial evaluation proof may be based on a commitment C' relative to a set of points, $\{G_0, G_1, \ldots, G_{N-1}\}$, wherein C' was constructed from a linear combination of the coefficients, (e.g., $c_{m,n}$). This may be implemented with a Pedersen commitment scheme. Any of the disclosed aspects may employ bulletproofs, Kate commitments, and/or FRI. Proofs can be made non-interactive, such as by using the Fiat-Shamir heuristic.

The above examples can produce a degree <M polynomial P(x). However, alternative examples may provide for bivariate polynomials. In one example, a polynomial P(x,y) can be generated such that $P(x,y)=P(x,x^a)=P(x)$. This might be done by, for each $k^{th}$-degree term in P(x), where k=(mN+ n) corresponding to a particular $c_{m,n}$ (m=0, ..., M−1; n=0, ..., N−1), $x^k=x^{k \% N} y^{floor(k/N)}$, where $y=x^a=x^N$. A prover may make a commitment (e.g., a Merkle tree or some other commitment) to the evaluation of P(x,y) over the entire resulting M×N matrix. Verification may involve randomly selecting rows and/or columns of the M×N matrix via some source of pseudo-randomness, and the prover provides the corresponding data points and Merkle branches.

A polynomial commitment can be a small object that represents a polynomial, and can enable an evaluator to verify evaluations of that polynomial without requiring all of the data in the polynomial. A commitment can be implemented by making a Merkle tree of an evaluation, or some other evaluation based on cryptographic hashes may be made, for example, such as any of the techniques disclosed herein. If a prover provides a commitment c representing P(x), then a proof can verify that the value of p(z) corresponds to a particular value of z. A proof may comprise Merkle branches to verify data with respect to a commitment. Such a proof may be interactive or non-interactive. To perform a zk-SNARK, the above problem can be converted to a quadratic arithmetic program (QAP). The zk-SNARK can then operate on the problem in QAP form. Along with the process for converting code of a function into a QAP, another process can be run alongside that provides an input to the problem and produces a corresponding solution (sometimes called "witness" to the QAP). Then a "zero knowledge proof" can be created for the witness, and a separate process may be performed for verifying a proof that the verifier receives from an external source.

The mathematics described herein can be advantageously employed over a prime field. Some aspects may employ a Galois field. In the following examples, "g" is a generator of a finite field group. A key holder may wish to prove knowledge of polynomial P, which is the knowledge of the linear network coded coefficients (i.e., matrix c). A proof can comprise receiving encrypted powers of a secret value s ($E(s^i)=g^{s^i}$) and using those encrypted powers (e.g., $g^1$, $g^s$, $g^{s^2}$, $g^{s^3}$ ...) to calculate $g^P$ and $g^H$. A knowledge of exponent assumption (KEA) may be implemented whereby the encrypted powers comprise shifted versions (e.g., $\alpha s^i$) of the encrypted powers. The prover might apply some random coefficient δ to the encrypted powers (e.g., $(g^P)^\delta$, $(g^{P'})^\delta$, $(g^H)^\delta$) before computing $g^P$, $g^{P'}$, and $g^H$ values. The verifier checks if P=ZH in encrypted space: e.g., $(g^P)^\delta=((g^H)^\delta)^{Z(s)}$ and $((g^P)^\delta)^\alpha=(g^{P'})^\delta$. The shifts, α, and all necessary powers of s with corresponding α-shifts can be encrypted ($g^\alpha$, $g^s$, $g^{\alpha s^i}$ for i in 0, 1, ..., d) via a common reference string, or CRS, or composite CRS method; and may further include encrypted evaluation of the target polynomial, $g^{Z(s)}$. The following keys can be produced:

Proving Key: $g^{s^i}$, $g^{\alpha s^i}$
Verifying key: $g^\alpha$, $g^{t(s)}$

In some aspects, an interactive protocol can be made into a non-interactive one by using a hash function to pick the challenge.

Figure 6C:
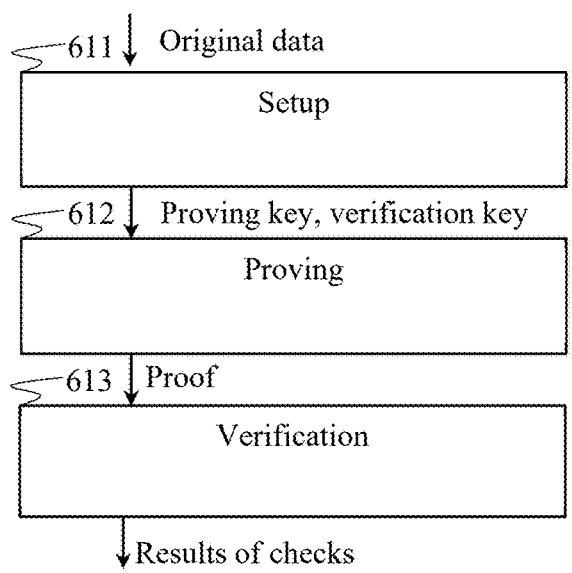
FIG. 6C illustrates method and apparatus aspects for provisioning a cryptographic proof.

FIG. 6C illustrates method and apparatus aspects of a proving protocol. A setup 611, proving 612, and verification 613 are shown. As explained below, each of 611, 612, and 613 may individually be a claimed implantation.

In the setup 611, a generator g and cryptographic pairing e are selected. Also, linear network coding is performed on original data O to produce a system of linear equations (which can be a function of the form f(u)=y with n total variables, of which m are input/output variables) converted into polynomial form, $(\{l_i(x), r_i(x), o_i(x)\}_{i \in \{0, ..., n\}}, t(x))$ of degree d and size n+1, where here, n corresponds to a total number of variables in the function that is converted to polynomial form. Random samples, s, $\rho_l$, $\rho_r$, $\alpha_l$, $\alpha_r$, $\alpha_o$, β, γ can be generated. Next, compute $\rho_o=\rho_l \cdot \rho_r$ and the operand generators, $g_l=g^{\rho_l}$, $g_r=g^{\rho_r}$, $g_o=g^{\rho_o}$. Then the proving key is set as follows:

$$\left(\{g^{s^k}\}_{k \in [d]}, \{g_l^{l_i(s)}, g_r^{r_i(s)}, g_o^{o_i(s)}\}_{i \in \{0, ..., n\}},\right.$$
$$\left.\{g_l^{\alpha_l l_i(s)}, g_r^{\alpha_r r_i(s)}, g_o^{\alpha_o o_i(s)}, g_l^{\beta_l l_i(s)}, g_r^{\beta_r r_i(s)}, g_o^{\beta_o o_i(s)}\}_{i \in \{m+1, ..., n\}}\right)$$

Optionally, or a zero-knowledge proof, the following proving key is set in addition to the proving key shown above:

$$g_l^{t(s)}, g_r^{t(s)}, g_o^{t(s)}, g_l^{\alpha_l(s)}, g_r^{\alpha_r(s)}, g_o^{\alpha_o(s)}, g_l^{\beta_l(s)}, g_r^{\beta_r(s)}, g_o^{\beta_l(s)}$$

The verification key can be set as follows:

$$g^l, g_o^{t(s)}, \{g_l^{l_i(s)}, g_r^{r_i(s)}, g_o^{o_i(s)}\}_{i \in \{0, ..., n\}}, g^{\alpha_l}, g^{\alpha_r}, g^{\alpha_o}, g^\gamma, g^{\beta\gamma}$$

Proving 612 can comprise the following. For input u, compute f(u) to obtain values $\{v_i\}_{i \in \{m+1, ..., n\}}$ for all intermediary variables. All the values are then assigned to unencrypted variable polynomials $$L(x) = l_o(x) + \sum_{i=1}^{n} v_i \cdot l_i(x),$$

and similarly for R(x), O(x). Determine h(x) from:

$$h(x) = \frac{L(x)R(x) - O(x)}{t(x)}$$

assign the prover's variable values to the encrypted variable polynomials:

$$g_l^{L_p(s)} = \prod_{i=m+1}^{n} \left(g_l^{l_i(s)}\right)^{v_i}$$

and similarly for $g_r^{R_p(s)}$ and $g_o^{O_p(s)}$;

assign α-shifted pairs:

$$g_l^{L'_p(s)} = \prod_{i=m+1}^{n} \left(g_l^{\alpha_l l_i(s)}\right)^{v_i}$$

and similarly for $g_r^{R'_p(s)}$ and $g_o^{O'_p(s)}$;

assign the variable values consistency polynomials:

$$g^{Z(s)} = \prod_{i=m+1}^{n} \left(g_l^{\beta l_i(s)} g_r^{\beta r_i(s)} g_o^{\beta o_i(s)}\right)^{v_i}$$

and compute the proof:

$$G = (g_l^{L_p(s)}, g_r^{R_p(s)}, g_o^{O_p(s)}, g^{h(s)}, g_l^{L'_p(s)}, g_r^{R'_p(s)}, g_o^{O'_p(s)}, g^{Z(s)})$$

In the case of a zero-knowledge proof, proving 612 is adapted as follows. Random sample values $\delta_l$, $\delta_r$, $\delta_o$ are produced, and h(x) is computed from:

$$h(x) = \frac{L(x)R(x) - O(x)}{t(x)} + \delta_r L(x) + \delta_l R(x) + \delta_l \delta_r t(x) - \delta_o$$

The zero-knowledge δ-shift is applied as follows:

$$g_l^{L_p(s)} = \left(g_l^{t(s)}\right)^{\delta_l} \prod_{i=m+1}^{n} \left(g_l^{l_i(s)}\right)^{v_i}$$

and similarly for $g_r^{R_p(s)}$ and $g_o^{O_p(s)}$;

$$g_l^{L'_p(s)} = \left(g_l^{\alpha_l t(s)}\right)^{\delta_l} \prod_{i=m+1}^{n} \left(g_l^{\alpha_l l_i(s)}\right)^{v_i}$$

and similarly for $g_r^{R'_p(s)}$ and $g_o^{O'_p(s)}$; and $$g^{Z(s)} = \left(g_l^{\beta t(s)}\right)^{\delta_l} \left(g_r^{\beta t(s)}\right)^{\delta_r} \left(g_o^{\beta t(s)}\right)^{\delta_o} \prod_{i=m+1}^{n} \left(g_l^{\beta l_i(s)} g_r^{\beta r_i(s)} g_o^{\beta o_i(s)}\right)^{v_i}$$

Figure 6D:
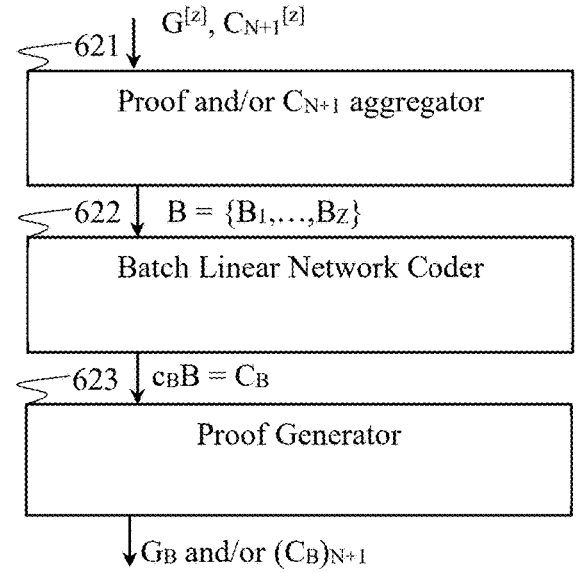
FIG. 6D illustrates method and apparatus aspects for generating a cryptographic proof.

Verification 613 can be performed as follows. A provided proof is parsed as
$(g_l^{L_p}, g_r^{R_p}, g_o^{O_p}, g^h, g_l^{L'_p}, g_r^{R'_p}, g_o^{O'_p}, g^Z)$ The next step assigns input/output values to the verifier's encrypted polynomials and add to 1:

$$g_l^{L_v(s)} = g_l^{l_0(s)} \prod_{i=m+1}^{n} \left(g_l^{l_i(s)}\right)^{v_i}$$

and similarly for $g_r^{R_p(s)}$ and $g_o^{O_p(s)}$;

The next step provides for a variable polynomials restriction check:

$e(g_l^{L_p}, g_l^{\alpha_l}) = e(g_l^{L'_p}, g)$ and similarly for $g_r^{R_p}$ and $g_o^{O_p}$;

The next step provides for a variable values consistency check:

$e(g_l^{L_p} g_r^{R_p} g_o^{O_p} g^{\beta \gamma}) = e(g^Z, g^\gamma)$ and a valid operations check:

$e(g_l^{L_p} g_l^{L_v(s)}, g_r^{R_p} g_r^{R_v(s)}) = e(g_o^{t(s)}, g^h) \cdot e(g_o^{O_p} g_o^{O_v(s)}, g)$ FIG. 6D illustrates method and apparatus aspects for batching NFTs or blockchain records. An aggregator 621 collects a plurality Z of proofs $G^{[z]}$, polynomials, and/or (small) key data structures $C_{N+1}^{[z]}$, z=1, . . . , Z, produced for each of up to Z original data files (e.g., blockchain records, NFTs, rollups, etc.). Each of the proofs $G^{[z]}$ and/or key data structures $C_{N+1}^{[z]}$ might be stored off-chain or on a Layer 2 blockchain. For each original data file, a user (e.g., data owner) might have a (big) key that contains or corresponds to the system of linear equations (cO=C) computed from the original data file. Each batch B={$B_1$, . . . , $B_Z$} produced by the aggregator 621 comprises Z elements (e.g., proofs $G^{[z]}$, polynomials, key data structures $C_{N+1}^{[z]}$, or sets thereof). The aggregator 621 might produce multiple batches.

A batch linear network coder 622 can produce a system of linear equations ($c_B B = C_B$), comprising linear combinations of the batch elements {$B_1$, . . . , $B_Z$} according to LNC techniques disclosed herein. The coder 622 might send a (big) batch key that contains or corresponds to the system of linear equations for the batch {$B_1$, . . . , $B_Z$} to each data owner, and/or to some data storage, such as a Cloud or file-sharing network. Thus, each data owner might have the same (big) batch key and a (different) original data key. A batch may be referred to as a rollup, a block, or some other terminology. Such terminology might be used to refer to a batch. The coder 622 might chain the multiple (e.g., a sequence) of batches together.

A proof generator 623 might convert the system of linear equations ($c_B B = C_B$) into a proof GB and/or key data structure $(C_B)_{N+1}$ corresponding to the batch B. The proof generator 623 might send the proof GB and/or key data structure $(C_B)_{N+1}$ to each data owner for each original data file in the batch. Thus, each data owner might have the same batch proof GB and/or (small) batch key data structure $(C_B)_{N+1}$ and at least one original data key that is specific to their original data. In some aspects, the proof generator 623 might store the proof GB and/or key data structure $(C_B)_{N+1}$ on a blockchain, such as a Layer 1 or Layer 2 blockchain.

It should be appreciated that the above techniques might be applied to batch multiple batches together into a block, and produce proofs, systems of equations, and/or key data structures therefrom. Such operations may be performed recursively to create multiple batches of batches for any number of recursion layers.

Figure 7A:
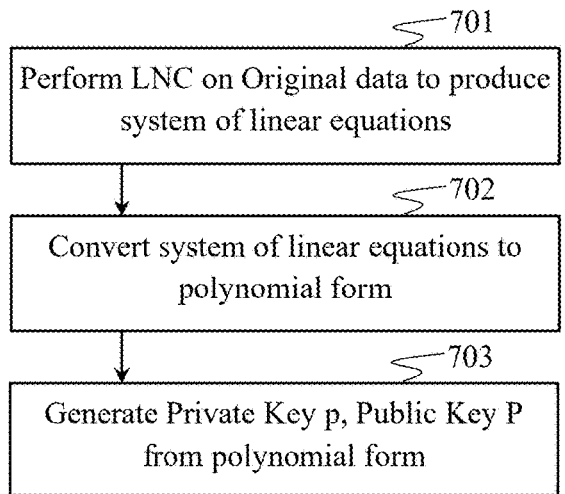
FIG. 7A illustrates key generation based on LNC according to some aspects of the disclosure.

In one aspect depicted in FIG. 7A, linear network coding is performed 701 on original data to produce a system of linear equations, which is converted 702 to polynomial form, and a private key p and public key P can be generated 703 therefrom.

In one example, a set of linear equations produced via linear network coding is converted to polynomial form:

$$p(x) = \sum_{n=0}^{N-1} \gamma_n x^n$$

An encrypted polynomial P(x) can be evaluated as follows:

$$P(x) = \prod_{n=0}^{N-1} \left(g^{x^n}\right)^{\gamma_n}$$

at some value of x and generator g, wherein the polynomial has degree equal to or less than N−1. P(x) might be a public key elliptical curve point {x,y} corresponding to private key p(x). Here, n is an index from 0 to N−1. A message m might be in polynomial form.

In one aspect, a signing algorithm (e.g., RFC 6979) takes as input a message m plus a private key p and produces as output a signature, which consists of a pair of values {R.x, s}. The signing algorithm might be based on the ElGamal signature scheme. The public key P is an Elliptical Curve point P=p*G (e.g., the private key p, multiplied by the generator point G).

Figure 7C:
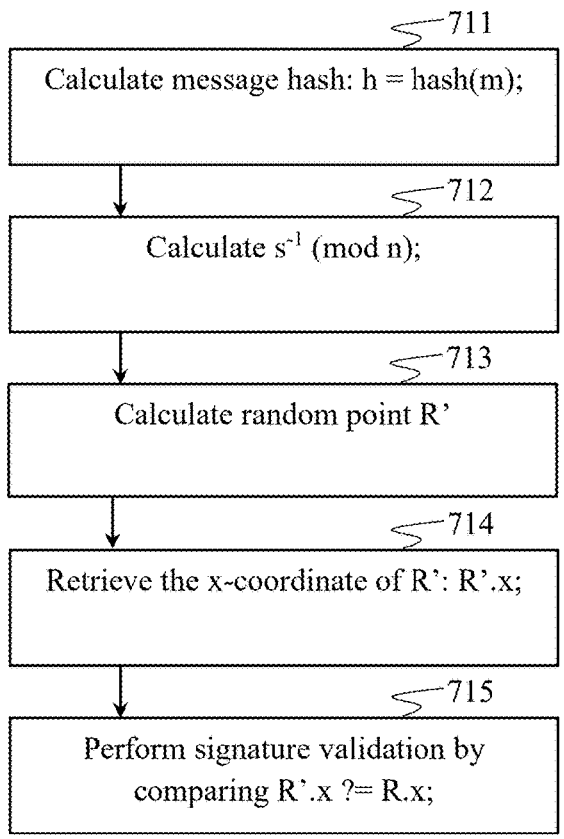
FIG. 7C illustrates a process leading to signature validation.
Figure 7B:
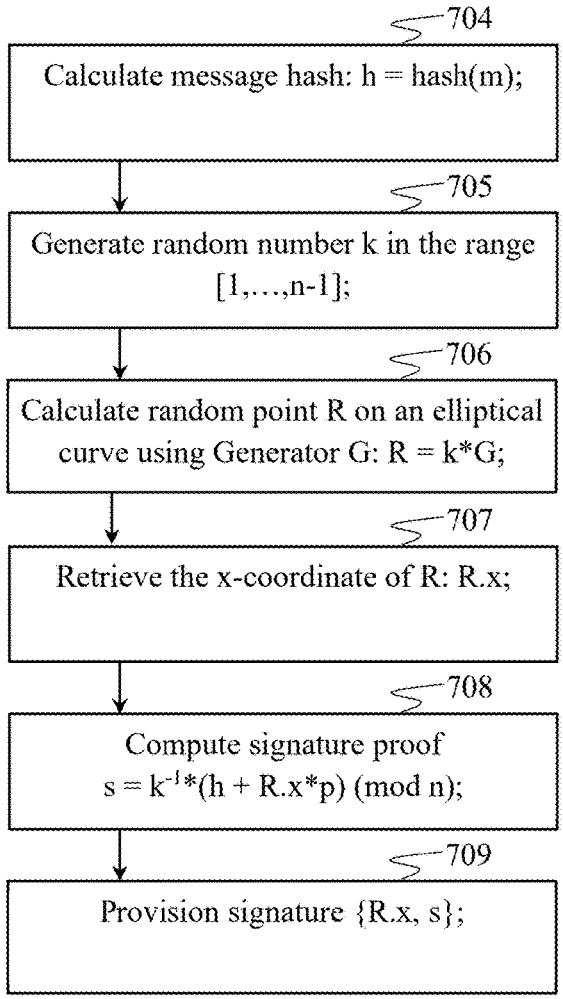
FIG. 7B illustrates a process leading to provisioning a signature.

In FIG. 7B, message hash h is computed 704 from message m: h=hash(m). In some instances, the hash function indicates that the message is hashed to an elliptical curve. A random number k is generated 705. In the case of deterministic-ECDSA, the value k is HMAC-derived from h+p. A random point R on an elliptical curve is calculated 706 using Generator G: R=k*G. The x-coordinate (R.x) of R is extracted 707. A signature proof $s=k^{-1}*(h+R.x*p) \pmod{n}$ is computed 708. A signature {R.x, s} is provisioned 709. The proof s can then be verified using the public key P and the signature. Steps (e.g., 704-709) in FIG. 7B can be performed following the steps 701-703 in FIG. 7A.

In FIG. 7C, message hash h is computed 711 from the message m: h=hash(m), or otherwise obtained. The inverse of s, $s^{-1} \pmod{n}$, is computed 712. The random point R' can then be computed 713 from values known at the verifier. For example, from $s=k^{-1}*(h+R.x*p) \pmod{n}$, R is expressed by:

$$R = k*G = (h+R.x*p)*s^{-1}*G;$$

so the verifier can compute an estimated R, i.e., $R'=(h*s^{-1})*G+(R.x*s^{-1})*P$; all the components of which are known to the verifier. The x-coordinate (R'.x) of R' is provisioned 715, and signature validation can be performed 716 by comparing R'.x to R.x.

In some examples, a Schnorr signature method may be employed. The signature can comprise {R, s}, where s=k+hash(P,R,m)*p. Verification can comprise checking that s*G=R+hash(P,R,m)*P.

The message m might comprise the original data O or the $C_{N+1}$ packet. In one aspect, a message-specific key pair might be employed. Key encapsulation (KEM) might be used to encrypt (via public key encryption) another key used to encrypt the O and/or C packets. Key wrapping might might be used to encrypt another key used to encrypt the O and/or C packets. Some aspects can provide for adding together multiple (e.g., K) signature verification equations. Verification can comprise determining if: $(s_0+s_1+\ldots+s_{K-1})*G=(R_0+R_1+\ldots+R_{K-1})+hash(P_0,R_0,m_0)*P_0+\ldots+hash(P_{K-1}, R_{K-1},m_{K-1})*P_{K-1}$ In some aspects, multiple private keys ($p_0, \ldots, p_{K-1}$) can be used to generate a shared signature corresponding to a shared public key, $P=P_0+\ldots+P_{K-1}=p_0*G+\ldots+p_{K-1}*G$. In one example, for each private key, a random number $k_0$ to $k_{K-1}$ is generated, a random point $R_0=k_0*G$ to $R_{K-1}=k_{K-1}*G$ is computed, a common hash (hash(P, $R_0+\ldots+R_{K-1}$,m) is calculated, and $(s_0=k_0+hash(P,R,m)*p_0, \ldots, S_{K-1}=k_{K-1}+hash(P,R,m)*p_{K-1})$ is computed. The shared public key P signature is $(R_0+\ldots+R_{K-1}, s_0+\ldots+s_{K-1})$. MultiSig or Merkle MultiSig can be employed.

In some instance, Boneh-Lynn-Shacham signatures can be employed. For example, to calculate a signature, the message m is hashed to the elliptical curve to produce H(m), which is multiplied by a private key: S=p*H(m). Thus, the signature S is a single point on the curve. To verify the signature, the public key P is used to check e(P,H(m))=e(G, S), where e( ) is an appropriately selected pairing function that maps two points (P,Q) on a curve to a number: e(P,Q)→n, according to a predetermined set of constraints.

An aggregated signature (i.e., the sum of K signatures) can be verified via determining if the following equality is true:

$$E(G,S) = e(P_0, H(m_0))^* \ldots {}^*e(P_{K-1}, H(m_{K-1})).$$

In some instances, instead of just summing the keys, a linear combination of the keys may be made such that $P=a_0*P_0+\ldots+a_{K-1}*P_{K-1}$; $S=a_0*S_0+\ldots+a_{K-1}*S_{K-1}$ The coefficients $a_0, \ldots, a_{K-1}$ may comprise the coefficients $c_n$, or might be calculated deterministically from the public keys.

Figure 8A:
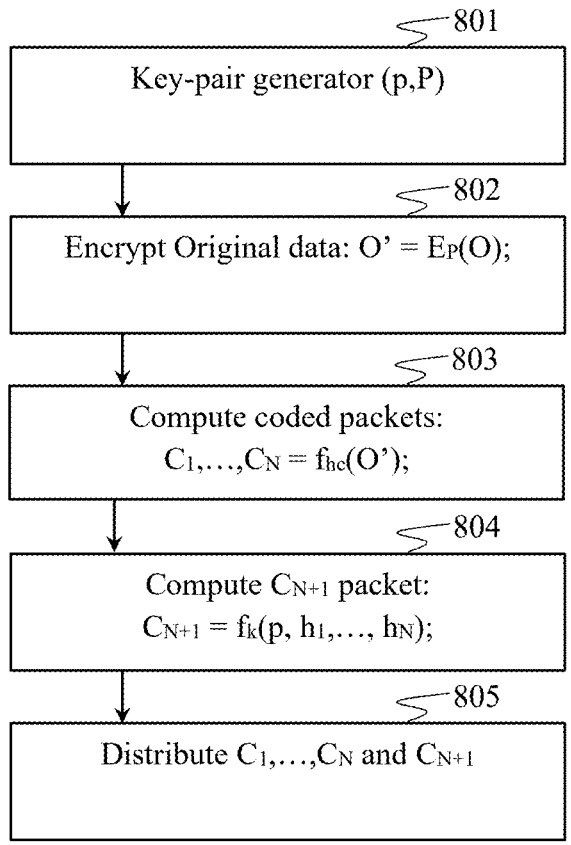
FIGS. 8A and 8B illustrate linear network coding.

FIG. 8A illustrates method and apparatus aspects that can be configured according to aspects of the disclosure. A public/private key pair {P,p} is generated or provisioned 801. For example, a private key might be generated from a function operating on the original data O, $p=f_p(O)$, and the public key P generated therefrom (e.g., P=p*G). Each original data O might have its own key pair. Original data is encrypted 802 using the public key P to produce encrypted original data, $O'=E_P(O)$. Coded packets are computed 803 as linear combinations of the encrypted original data pieces: $C_1, \ldots, C_N=f_{hc}(O')$, such as disclosed herein. The $C_{N+1}$ coded data packet (also referred to as a key) is computed 804 to comprise the private key p or the public key, P. In one example, $C_{N+1}=f_k(p, h_1, \ldots, h_N)$, where $\{h_1, \ldots h_N\}$ can comprise cryptographic hashes of the coded packets, $C_1, \ldots, C_N$. The function $f_k( )$ might XOR its arguments together. The coded packets $C_1, \ldots, C_{N+1}$ might be distributed 805 individually or in groups. For example, $C_1, \ldots, C_N$ might be stored in a file-sharing network as individual components and/or communicated to the original data's owner as a key.

Figure 8B:
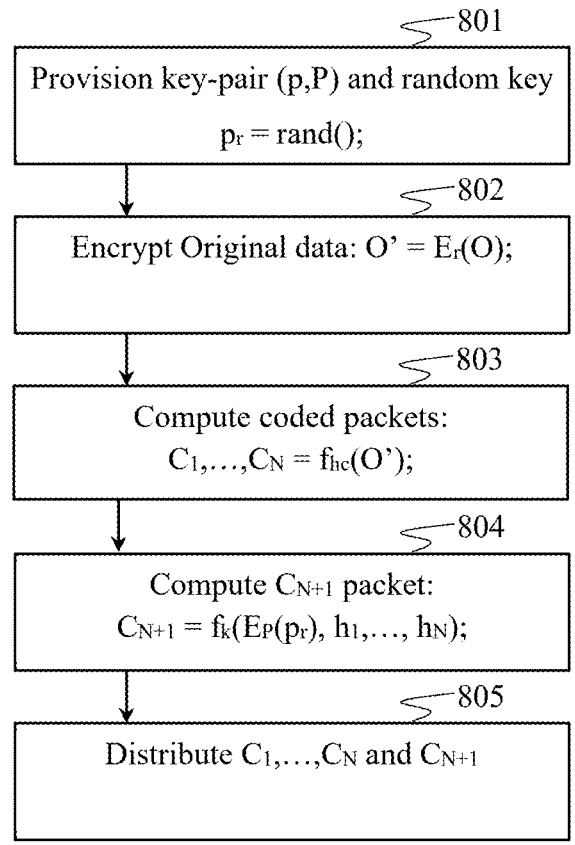

In FIG. 8B, key provisioning 801 includes generating or provisioning a random key, e.g., $p_r$=rando. Original data is encrypted 802 using the random key, e.g., $O'=E_r(O)$. The $C_{N+1}$ coded data packet can be generated 804 with a public-key (P) encrypted ($E_P( )$) random key, e.g., $C_{N+1}=f_k(E_P(p_r), h_1, \ldots, h_N)$. The owner of the original data may hold the private key p corresponding to the public key P. In some instances, the encrypted random key $E_P(p_r)$ might be employed in a (non-interactive or interactive) cryptographic proof. The encrypted random key $E_P(p_r)$ might be employed as a commitment.

Figure 9A:
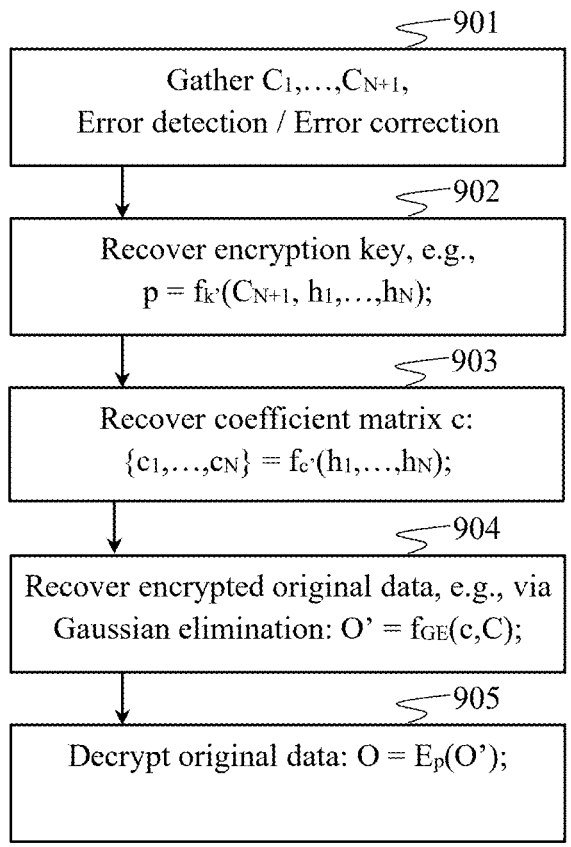
FIGS. 9A and 9B illustrate linear network decoding.

In FIG. 9A, coded packets $C_1, \ldots, C_{N+1}$ are gathered 901, and error detection/correction may be performed. The encryption key (e.g., p or P) encoded in the $C_{N+1}$ packet is recovered 902. In one example, the private key p might be recovered from the hashes $h_1, \ldots, h_N$ of the coded packets $C_1, \ldots, C_N$, and the $C_{N+1}$ packet: e.g., $p=f_k(C_{N+1}, h_1, \ldots, h_N)$. The coefficient matrix c can be recovered 903 from the hashes $h_1, \ldots, h_N$: $\{c_1, \ldots, c_N\}=f_c(h_1, \ldots, h_N)$. Gaussian elimination (or some other suitable function) 904 recovers the encrypted original data from the coefficients and coded packets: $O'=f_{GE}(c,C)$. The encrypted original data (encrypted with public key P) is then decrypted 905 using the private key p: $O=E_p(O')$.

Figure 9B:
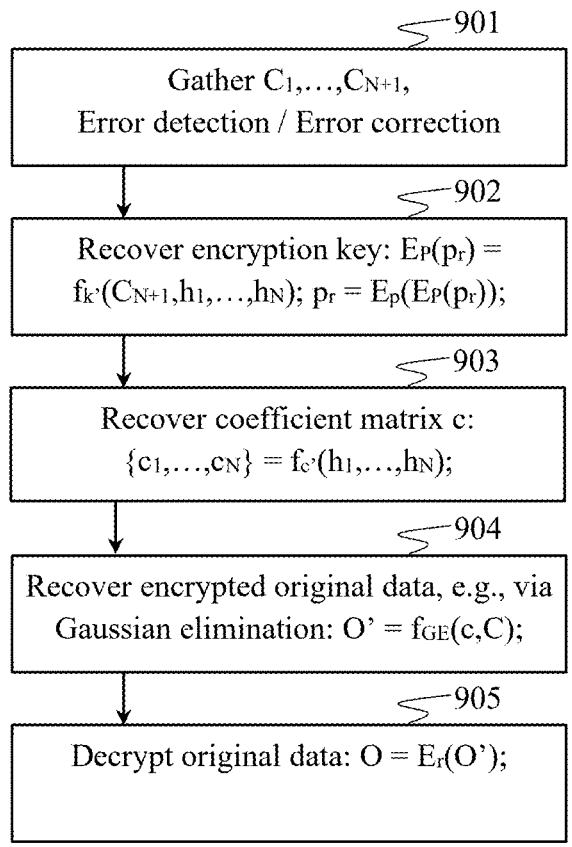

In FIG. 9B, coded packets $C_1, \ldots, C_{N+1}$ are gathered 901, and error detection/correction may be performed on the coded packets. The encrypted random key $E_P(p_r)$ encoded in the $C_{N+1}$ packet is recovered 902. For example, $E_P(p_r)$ might be recovered by XORing the hashes $h_1, \ldots, h_N$ of the coded packets $C_1, \ldots, C_N$, and the $C_{N+1}$ packet: e.g., $E_P(p_r)=f_{k'}(C_{N+1}, h_1, \ldots, h_N)$; and $E_P(p_r)$ is decrypted using the private key p corresponding to the public key P used to encrypt ($E_r(\bullet)$) the random key $p_r$. The coefficient matrix c can be recovered 903 from the hashes $h_1, \ldots, h_{N-1}$: (and possibly from the random key $p_r$) $\{c_1, \ldots, c_N\}=f_c(p_r, h_1, \ldots, h_{N-1})$. Gaussian elimination (or some other suitable function) 904 recovers the encrypted original data from the coefficients and coded packets: $O'=f_{GE}(c,C)$. The encrypted original data is then decrypted 905 using the recovered random key $p_r$: $O=E_r(O')$.

In the examples disclosed herein, instead of decoding the coded packets $C_1, \ldots, C_N$; a candidate original data $O_c$ might be encoded, and a $C_{N+1}$ value (or some other commitment) of the candidate original data $O_c$ might be compared to the $C_{N+1}$ value (or some other commitment) of the true original data O for verification.

Figure 9C:
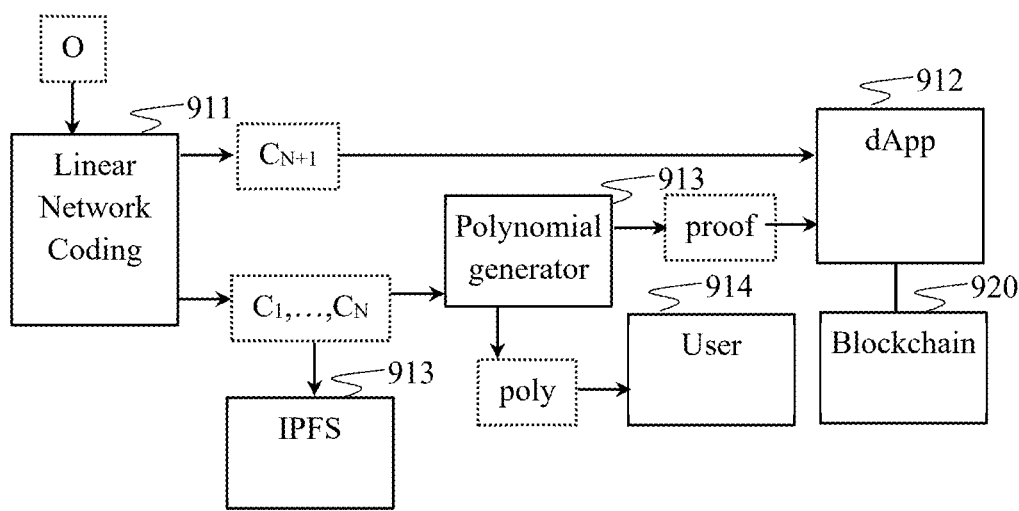
FIG. 9C illustrates a method and apparatus for performing linear network coding and polynomial and proof generation.

In FIG. 9C, linear network coding 911 is performed on original data O to produce coded packets $C_1, \ldots, C_{N+1}$. In some instances, $C_{N+1}$ might be sent to a smart contract 912 residing on a blockchain 920. The coded packets $C_1, \ldots, C_{N+1}$ might be stored on the IPFS 913 or some other storage. A polynomial generator 913 converts the system of linear equations C=cO to polynomial form, and delivers the polynomial form to the user 914 and might provide a proof generated from the polynomial form to the smart contract 912.

Figure 10A:
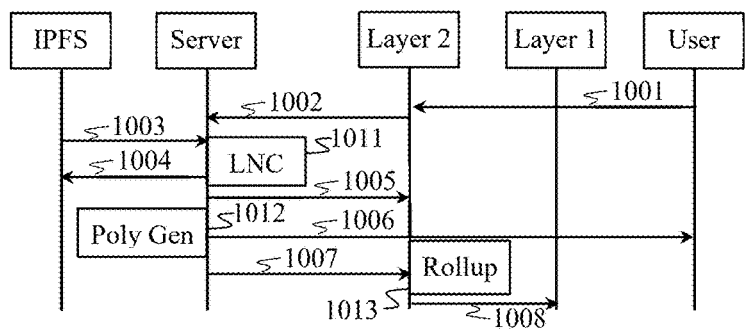
FIG. 10A illustrates message flow between various parties in a coding process.

In FIG. 10A, a user device sends a request 1001 to a smart contract residing on a Layer 1 or Layer 2 blockchain. Upon processing the request 1001, the smart contract forwards 1002 the request to an off-chain server. The server retrieves 1003 original data O, such as from a file-sharing network (e.g., IPFS), the user device, or some other server. The server performs linear network coding (LNC) 1011 on the original data O to produce coded data packets $C_1, \ldots, C_N$ and coded packet $C_{N+1}$. The coded packets $C_1, \ldots, C_N$ may be sent 1004 to the IPFS, the user, Cloud storage, or some other storage. Other information produced in LNC 1011, such as encryption keys, might be sent (not shown) to the user. The coded packet $C_{N+1}$ can be sent 1005 to the (Layer 2 or Layer 1) blockchain and/or the user. The off-chain server (or user device) might optionally employ a polynomial generator 1012. The polynomial generator 1012 produces a polynomial function from the system of linear equations produced by the LNC 1011, and the polynomial function can be sent 1006 to the user. The polynomial generator 1012 might produce a proof of the polynomial, such as a zero-knowledge proof, and said proof might be sent 1007 to a smart contract residing on the Layer 2 blockchain. This Layer 2 smart contract (or the off-chain server) might rollup 1013 multiple proofs and/or coded packet $C_{N+1}$ (i.e., one or more batches of such) to be stored (or to effect a state change of a state) on the Layer 1 blockchain.

The rollup 1013 might perform linear network coding on each batch to produce a system of linear equations (comprising batch coded packets $C_1, \ldots, C_N$) from each batch. A corresponding batch coded packet $C_{N+1}$ may be produced 1013. The rollup 1013 might produce a proof and/or a polynomial corresponding to the system of linear equations. The proof and/or $C_{N+1}$ may be sent 1008 to the Layer 1 blockchain to be stored thereon, and/or to effect a state change of a state of a Layer 1 smart contract. Optionally, the polynomial and/or batch coded packets $C_1, \ldots, C_N$ might be sent (not shown) to the user(s), IPFS, Cloud storage, and/or some other storage.

Figures 10B, 10C:
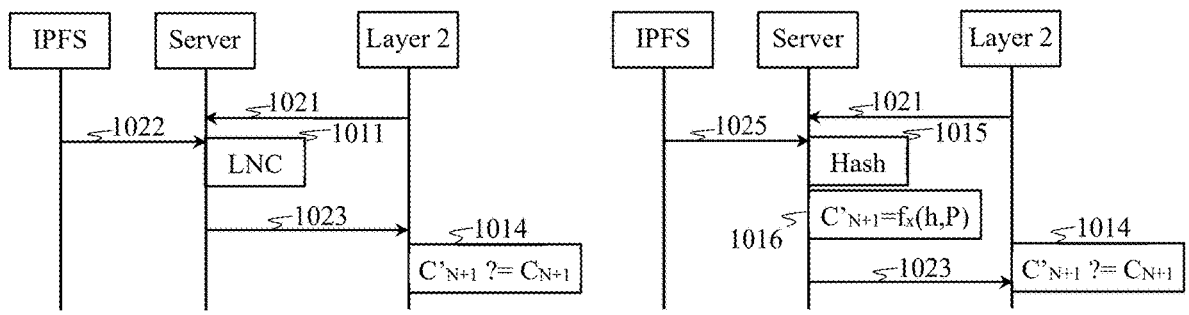
FIGS. 10B-10D illustrate message flow between various parties in a proving/verifying process.

In FIG. 10B, verification of a coded packet's $C_{N+1}$ correspondence to original data O is made. In one example, information provided by a prover (e.g., a user) may be sent 1021 (e.g., by a smart contract on a blockchain) to an off-chain server along with a verification request. The information might include the hash of the original data, an encryption key, or some other information needed by the server to encode the original data O. The server retrieves 1022 the original data O indicated in the request, and performs linear network coding 1011 on the original data to produce an estimated coded packet $C'_{N+1}$. A verifier compares 1014 the estimated coded packet $C'_{N+1}$ with the coded packet $C_{N+1}$ (which may have been supplied by the prover). The verifier might be a smart contract on a Layer 1 or Layer 2 blockchain.

In FIG. 10C, a key pk provided by a prover (e.g., a user) may be sent 1021 (e.g., by a smart contract on a blockchain) to an off-chain server along with a verification request. The key pk might be a public key, a random key, or some other key used to encrypt and/or encode the original data O. The server retrieves 1025 the coded packets $C_1, \ldots, C_N$ indicated in the request, such as from the IPFS or some other storage. Optionally, the server may obtain (e.g., via 1025 or 1021) the corresponding coded packet $C_{N+1}$. The server hashes 1015 the coded packets $C_1, \ldots, C_N$ to obtain hash values (e.g., $h_1, \ldots, h_N$). The server performs a package function $f_x(\ )$ on the hash values ($h_1, \ldots, h_N$) and the key pk to produce a candidate coded packet $C'_{N+1}$. For example, $$C'_{N+1}=p_k \oplus h_1 \oplus \ldots \oplus h_N$$

A verifier compares 1014 the estimated coded packet $C'_{N+1}$ with the coded packet $C_{N+1}$ (which may have been supplied by the prover). The verifier might be a smart contract on a Layer 1 or Layer 2 blockchain. Alternatively, the server might perform the package function $f_x(\ )$ on the hash values ($h_1, \ldots, h_N$) and on the coded packet $C_{N+1}$ instead of key pk to produce an estimated key value $p'_k$, which the verifier compares with the key value pk supplied by the prover.

Figure 10D:
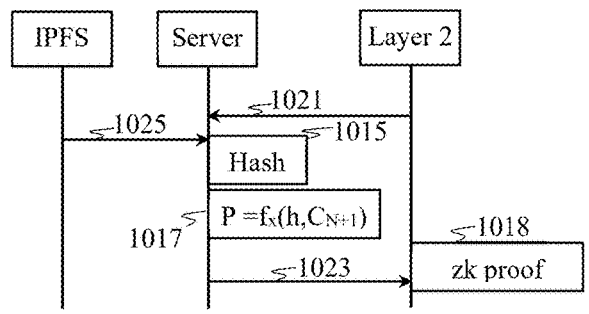

In FIG. 10D, a prover (e.g., user) purportedly holds the private key p corresponding to a public key P used to encrypt the original data O and/or provide at least one set of coefficients $c_n$ corresponding to coded packets $C_1, \ldots, C_N$. In one example, the first coefficient vector $c_1$ is a function of the public key P. For example, given P, $c_1$ might be derived. In some aspects, coefficient vector(s) $c_n$ might (each) be derived from an encrypted ($E_P(\bullet)$) known value, such as the hash of a previous coded packet $C_{n-1}$.

A verifier (e.g., a smart contract on a blockchain) might send 1021 a request to an off-chain server to obtain (e.g., compute or retrieve from memory) 1015 hash values of the coded packets $C_1, \ldots, C_N$ and/or compute the public key (or encrypted value $E_P(\bullet)$) from the hashes and coded packet $C_{N+1}$. In one instance, the server performs a package function $f_x(\ )$ on the hash values ($h_1, \ldots, h_N$) and $C_{N+1}$ to recover the public key:

$$P=C'_{N+1} \oplus h_1 \oplus \ldots \oplus h_N$$

The verifier might otherwise obtain the public key (or encrypted value $E_P(\bullet)$) corresponding to the coded packets $C_1, \ldots, C_N$. In any case, public key P is connected with the original data O. The verifier may then implement 1018 a (interactive or non-interactive) zero-knowledge proof to verify that the prover holds the private key. Any of the proofs disclosed herein might be performed.

In accordance with a Schnorr protocol, which provides the proof of knowledge of a discrete logarithm, the protocol is defined for a cyclic group G of order q with generator g. In order to prove knowledge of $x=\log_q y$ (i.e., $y=g^x$ corresponds to the prover's value of x), the prover and verifier can interact as follows:

1. The prover commits to random value r by sending commitment $t=g^r$.
2. The verifier proposes a random challenge c.
3. The prover responds with s=r+cx reduced modulo the order of the group.
4. The verifier determines if $g^s=ty^c$.

In a typical zero-knowledge proof of a statement, the prover will use a witness for the statement as input to the protocol, and the verifier will learn nothing other than the truth of the statement. The proof 1018 might comprise the following steps:

1. Set known prime p and generator g of the multiplicative group of the field $Z_p$.
2. Prover calculates $y \equiv g^x \mod p$; y is public (e.g., y is P).
3. Prover picks random numbers $r \in U[0, p-2]$ and calculates $C \equiv g^r \mod p$; C is public.
4. In response to challenge, Prover reveals either a) $(x+r) \mod (p-1)$ or r.
5. Verifier verifies a) $(C \cdot y) \mod p \equiv g^{(x+r) \mod (p-1)} \mod p$; or b) $C \equiv g^r \mod p$.

A proof may comprise Merkle branches to verify data with respect to a commitment. Such a proof may be interactive or non-interactive. In one aspect, a computer program might update a Merkle tree as leaves are added to the tree. Each leaf might be a data part, such as original data, coded data, AONT packets, commitments, witnesses, proofs, etc. A rollup of such data parts might be provisioned, such as in an off-chain program, a Layer 2 dApp, and/or a Layer 1 dApp. Responsive to the addition of one or more leaves, a program might provision a state change, such as by updating the root hash (and optionally, branch hashes).

Disclosed aspects can provide for "chaining" together the data parts that become the leaves. The data parts might be part of one or more blocks or a stream. In one example, a chaining process operates sequentially (i.e., the process may sequentially produce the data parts and/or the hashes of the data parts used in a Merkle tree). Disclosed linear network coding chain coded packets together by computing each coded packet's coefficient matrix as a function of one or more previous coded packets. In another example, a cryptographic hash corresponding to a coded packet can be made a function of the coded packet and at least one other (e.g., a previous) coded packet. The function might comprise concatenation, XOR, sum, and/or one or more other operations. Thus, the coded packet might contribute to multiple hash values in a Merkle tree.

A Merkle tree provides a quick way of discovering corrupted or counterfeit data. In one example, each leaf node might be the hash ($h_{00}, \ldots, h_{07}$) of a corresponding data part ($d_0, \ldots, d_7$). A branch node is the hash of the pair of concatenated or summed hashes feeding into it (e.g., $h_{11}$ is the hash of $h_{00}$ and hoi). Each pair of branch nodes feeds a higher branch node until the top node, or root, ($h_{31}$) is reached. If there is an error in one of the data parts, the computed top hash doesn't agree with its expected value. To find which data part is corrupted, each branch's integrity can be checked, and a path will lead to the faulty data part.

In a collision or pre-image attack, the attacker seeks a counterfeit data part that has the same hash as an authentic data part. If a strong cryptographic hash is used, it might require $10^{32}$ trials to find a counterfeit data part. While this might require billions of years for a processor to find this counterfeit data part, advances in AI and quantum computing might soon easily break such hashes.

One problem with the basic Merkle tree is that the counterfeit data part is not detectable. Since it has the same hash as the authentic data part, the Merkle tree agrees with the measured hashes.

Figure 11:
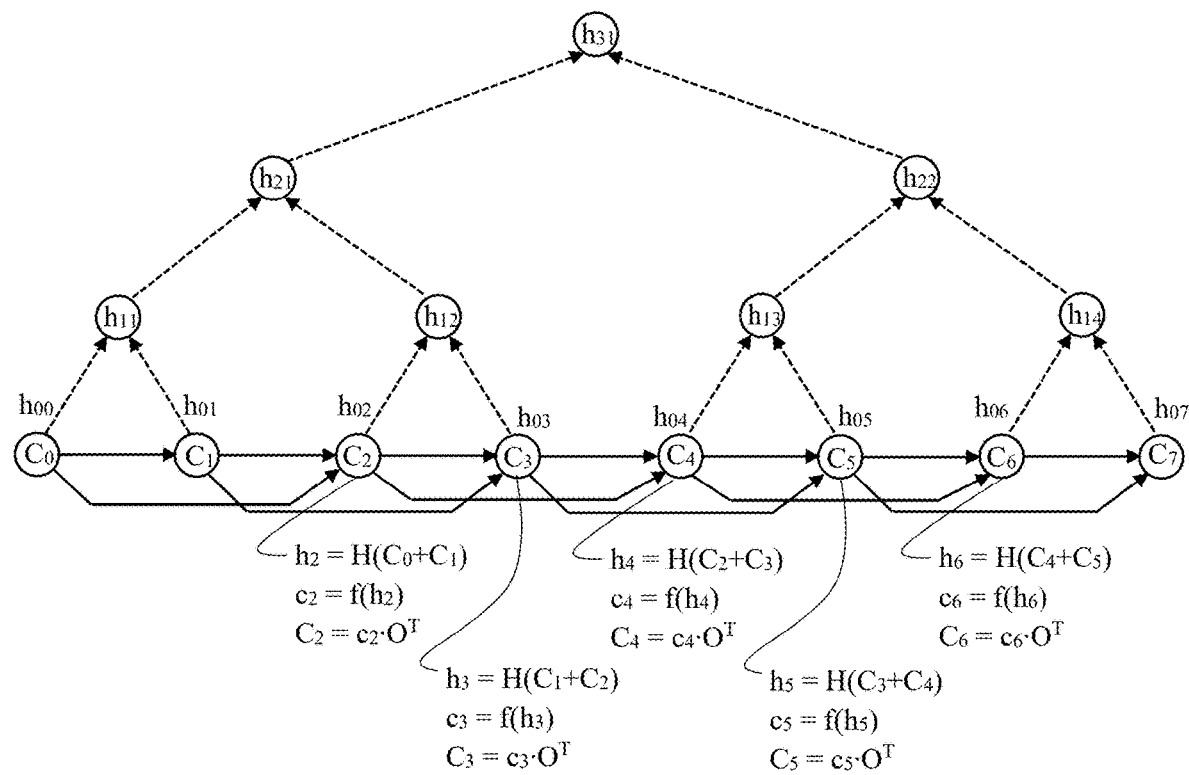
FIG. 11 illustrates a Merkle tree wherein each Merkle tree leaf comprises a linear network coded (LNC) data part, wherein each LNC data part can be chained to one or more previous LNC data parts and/or the hash of each leaf comprises a hash of a function of two or more previous LNC data parts.

In FIG. 11, each data part (Merkle tree leaf) could be a linear network coded (LNC) data part ($C_0$ to $C_7$). However, other types of data parts might be used. Each coded data part $C_n$ might be a function of a hash of at least one previous coded data part $C_{n-1}$. For example, to make coded data part $C_2$, the hash $h_2$ of previous coded data parts is computed: $h_2 = h(C_0 + C_1)$. A coefficient vector $c_2$ is computed from $h_2$: $c_2 = f_c(h_2)$. The coded data part $C_2$ is computed as a linear combination of Original data parts, O, e.g.: $C_2 = c_2 \cdot O^T$. The hash value $h_2$ might be employed as the corresponding Merkle tree leaf hash $h_{02}$ for $C_2$. In a different aspect, the corresponding Merkle tree leaf hash $h_{02}$ for $C_2$ might comprise a hash of a function of $C_2$ and one or more other leaf data. In one example, $h_{02} = h(f(C_2, C_1, C_0))$, where f( ) might concatenate, XOR, add, or perform some other operation(s) on its arguments. Thus, instead of just a simple hash tree, the leaf hashes are bound to each other (i.e., chained together).

In one instance, an attacker wishing to find a counterfeit data point for $C_2$ needs to find $C_2'$ that satisfies $h_{02} = h(f(C_2, C_1, C_0))$, which might require $10^{32}$ trials. But the counterfeit data part $C_2'$ also needs to satisfy $h_{03} = h(f(C_3, C_2', C_1))$. This will require $10^{64}$ trials, as only one in $10^{32}$ $C_2$'s also provides the correct value of $h_{03}$. A total of $10^{96}$ trials would be needed to find the $C_2'$ that also provides the correct value of $h_{04}$. Unlike the standard Merkle tree, a counterfeit leaf in this instance changes the root value.

In another instance, the integrity of the linear network coding might be checked against the Merkle tree. In a standard Merkle tree, $h_{0n} = h(C_n)$. A counterfeit $C_2'$ that satisfies $h_{02} = h(C_2')$ defeats the standard Merkle tree, but linear network coding can reveal the counterfeit. Specifically, it is computationally infeasible to compromise the downstream hashes (e.g., $h_3 = h(C_1 + C_2')$ and $h_4 = h(C_2' + C_3)$), as $10^{96}$ trials would be needed to find the successful counterfeit, $C_2'$. Furthermore, since the coefficient vectors $c_n$ are functions of the hashes $h_n$, a counterfeit coded packet that defeats the standard Merkle tree corrupts the downstream coded packets. The resulting fault in decoding is easily detected.

A benefit of LNC data binding is that if someone manages to spoof a data point, it will cause a cascade of errors throughout the LNC line. This makes the counterfeit data point easy to locate using the Merkle tree. For example, the adjacent data point prior to where the errors begin should be checked for authenticity.

In one example, data parts $C_0$ to $C_7$ might correspond to different original data parts. The Merkle tree hashes might chain together different original data parts. For example, $h_{02}$ can be produced by a function of $C_0$ and $C_1$. In another example, $C_0$ and $C_1$ might be coded data parts corresponding to a first original data part $O_1$, and $C_2$ might be a coded data part corresponding to a second original data part $O_2$, wherein Merkle tree hashes and/or coefficient computations chain the original data parts $O_1$, and $O_2$ together (or their respective coded parts).

Figure 12A:
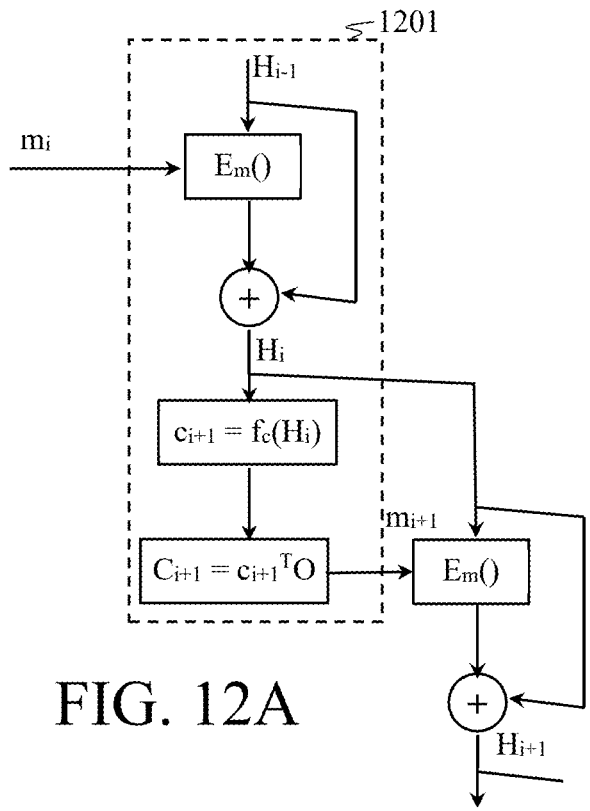
FIG. 12A shows just one of various different block ciphers that may be employed in the disclosed linear network coding, chaining, AONT packet generation, and/or Merkle tree hashing.

In FIG. 12A, an $i^{th}$ round 1201 of a linear network coding function feeds a message block mi (e.g., coded data part $C_i$) as a key to a block cipher $E_m( )$. Previous hash value $H_{i-1}$ is input to $E_m( )$ as plaintext to be encrypted. The output ciphertext is then also XORed ($\oplus$) with the previous hash value $H_{i-1}$ to produce the next hash value $H_i$:

$$H_i = E_m(H_{i-1}) \oplus H_{i-1}$$

In the first round (i=1), when there is no previous hash value, a constant pre-specified initial value $H_0$, or IV may be employed. In some aspects, the initial value $H_0$ might be the last hash value of a previous set of coded data parts. In the aspects disclosed herein, an AONT packet might be produced as a function of the hash values and the IV. An $(i+1)^{th}$ coefficient vector $c_{i+1}$ can be computed from $H_i$ (e.g., $c_{i+1} = f_c(H_i)$). The coefficient vector $c_{i+1}$ is then employed in a linear transformation (e.g., $C_{i+1}=c_{i+i}{}^T O$) to compute coded data part $C_{i+1}$. The next round inputs $C_{i+1}$ as its message block $m_{i+1}$ and the hash $H_i$ as plaintext to be encrypted.

FIG. 12A shows just one of various different block ciphers that may be employed in the disclosed linear network coding and/or chaining. In some instances, corresponding decoding might be provisioned. In other instances, disclosed techniques are intended to be one-way functions, or operations. In alternative to FIG. 12A, each block of message mi is input to block cipher $E_{g(H)}( )$ instead of $E_m( )$ as plaintext to be encrypted. The output ciphertext is then also XORed ($\oplus$) with the same message block mi to produce the next hash value $H_i$. The previous hash value $H_{i-1}$ is used as the key to the block cipher $E_{g(H)}( )$:

$$H_i = E_{g(Hi-1)}(m_i) \oplus m_i$$

In another alternative, each block of the message $m_i$ is the plaintext to be encrypted. The output ciphertext is then XORed ($\oplus$) with the same message block $m_i$ and then also XORed with the previous hash value $H_{i-1}$ to produce the next hash value $H_i$. The previous hash value $H_{i-1}$ is fed as the key to the block cipher:

$$H_i = E_{g(Hi-1)}(m_i) \oplus H_{i-1} \oplus m_i$$

In some aspects, disclosed techniques (e.g., linear network coding) may employ a permutation. In any of the disclosed aspects, a sponge function might be employed, such as to provision a one-way function.

Figure 12B:
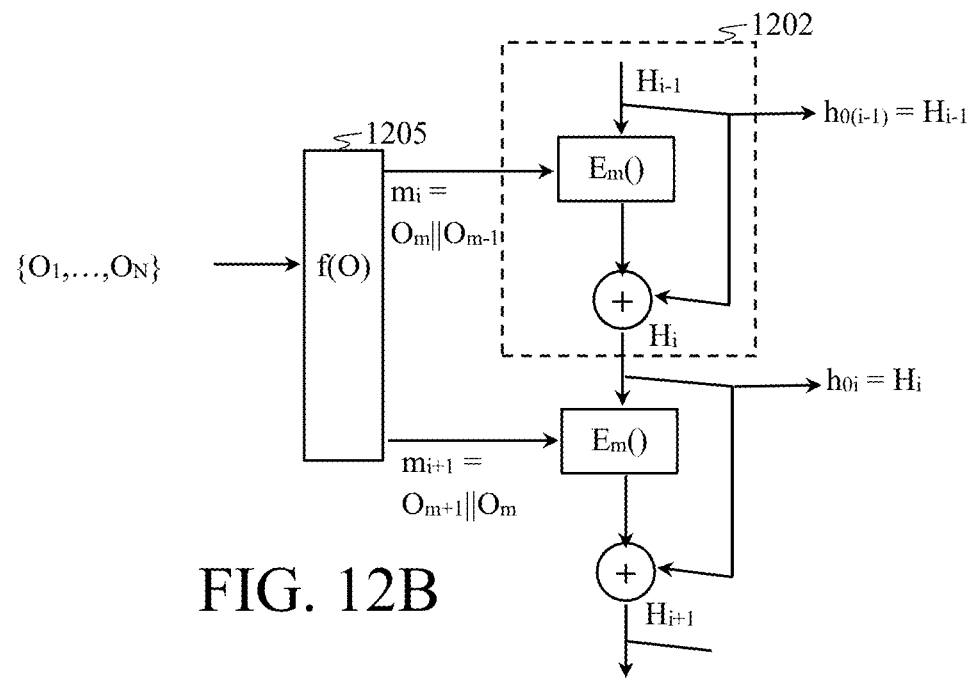
FIG. 12B depicts hash chaining, as it might be employed in various aspects, such as in linear network coding, AONT packet generation, and/or Merkle tree hashing.

FIG. 12B depicts hash chaining, as it might be employed in various aspects, such as in linear network coding, AONT packet generation, and/or Merkle tree hashing. In one example, the hash values $H_i$ may be employed as Merkle leaf hash values (e.g., $h_{0i}=H_i$). Original data parts $\{O_1, \ldots, O_N\}$ (and/or other data, e.g., coded data parts, AONT packets, keys, etc.) are processed by a chaining function f(O) 1205 to produce a plurality of messages $m_i$, each being a function of multiple ones of the data parts, and at least some of the data parts being in multiple ones of the plurality of messages. In one example, function 1205 concatenates the data parts. However, any of the other various operations disclosed herein might be employed. Each message $m_i$ might be processed in a one-way compression function (which can be provisioned to comprise multiple rounds) configured to chain the messages, hashes, keys, ciphertexts, and/or AONT values. In some aspects, an IV may be employed as $H_0$.

Disclosed aspects (such as, but not limited to, FIGS. 12A and 12B) can comprise or be implemented in any of the cipher block chaining modes. Cipher block chaining mode coding and corresponding decoding can be provided. Some disclosed aspects can be configured advantageously such that coding is not parallelizable, but decoding is. Random read access may be configured to be parallelizable or not. Some disclosed aspects can be configured such that neither coding nor decoding is parallelizable. In one example, an output feedback mode turns a block cipher into a stream cipher. Error correcting codes might be applied before or after encryption. Various aspects can be configured to mask patterns which might exist in encrypted and/or encoded data. Various cipher modes may be used to mask patterns by cascading outputs from the cipher block or globally deterministic variables into the subsequent cipher block.

Figure 13A:
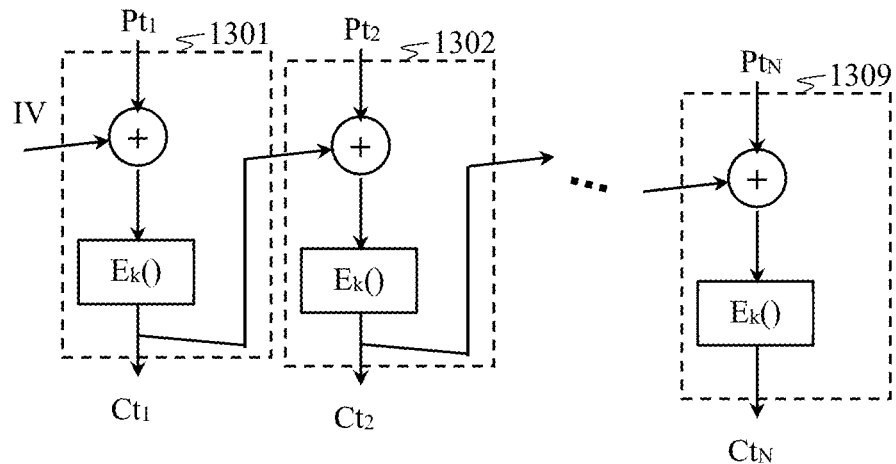
FIG. 13A shows an encryption mode that can be implemented in various aspects of the disclosure.

In one example, as illustrated in FIG. 13A, each block of plaintext is XORed with the previous ciphertext block before being encrypted. This way, each ciphertext block depends on all plaintext blocks processed up to that point. In a first iteration, an IV can be input to base operation 1301. Multiple iterations (e.g., 1301, 1302, . . . , 1309) of a base operation are performed. Variations to the base operations 1301, 1302, . . . , 1309 or different base operations can be provisioned. For example, in propagating cipher block chaining or plaintext cipher-block chaining mode, each block of plaintext is XORed with both the previous plaintext block and the previous ciphertext block before being encrypted. This causes small changes in the ciphertext to propagate when decrypting. Some aspects can employ cipher feedback. In one instance, the $(i^{th})$ ciphertext block produced in an $i^{th}$ round is block cipher encrypted in the next $(i+1)^{th}$ round, the encrypted block is XORed with the $(i+1)^{th}$ plaintext block to produce the next $(i+1)^{th}$ ciphertext block. Other variations of base operations 1301, 1302, . . . , 1309, including combinations of any of the operations disclosed herein.

Any of the disclosed modes may be combined with a counter mode. In one example, blocks are numbered sequentially, and then each block number is combined with an IV and encrypted with a block cipher E. The result of this encryption is then XORed with the plaintext to produce the ciphertext. The ciphertext blocks may be considered coefficients of a polynomial which is then evaluated at a key-dependent point using finite field arithmetic. The result is then encrypted, producing an authentication tag that can be used to verify the integrity of the data. In some aspects, a counter with cipher block chaining message authentication might be employed.

Figure 13B:
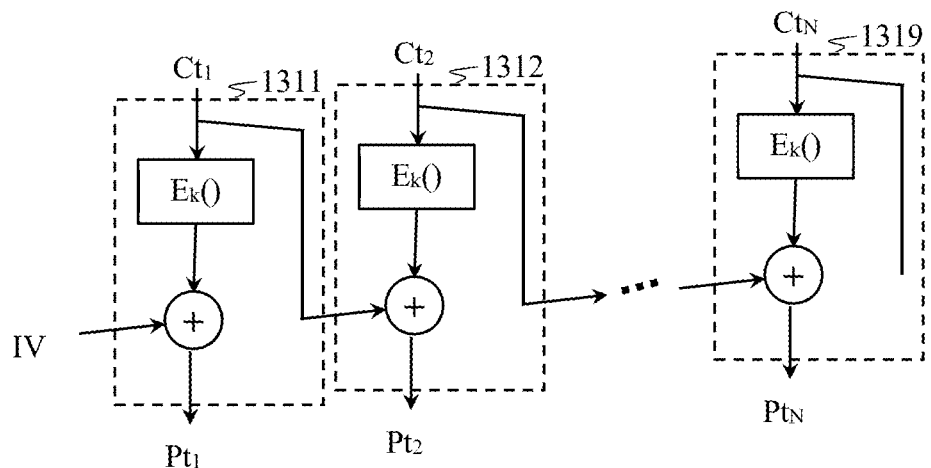
FIG. 13B shows a decryption mode corresponding to the encryption mode shown in FIG. 13A.

FIG. 13B shows a decryption mode corresponding to the encryption mode shown in FIG. 13A, wherein operations 1311, 1312, . . . , 1319 may be adapted to provide corresponding decryption for any of the variations or alternative encryption modes disclosed herein. A number of modes of operation can be provisioned to combine secrecy and authentication in a single cryptographic primitive. Some modes may also allow for the authentication of unencrypted associated data.

The encryption and decryption modes can be configured to perform coding and decoding, respectively. In some aspects, hashes of the input, output, and/or internal values of the encryption and decryption modes may be performed, and such hashes might be employed in the operations inside of the encryption and decryption modes and/or employed for operations external to the encryption and decryption modes. Hash values (or function(s) thereof) might be output from an encryption mode. Hash values (or function(s) thereof) might be input to a decryption mode.

Figure 13C:
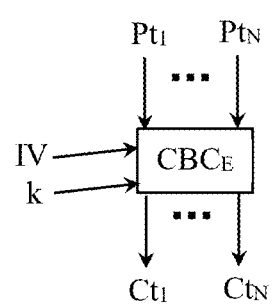
FIG. 13C depicts a generalization of any of the encryption modes disclosed herein.

FIG. 13C depicts a generalization of any of the encryption modes disclosed herein, such as the encryption mode depicted in FIG. 13A, 12A, or 12B, or other modes disclosed herein. At least N plaintext blocks $Pt_1, \ldots, Pt_N$ are input to the encryption mode, indicated here as a cipher block chaining mode. An IV and a block cipher encryption key k may be provided as inputs. A number (e.g., N) of ciphertext blocks $Ct_1, \ldots, Ct_N$ are generated. Other inputs and/or outputs might be provided, including hash values and/or AONT packets.

Figure 13D:
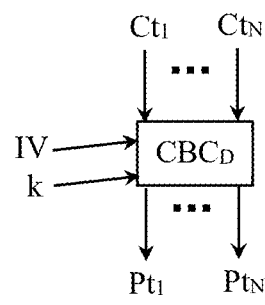
FIG. 13D depicts a generalization of any of the decryption modes disclosed herein.

FIG. 13D depicts a generalization of any of the decryption modes disclosed herein, such as the decryption mode depicted in FIG. 13B, decryption modes corresponding to encryption modes in FIG. 12A or 12B, or other modes disclosed herein. At least N ciphertext blocks $Ct_1, \ldots, Ct_N$ are input to the decryption mode, indicated here as a cipher block chaining mode. An IV and a block cipher encryption key k may be provided as inputs. A number (e.g., N) of plaintext blocks $Pt_1, \ldots, Pt_N$ are output. Other inputs and/or outputs might be provided, including hash values and/or AONT packets.

Figure 14A:
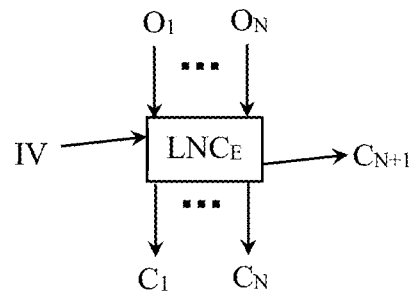
FIG. 14A depicts a generalization of any of the coding modes disclosed herein.

FIG. 14A depicts a generalization of any of the coding modes disclosed herein, such as the coding modes depicted in FIG. 2 or 4, or other coding modes disclosed herein. Original data inputs $O_1, \ldots, O_N$, disclosed herein, might comprise different data files, different pieces of one data file, different pieces of multiple data files, one or more records, one or more groups of records, parts of a block of records, parts of multiple blocks of records, multiple blocks of records, multiple groups of blocks, pieces of at least one data stream, etc. In some instances, an IV might be input. In some instances, at least one cryptographic key k (not shown) might be input. The outputs can comprise coded data parts (e.g., packets) $C_1, \ldots, C_N$. In some instances, the LNC coded data $C_1, \ldots, C_N$ is not output. At least one AONT packet $C_{N+1}$ may be produced. The coding mode $LNC_E$ might comprise nested coding. The coding mode $LNC_E$ might be chained with other coding and/or encryption modes, or vice versa.

It should be appreciated that each of a system of multiple computing nodes networked together may jointly encode data, wherein each of the nodes might take several packets (Original packets and/or coded packets that were previously coded by at least one other node), possibly received from different nodes, and combine them together to produce coded packets. These coded packets might be the outputs $C_1, \ldots, C_N$ and/or might be transmitted to at least one other node in a multi-layer coding mode. Each node pk with indegree $InDeg(p_k)=S$ generates a message $X_k$ from the linear combination of received messages $\{M_i\}_{i=1}^{S}$ according to:

$$X_k = \sum_{i=1}^{S} g_k^i \cdot M_i$$

where for this equation, $g_k^i$ could be coefficients selected from $GF(2^S)$ or some other finite field. In some instances, the $g_k^i$ might be computed from the cryptographic hash (or some other one-way function) of at least one other $X_k$, possibly from previously computed $X_k$ values received or computed at a final coding layer. In some instances, one or more of the coefficients $g_k^i$ might be transmitted or stored with the $X_k$ values. Incoming packets (i.e., messages) can be combined into one or several outgoing packets in the intermediate nodes. FIG. 14A might represent operations performed at each node, or might represent operations performed by a collection of nodes, possibly comprising multiple layers. The messages of the final layer may be denoted as the coded packets $C_1, \ldots, C_N$. An AONT packet (e.g., $C_{N+1}$) might be generated to store one or more of the coefficients $g_k^i$. In some instances, multiple AONT packets might be produced to store multiple coefficients $g_k^i$. The AONT packet(s) can each be generated by XORing the hashes of the coded packets $C_1, \ldots, C_N$ (e.g., at the final layer) with one or more sets of the coefficients $g_k^i$. In some instances, the coefficients $g_k^i$ encoded in the AONT packet(s) can comprise coefficients that combine messages in layers previous to the final layer. It should be appreciated that the multiple computing nodes described herein might be instantiated programmatically by a single node. In other aspects, the multiple computing nodes might comprise blockchain nodes, off-chain nodes, nodes of a file-sharing network, or combinations thereof.

In some aspects, the network of nodes is represented by a directed (e.g., acyclic) graph $G=(V, E, C)$, where V is the set of nodes or vertices, E is the set of directed links (edges), and C is the capacity of each link of E. A graph $G=(V, E)$, a set of link capacities $\{c_l\}$ and a set of multicast connection requirements C can specify a multicast connection problem.

Figure 14B:
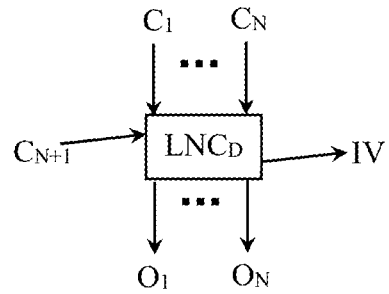
FIG. 14B depicts a generalization of any of the decoding modes disclosed herein, or corresponding to any of the disclosed coding modes.

In the parlance of LNC, sink nodes collect a sufficient number of the coded packets $C_1, \ldots, C_N$ to decode the original data. FIG. 14B depicts a generalization of any of the decoding modes disclosed herein, or corresponding to any of the disclosed coding modes. Example decoding modes are depicted in FIGS. 3 and 5. Coded data inputs $C_1, \ldots, C_N$, disclosed herein, might comprise different encoded data files, different encoded pieces of one data file, different encoded pieces of multiple data files, one or more encoded records, one or more encoded groups of records, encoded parts of a block of records, encoded parts of multiple blocks of records, multiple encoded blocks of records, multiple encoded groups of blocks, encoded pieces of at least one data stream, etc. In some instances, an IV might be output. The IV might be communicated to another mode, such as a decryption and/or decoding mode. The IV could be a function of an AONT packet or cryptographic key k. In some instances, the IV is used internally and is not output. In some instances, at least one cryptographic key k (not shown) might be input. The outputs can comprise original data (e.g., original packets $O_1, \ldots, O_N$). In some instances, the original data is not output. In some instances, the results of verifying original data might be output. At least one AONT packet $C_{N+1}$ may be input. Any of the decoding techniques disclosed herein may be implemented in FIG. 14B. The decoding mode $LNC_D$ might comprise nested decoding. The decoding mode $LNC_D$ might be chained with other decoding and/or decryption modes, or vice versa.

In one example, $LNC_D$ determines how to decode the AONT packet by first computing the cryptographic hash of each coded packet $C_1, \ldots, C_N$ it collects. Checksums and/or error detection and/or error correction might be performed on the coded packets $C_1, \ldots, C_N$. In another aspect, $LNC_D$ determines which coded packets $C_1, \ldots, C_N$ to collect by recovering a packet address for each coded packet from the AONT packet, a hash digest, or a cryptographic proof of knowledge of a polynomial corresponding to a linear system of equations that characterizes the coded packets $C_1, \ldots, C_N$.

Figure 14C:
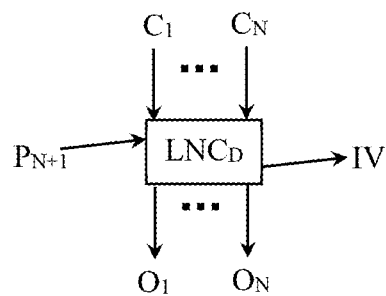
FIG. 14C depicts a generalization of a set of decoding modes disclosed herein.

In FIG. 14C, $C_{N+1}$ may comprise a proof of knowledge $(P_{N+1})$ of the corresponding linear system of equations in addition to, or instead of, the AONT packet. In some instances, input $C_{N+1}$ may be processed by the $LNC_D$ to determine which coded packets $C_1, \ldots, C_N$ to collect. For example, if the coded packets $C_1, \ldots, C_N$ are content addressable via their hash values, the $LNC_D$ might decode those hash values from the $C_{N+1}$. The $C_{N+1}$ might comprise more than one AONT packet. An IV, key, and/or AONT may or may not be output.

Figure 14D:
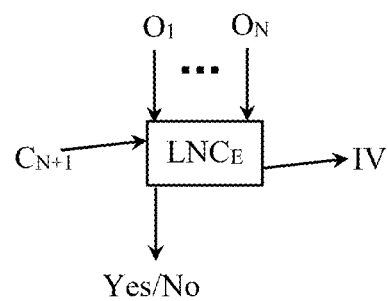
FIG. 14D illustrates a generalization of a set of verification modes disclosed herein.

In FIG. 14D, a candidate original data O, possibly as data parts $O_1, \ldots, O_N$, is input to a Verifier, which determines if an input $C_{N+1}$ (e.g., AONT packet(s) and/or proof(s)) was derived from the candidate original data O. In one instance, the $LNC_E$ might process the input $C_{N+1}$ to determine how to encode the candidate original data. The encoding (which might employ padding) involves computing the coefficient vectors $c_n$. The $LNC_E$ encodes the candidate original data, and may compute one or more elements of a $C_{N+1}$ (i.e., a computed $C_{N+1}$) therefrom, and then compare the computed one or more elements to corresponding one or more elements in the input $C_{N+1}$. The $LNC_E$ outputs the result of the comparison, which either verifies that the candidate original data is the original data from which the input $C_{N+1}$ was produced. An IV, key, and/or AONT may or may not be output.

The coding and encryption modules disclosed herein can be coupled together in various combinations, such as to provision any combinations of coding and encryption or decoding and decryption. Such combinations might comprise multiple layers of coding and/or encryption (and decoding and/or decryption). Blocks represented by $LNC_E$ and/or $CBC_E$ might be arranged in serial and/or parallel combinations. Similarly, blocks $LNC_D$ and/or $CBC_D$ might be arranged in serial and/or parallel combinations.

Figure 14E:
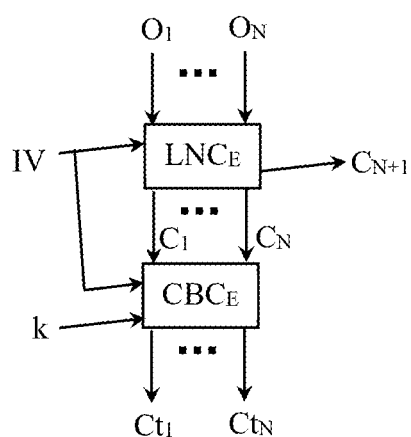
FIGS. 14E and 14F show different possible combinations of coding and encryption blocks. Corresponding combinations of decoding and decryption might be provided.

In FIG. 14E, linear network coding is performed on original data, and the coded data is then encrypted to produce a ciphertext output. Blocks $LNC_E$ and $CBC_E$ might use the same IV. $CBC_E$ might use an IV output from $LNC_E$. $CBC_E$ is shown with a key k input. In one instance, the key k might be an output from the $LNC_E$. An AONT packet $C_{N+1}$ might be produced by $LNC_D$ and/or $CBC_D$. In one instance, $C_{N+1}$ can comprise a function of hash values derived from the ciphertext output. In one instance, the key k is (or is derived from) $C_{N+1}$. The AONT packet $C_{N+1}$ might contain the key k and/or IV.

Figure 14F:
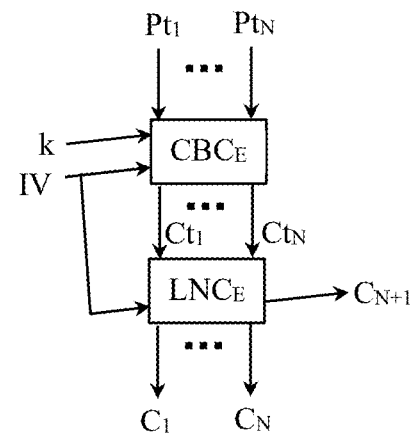

In FIG. 14F, encryption is performed on plaintext original data to produce ciphertext original data, which is then encoded to produce coded data. $CBC_E$ is shown with a key k input. Blocks $LNC_E$ and $CBC_E$ might use the same IV. $LNC_E$ might use an IV output from $CBC_E$. Either or both $LNC_E$ and $CBC_E$ might perform an AONT. The AONT packet $C_{N+1}$ might contain the key k and/or IV.

Figure 15:
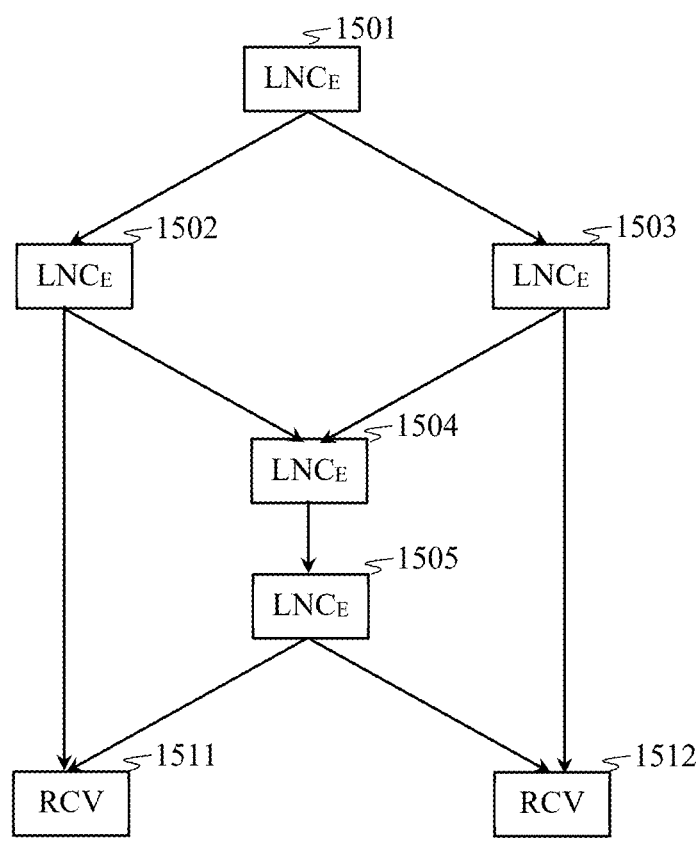
FIG. 15 is an example distributed linear network coding aspect that can be provisioned in accordance with disclosed aspects.

FIG. 15 is an example distributed linear network coding aspect that can be provisioned in accordance with disclosed aspects, such as for transmission and compression of information in general multisource multicast networks. Network nodes might independently select linear mappings from inputs onto output links over some field. In the FIG., all nodes (1501-1505) other than the receiver nodes (1511 and 1512) perform linear mappings from inputs onto outputs over some field. Original data is input to node 1501. Original data might also be input at any of the nodes 1502-1505. Such mappings, and the other instances of coding disclosed herein, can be provisioned as random linear mappings, such as when the coefficients are computed using a cryptographic hash function, the hash function being employed as a random number generator.

Linear network coding (such as described in T. Ho, et al., "A Random Linear Network Coding Approach to Multicast", IEEE TRANSACTIONS ON INFORMATION THEORY, VOL. 52, NO. 10, OCTOBER 2006; P. A. Chou, et al., "Practical network coding," in Proc. 41st Annu. Allerton Conf Communication, Control, and Computing, Monticello, IL, October 2003; M. Feder, et al., "Bounds on linear codes for network multicast," Electronic Colloquium on Computational Complexity, vol. 10, no. 033, 2003; T. Ho, et al., "On the utility of network coding in dynamic environments," in Proc. Int. Workshop on Wireless Ad-Hoc Networks, Oulu, Finland, May/June 2004, pp. 196-200; all of which are hereby incorporated by reference in their entireties) can be adapted according to aspects disclosed herein.

The receivers (1511 and 1512) need only know the overall linear combination of source processes in each of their incoming transmissions. This information can be sent with each transmission block or packet as a vector of coefficients corresponding to each of the source processes, and updated at each coding node by applying the same linear mappings to the coefficient vectors as to the information signals. The relative overhead of transmitting these coefficients decreases with increasing length of blocks over which the codes and network remain constant. For instance, if the network and network code are fixed, all that is needed is for the sources to send, once, at the start of operation, a canonical basis through the network. In one instance, the coefficients might be sent as information encoded in one or more AONT packets.

In some instances, hashes of the IV might provide for computing the coefficients at each network layer in a multilayer linear network coding topology. For example, in the first layer (e.g., at coder 1501), the IV or a hash of the IV (e.g., $H_1=h(IV)$) might provide for computing the (first-layer) coefficients of the coded data. The coded data, when encoded by second-layer coder 1502, for example, might employ the same or different hash function on the IV and/or on $H_1$ (e.g., $H_2=h(h(IV))$) to compute second-layer coefficients for the coded data output by the coder 1502. Similar operations might be performed at coder 1503. Inputs to third-layer coder 1504 are the coded data outputs from coders 1502 and 1503. The third-layer coder 1504 might perform the same or different hash function on the IV and/or on one or more previous hashes (e.g., $H_3=h(h(h(IV)))$) to compute third-layer coefficients for its coded data output. Fourth-layer coder 1505 receives the coded data output from coder 1504, and may employ same or different hash function on the IV and/or on one or more previous hashes (e.g., $H_4=h(h(h(h(IV))))$) to compute fourth-layer coefficients for its coded data output. The IV might be globally available, or it might be encoded in an AONT packet(s) that is passed down each layer along with the coded data.

In other aspects, the coefficients are computed from hash functions of the coded data. By way of example, but without limitation, in the simple case of coders 1504 and 1505, encoding is described as follows. In coder 1504, an IV might be used to produce the first coefficient vector $c_{31}$, which encodes the data input to coder 1504 (referred to as original data $O_{(2)}$ from the perspective of the coder 1504) to produce a first coded data packet, $C_{31}=c_{31}{}^T O_{(2)}$. The coefficient vector $c_{32}$ for the second coded data packet $C_{32}$ can be computed from a function $f_c(\ )$ of a function (e.g., hash) of the first coded data packet $C_{31}$, e.g., $c_{32}=f_c(h(C_{31}))$. The second coded data packet can be generated as $C_{32}=c_{32}{}^T O_{(2)}$. This process can be repeated to produce N coded data packets, e.g., $C_{3N}=c_{3N}{}^T O_{(2)}$. The hashes of the coded packets (e.g., $h(C_{31}), \ldots, h(C_{3N})$) can be used to encode the IV (e.g., XORed together with the IV) in an AONT packet, $C_{3(N+1)}$.

The coded data packets $C_{31}, \ldots, C_{3N}$ are input to the coder 1505 and referred to as original data $O_{(3)}$ from the perspective of the coder 1505. $C_3(N+1)$ may also be input to the coder 1505, which then computes the hashes of $C_{31}, \ldots, C_{3N}$ and decodes $C_{3(N+1)}$ to recover the IV. The coder 1505 then computes coded packets $C_{41}, \ldots, C_{4N}$ and the AONT packet $C_{3(N+1)}$. For example, $C_{41}$ may be computed using first coefficient vector $c_{41}$, computed from the IV: e.g., $C_{41}=c_{41}{}^T O_{(3)}$. Subsequent coded packets $C_{42}, \ldots, C_{4N}$ may be computed (e.g., $C_{4n}=c_{4n}{}^T O_{(3)}$, n=2, . . . , N) using coefficients $c_{4n}$ computed as a function $f_c(\ )$ of a function (e.g., hash) of at least one previous coded data packet, e.g., $C_{3(n-1)}$, e.g., $c_{3n}=f_c(h(C_{3(n-1)}))$. The hashes of the coded packets (e.g., $h(C_{41}), \ldots, h(C_{4N})$) can be used to encode the IV (e.g., XORed together with the IV) in an AONT packet, $C_{4(N+1)}$.

Coding at the coders 1501, 1502, and 1503 can be performed in a similar manner, configured according to each coder's (1501, 1502, and 1503) input. The coding disclosed herein might be performed in a manner wherein the coders 1501-1505 are each physical nodes in a network, or wherein the coders 1501-1505 are implemented as logical nodes within a computer processor(s). Coded data can be stored in network nodes 1502, 1503, and 1505. Alternatively coded data from (physical or logical) nodes 1502, 1503, and 1505 might be stored in a single node or computer-readable memory, or may be partitioned into coded data parts that are distributed to many nodes, such as computer nodes in a file-sharing network, blockchain, and/or Cloud storage network.

Receivers 1511 and 1512 might represent one or more physical or logical structures configured to collect (e.g., gather, aggregate) coded data from multiple nodes in a network (e.g., nodes 1502, 1503, and 1505), such as blockchain nodes, file-sharing network nodes, and/or Cloud storage network nodes. The receiver(s) 1511 and 1512 can collect the coded data as part of a decoding process. Decoding can performed in a complementary manner as the coding disclosed herein. For example, the IV can be recovered from the AONT packet. In examples wherein hashes of coded packets are employed to encode data at each network layer, hashes of coded packets computed at each network layer can be used to decode that layer. In one example, at layer l, hash values ($H_{l1}, \ldots, H_{lN}$) of the coded data $C_{l1}, \ldots, C_{lN}$ are computed. The hash values ($H_{l1}, \ldots, H_{lN}$) are used to decode the AONT packet and recover the IV. The coefficients ($c_{l1}, \ldots, c_{lN}$) can be computed from the hash values (e.g., $H_{l1}, \ldots, H_{lN-1}$) and the IV. The coefficients and the coded data can then be used to solve the linear system of equations to recover the data parts from the next level (e.g., level l−1). This decoding process can be performed at each layer until the original data is recovered. Decoding might employ a complementary type of graph to that depicted in FIG. 12, or wherein decoding transits up the graph (e.g., from nodes 1511 and 1512 to node 1501).

The coders disclosed herein might include any combination of coding and encryption. In some instances, instead of block coding disclosed herein, sliding window coding, sliding coding, or stream encoding might be employed. Such alternatives might be applied to encryption or combinations of coding and encryption disclosed herein. In some aspects, a convolutional approach can be used, where coding is applied to overlapping spans of data symbols, possibly of different spanning widths, viewed as a sliding coding window. In generation-based LNC, not all symbols within a single generation need to be present for coding to start. Similarly, a sliding window can be variable-sized, with more data symbols added to the coding window as they arrive. Thus, innovative coded symbols can be generated as data symbols arrive. This "on-the-fly" coding technique reduces coding delays at transmit buffers, and together with rateless encoding operations, enables the coder to start emitting coded packets as soon as data is received, adapting to fluctuating incoming traffic flows. Injecting coded symbols based on a dynamic transmission window also breaks the decoding delay lower bound imposed by traditional block codes and is well-suited for delay-sensitive applications and streaming protocols.

In sliding-window LNC, input data might be segmented into equal-sized data symbols for encoding. In some implementations, the sliding encoding window can expand in size as new data packets arrive, until it is closed off by an explicit instruction, such as a feedback message that re-initiates the encoding window. In some implementations, the size of the sliding encoding window is upper bounded by some parameter, fixed or dynamically determined by online behavior such as packet loss or congestion estimation. Coding parameters may be communicated from the coder to the decoder. Such coding parameters can include one or more of field size, code specifications, symbol ordering, encoding window position, encoding window size, code rate, and desired feedback frequency or probability. Some coding parameters can also be updated dynamically during the coding process, e.g., in accordance to channel conditions and/or resource availability. For example, an outer header or information in an AONT packet can indicate an encoding window position, as a starting index for current data symbols being encoded within the symbol representation. In one instance, the coding parameters might indicate the current encoding window position, encoding window size, symbol size, and field size.

With recoding, coded symbols (i.e., packet/file/drive chunks) can be recombined without decoding. Recoding enables intermediate transport nodes and storage caches to combine coded packets/sectors to create new coded packets/sectors that are effective representations of all original packets/sectors involved in the first coding stage. For example, original packets can be combined using encoding, then re-combined with other encoded packets through recoding. Recoding involves the linear combination of coded packets and the recalculation of new coding coefficients. In one example, recoding can combine one or more previously encoded packets with one or more previously absent original packets. In some applications, recoding can be used as a dynamic caching enabler that is particularly suitable for mobile caching or fast storage repair. Each of the caches may be configured to have an insufficient number of degrees of freedom to decode the original pieces, which can provide for information-theoretic security. Recoding can be advantageously configured to exploit decentralized network topologies, such as blockchains, file-sharing networks, mesh topologies, Clouds, peer-to-peer networks, content delivery networks, IoT networks, 5G edge networks, and cooperative mobile networks. Recoding can reduce the total number of packet transmissions across a decentralized network topology or storage system.

The inherent flexibility of the disclosed linear network coding modes enables a wider scope of tradeoffs and optimizations compared to conventional coding techniques. For example, by generating coded data units from any sources on the fly, disclosed aspects can provision coding schemes where latency, bandwidth, complexity, and/or reliability can be tuned dynamically, such as to match link conditions, network requirements, and/or other factors. Recoding can create coded sectors from other coded (and uncoded) sectors without decoding first. This enables storage nodes and intermediate caches to generate additional redundancy on demand and in a decentralized fashion.

Recoding can employ various combinations of linear network coding and encryption (and might employ AONT(s)), and corresponding linear network decoding can be provisioned in a complementary manner, such as to operate decoding (and decryption, if necessary) in reverse of the recoding operations. In some instances, coding and/or recoding might be implemented via algorithms that commute with each other, and corresponding decoding might be performed irrespective of the order of coding and/or recoding operations.

Figure 16A:
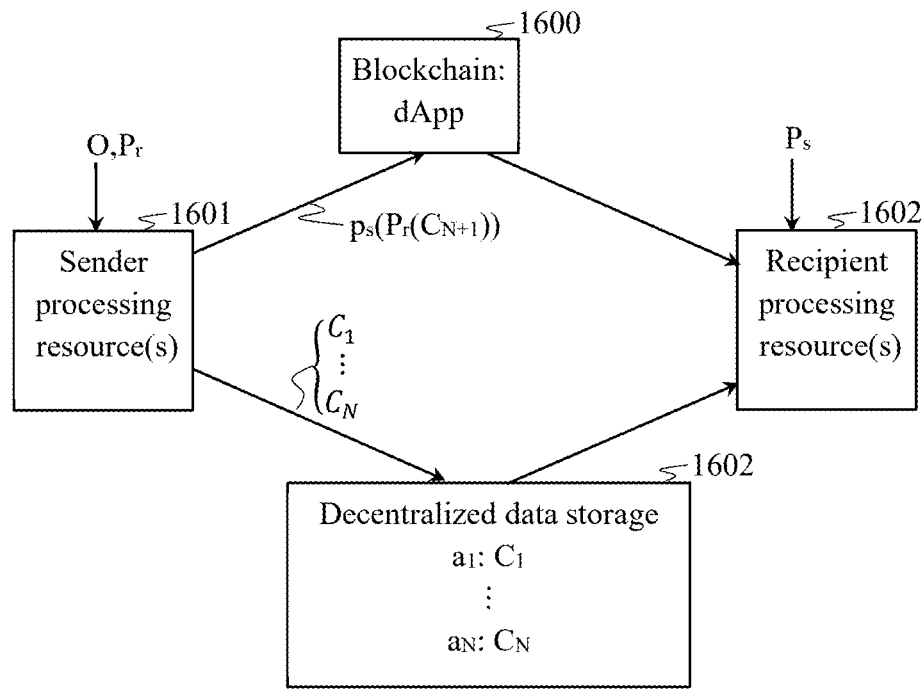
FIGS. 16A and 16B depict a system, method, and apparatuses that can be employed in some aspects of the disclosure.
Figure 16B:
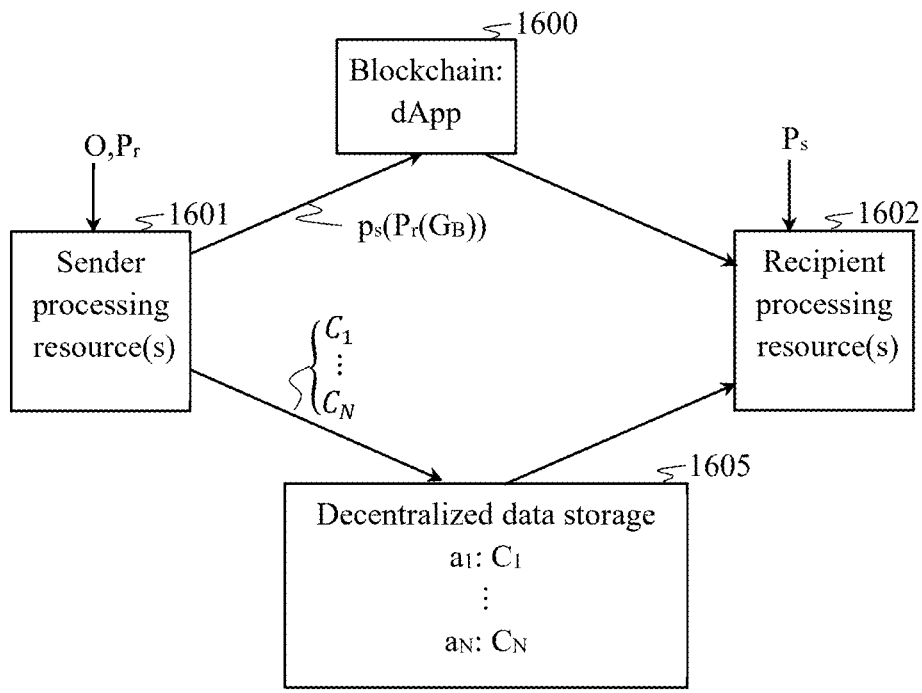

FIGS. 16A and 16B depict a system, method, and apparatuses that can be employed in some aspects of the disclosure. At least one sender processing resource 1601 processes original data O, to be stored, and possibly retrieved by at least one intended recipient processing resource 1602, for example. The sender 1601 produces at least one AONT data part ($C_{N+1}$), which is received by the recipient 1602, possibly via a dApp (e.g., smart contract) on at least one blockchain 1600. The $C_{N+1}$) might be written to the blockchain 1600. The sender 1601 also produces at least one set of coded data parts ($C_1, \ldots, C_N$), which might be stored in a decentralized data storage 1605 (e.g., file sharing network, Cloud storage, Layer-2 blockchain, etc.). Each coded data part (or set thereof) might be stored with a unique address (e.g., CAS address), $a_1, \ldots, a_N$. The recipient 1602 might be configured to receive the addresses $a_1, \ldots, a_N$ and retrieve the corresponding coded data parts ($C_1, \ldots, C_N$) from data storage 1605.

Many different ones of the disclosed aspects and variations thereof might be employed here. In one example, the sender 1601 encrypts the AONT part with the recipient's 1602 public key $P_r$ and signs the encrypted part with its private key $p_s$. The recipient 1602 can use the sender's 1601 public key $P_s$ to decrypt the signed part and then use its own private key $p_r$ to decrypt the AONT part. In some aspects, the order of encryption might be reversed, e.g., $P_r(p_s(C_{N+1}))$. The AONT part might be one of multiple parts of a data record, and the other parts may or may not be encrypted with $p_s$ and/or $P_r$. In one example, the AONT part might comprise a digest of the addresses $a_1, \ldots, a_N$. The addresses might be hashes of the coded data parts ($C_1, \ldots, C_N$).

The coded data parts ($C_1, \ldots, C_N$) might be encrypted at least with the recipient's 1602 public key $P_r$, and possibly signed with the sender's 1601 private key $p_s$. In one instance, the addresses $a_1, \ldots, a_N$ might correspond to hashes of encrypted coded data parts ($C_1, \ldots, C_N$). In other instances, the addresses $a_1, \ldots, a_N$ can correspond to hashes of decrypted coded data parts ($C_1, \ldots, C_N$).

In one example, addressing might be configured such that the hash of each unencrypted coded data part (e.g., $C_n$) might link to the address of an encrypted different coded data part (e.g., $E(C_{n+1})$). This can effectively chain together the addresses of the coded data parts. Thus, a decrypted coded data part (e.g., $C_n$) can be processed (e.g., hashed) to reveal (e.g., link to) the address of a next encrypted coded data part (e.g., $E(C_{n+1})$).

In FIG. 16B, the sender 1601 produces at least one polynomial or cryptographic proof of knowledge based on the linear system of equations that comprises the coded data parts ($C_1, \ldots, C_N$) and the corresponding coefficients ($c_1, \ldots, c_N$). An AONT data part might also be produced.

Figures 17A, 17B:
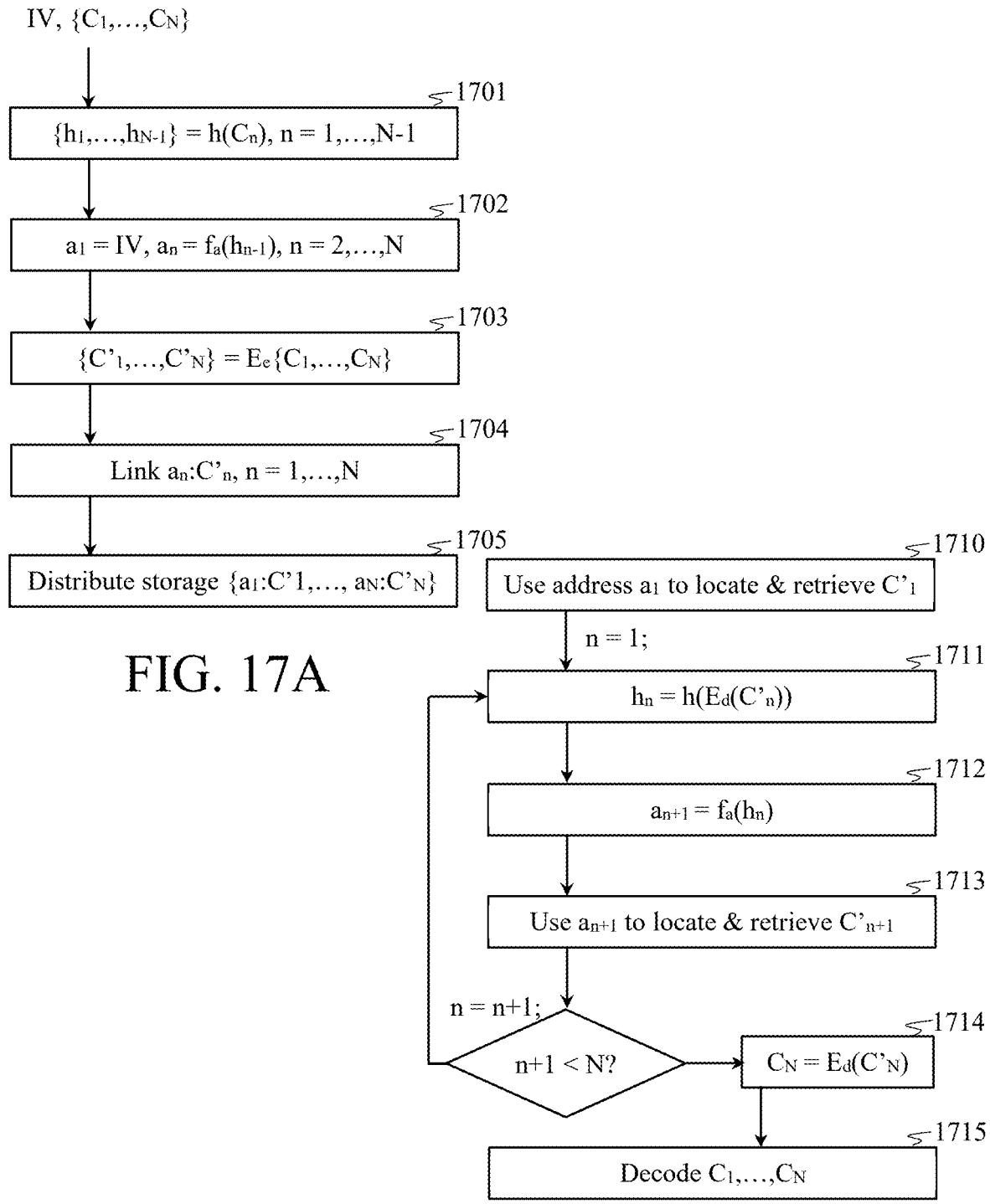
FIG. 17A illustrates a method for encoding and storing data.
FIG. 17B illustrates a method for retrieving stored data and decoding the retrieved data.

In FIG. 17A, coded data parts $C_1, \ldots, C_N$ and possibly other information, such as an IV, cryptographic key(s) (not shown) and/or other data (not shown) are processed. Hashes $h_1, \ldots, h_{N-1}$ might be computed 1701 from the coded data parts $C_1, \ldots, C_{N-1}$. In this example, addresses $a_1, \ldots, a_N$ are produced 1702 from the IV and the hashes $h_1, \ldots, h_{N-1}$. Each address an can comprise a function of at least one previous h value (e.g., $h_{n-1}$), where $h_0$=IV. The addresses $a_1, \ldots, a_N$ might comprise IPFS content identifiers (CIDs) corresponding to the values IV, $h_1, \ldots, h_{N-1}$. The addresses $a_1, \ldots, a_N$ might comprise one or more data structures configured such that each of the values IV, $h_1, \ldots, h_{N-1}$ references (e.g., points to) a particular CID, as disclosed herein. Such data structures might include linked data structures. A CID comprises a hash, but it can contain additional information, such as version number, how the data encoding (e.g., CBOR, JSON, etc.), hash function, hash length, etc. The hash components of the CIDs can be the values IV (or h(IV)), $h_1, \ldots, h_{N-1}$ or functions thereof.

The coded data $C_1, \ldots, C_N$ can be encrypted 1703 to produce encrypted coded data $C'_1, \ldots, C'_N$. By way of example, but without limitation, encryption might employ a public key (e.g., $P_r$), a private key (e.g., $p_s$), a symmetric key (e.g., a random key conveyed in an AONT packet), a message key (e.g., a key comprising previous coded data packet(s), the IV, and/or one or more of the hashes $h_1, \ldots, h_{N-1}$), or any combination thereof.

Each address an can be linked to a corresponding encrypted coded data part $C'_1, \ldots, C'_N$, such as by provisioning a linked data structure. CIDs can be used in data structures to create immutable linked data, as defined by the Inter-Planetary Linked Data specification, which is incorporated by reference in its entirety. CIDs can be put into lists or dictionaries to store in IPFS, and IPFS can provide support for managing the resulting linked data structures and access to their elements. In such a list or dictionary, each hash $h_n$ of coded data $C_n$ (where $h_0$=IV or h(IV)) might reference or point to (e.g., might be paired with a pointer to) the CID of a next encrypted coded data $C'_{n+1}$.

In another aspect, a first CID can be associated with an $n^{th}$ encrypted coded data part $C'_n$, and a second CID can comprise the hash $h_{n-1}$ of a previous (e.g., $(n-1)^{th}$) unencrypted coded data part $C_{n-1}$ (where $h_0$=IV or h(IV)). The second CID can refer to (e.g., might comprise the hash of) data that comprises the hash of the previous (e.g., $(n-1)^{th}$) coded data part or the IV. Linked data structures might comprise or be implemented in a Merkle DAG.

In one example, a dictionary might comprise at least two keys: "data" and "address", wherein at least the "data" comprises a CID as its value. The "data" CID value can be the CID of the $n^{th}$ encrypted coded data part $C'_n$. The "address" might optionally have a CID value that includes the hash $h_{n-1}$ of the $(n-1)^{th}$ unencrypted coded data part $C_{n-1}$. The dictionary can be configured to link these data structures together. Other data might be linked too.

This example can be regarded as the (coded) data ($C'_n$) linked 1704 with corresponding metadata (an). Linking 1704 can comprise any type of pointer or reference. The dictionary might pair an with $C'_{n+1}$, such as by providing a pointer or reference to the corresponding CID (e.g., $CID_{n+1}$). The metadata and/or data might further include execution-specific information, such as a time stamp. The address key may provide a way (e.g., link) for a recipient or a function (e.g., a processor having software instructions that cause the processor to perform the function) to find and retrieve the $n^{th}$ coded data part once it computes (or inputs) the hash of the $(n-1)^{th}$ unencrypted coded data part. The encrypted coded data parts $C'_1, \ldots, C'_N$ may be stored 1705 in a decentralized storage, such as by distributing the encrypted coded data part $C'_1, \ldots, C'_N$ to network nodes of the IPFS. A sender, dApp, off-chain server, or other processing resource might perform any of the operations in FIG. 17A or 17B.

In FIG. 17B, a recipient (or one or more processors operating in coordination with or for the recipient, also referred to herein as the recipient) might be configured to search for and gather encrypted coded data parts $C'_1, \ldots, C'_N$ stored in a computer-readable memory system, such as a file sharing network. In on example, the sender might communicate directly or indirectly a first address $a_1$ to the recipient. The address $a_1$ might comprise at least a value of an IV. The address $a_1$ might be encrypted by the sender and decrypted by the recipient. As described above, the addresses and coded data can be linked together via some linked data structure.

In one example, the recipient might use the IV (or $h_0$=h(IV)) to locate the data structure (e.g., in the IPFS) that links to (e.g., references or points to) the first encrypted coded data part $C'_1$ (e.g., the CID thereof), and retrieves 1710 $C'_i$ from the IPFS. The recipient decrypts and computes the hash $h_n$ 1711 of the current ($n^{th}$) decrypted coded data part $C_n$: $h_n$=h($E_d(C'_n)$). The recipient may optionally produce 1712 a next (n+1) address from the hash it just computed: $a_{n+1}=f_a(h_n)$. The recipient, using the hash $h_n$ or the address $a_{n+1}$, might search a linked data structure that links the hash $h_n$ or address $a_{n+1}$ to the encrypted coded data part $C'_{n+1}$ CID, and retrieve 1713 $C'_{n+1}$.

If (n+1)<N, then n is incremented by one, and the recipient repeats the process 1711-1713 by decrypting and then computing 1711 the hash of each ($n^{th}$) decrypted coded data part, optionally generating 1712 the next $(n+1)^{th}$ address, and linking $h_n$ or $a_{n+1}$ to and retrieving 1713 the encrypted coded data part $C'_{n+1}$. If n=N, the recipient decrypts 1714 the ($N^{th}$) encrypted coded data part. In some aspects, the hash of the unencrypted $N^{th}$ coded data might be used, such as for the IV of a next data set. The decrypted data parts $C_1, \ldots, C_N$ might then be decoded 1715, according to techniques disclosed herein.

In the following pseudo-code, and with reference to FIGS. 18A and 18B, coded data (or any data) can be provisioned for storage in a decentralized network and the data can be retrieved from the decentralized network. A sender might use the sender's private key $p_s$, the recipient's public key $P_r$, and an initialization vector IV. Any type of IV might be employed, including the root hash from a Merkle tree whose leaves comprise the coded data parts $\{C_1, \ldots, C_N\}$.

The sender might encrypt the IV using encryption functions (e.g., $E_{Pr}$, $E_{ps}$) in any order. The sender may send (f_transmit) or other provide the encrypted IV to the recipient. The sender might derive the initial hash value $h_0=f\_h$(IV) from the IV. The sender encrypts each of the coded data parts $\{C_1, \ldots, C_N\}$. In this example, $C'_n=E_{h(n-1)}(C_n)$; the encryption key might comprise any combination of a previous hash $h_{n-1}$, $P_r$, and/or $p_s$. Encryption might employ the IV. A CID for each encrypted coded data part is generated: $CID_n=f\_h(C'_n)$. A linked data structure and/or function is provisioned to link CIDs with hash values; e.g., f_link($CID_n$, $h_{n-1}$). The hash of each 1 to N or N-1 unencrypted coded data part $C_n$ is computed; $h_n=f\_h(C_n)$.

%****** Sender has the following data:
$p_s$; % sender's private key
$P_r$; % recipient's public key
IV; % initialization vector, possibly=root hash from $\{C_1, \ldots, C_N\}$ Merkle tree
$\{C_1, \ldots, C_N\}$; % set of N coded (or any) data parts
%*******%
f_transmit($E_{Pr}(E_{ps}$(IV))); % sender sends encrypted IV to recipient
$h_0=f\_h$(IV); % set first hash value to hash of IV. h index is 0:(N-1)
for n=1:N
   $C'_n=E_{h(n-1)}(C_n)$; % encrypt $C_n$ using key=$h_{n-1}$, $P_r$ and/or $p_s$
   $CID_n=f\_h(C'_n)$; % generate the CID corresponding to the encrypted data $C'_n$
   f_link($CID_n$, $h_{n-1}$); % produce data structure that links $CID_n$ to previous hash $h_{n-1}$
   If n<N % condition only if next set of coded data doesn't depend on this set
      $h_n=f\_h(C_n)$; % hash of the $n^{th}$ unencrypted coded data
   end
end The encrypted coded data $\{C'_1, \ldots, C'_N\}$ can be distributed in a file-sharing network, and the linked data structure and/or function can be made available for the recipient to access. The recipient can have its private key $p_r$ and the sender's public key $P_s$. The recipient receives (e.g., from the sender) or acquires (e.g., from a smart contract or file sharing network) the IV, such as from an AONT packet, which it decodes and/or decrypts.

In one example, the recipient receives or acquires an encrypted IV (e.g., E_IV) that may be encrypted with one or more keys, such as $P_r$ and/or $p_s$, in any order. The recipient decodes E_IV to recover the IV (e.g., IV=($E_{pr}(E_{Ps}$(E_IV)))). The recipient might compute the hash of IV (e.g., $h_0=f\_h$(IV)). For each (n) hash value $h_n$, the recipient acquires $CID_n$ corresponding to the next (n+1) coded data $C_{n+1}$ (e.g., $CID_n=f\_linker(h_{n-1})$), such as via a function (f_linker) that uses the hash ha to retrieve the $CID_n$ from a linked data structure (e.g., dictionary, linked list, index, glossary, table, pairing, etc.). The recipient uses the $CID_n$ to search for and retrieve the corresponding encrypted coded data $C'_n$, such as via an IPFS search engine or function (e.g., f_IPFSfetch). The recipient decrypts the encrypted coded data to produce decrypted coded data $C_n$ (e.g., $C_n=D_{h(n-1)}(C'_n)$), where $D_{h(n-1)}$ can be a decryption function that employs a key k=$h_{n-1}$ (or some function thereof). Decryption may employ $p_r$, $P_s$, and/or some other key with or without $h_{n-1}$. The recipient can compute the hash of $C_n$ using a hash function, denoted by "h" or "f_h", (e.g., $h_n=f\_h(C_n)$). The hash $h_n$ might be computed for the first N-1 or all N coded packets $C_n$, n=1, \ldots, N-1.

%****** Recipient has the following data:
$p_r$; % recipient's private key
$P_s$; % sender's public key
%*******%
IV=($E_{pr}(E_{Ps}$(E_IV))); % recipient receives and decodes encrypted IV (E_IV)
$h_0=f\_h$(IV); % set first hash value to hash of IV. h index is 0:(N-1)
for n=1:N
   $CID_n=f\_linker(h_{n-1})$; % returns $CID_n$ linked to previous hash $h_{n-1}$
   $C'_n=f\_IPFSfetch(CID_n)$; % returns $C'_n$ for corresponding $CID_n$
   $C_1=D_{h(n-1)}(C'_n)$; % decrypt $C'_n$ using key=$h_{n-1}$, $P_s$ and/or $p_r$
   If n<N % condition only if next set of coded data doesn't depend on this set
      $h_n=f\_h(C_n)$; % hash of the $n^{th}$ decrypted coded data
   end
end
%**** Optional integrity check follows:
$h_N=f\_h(C_N)$; % hash of the $N^{th}$ decrypted coded data
hroot=f_root($h_1, \ldots, h_N$); % compute Merkle tree root of decrypted $\{C_1, \ldots, C_N\}$
return(IsEqual(hroot, IV)); % compare root to IV In some aspects, the recipient might perform an integrity check, such as to verify if the coded data is authentic. In one instance, the recipient has computed hashes $h_1, \ldots, h_N$. A Merkle tree root corresponding to the unencrypted coded data $\{C_1, \ldots, C_N\}$ (e.g., the coded data might be leaves of the Merkle tree) might be computed by the sender and included in the IV, which the recipient receives and processes as disclosed herein. The recipient computes the Merkle tree root (h_root) of the decrypted coded data (e.g., denoted by function f_root) and then compares h_root to the Merkle tree root included in the IV.

Figure 18A:
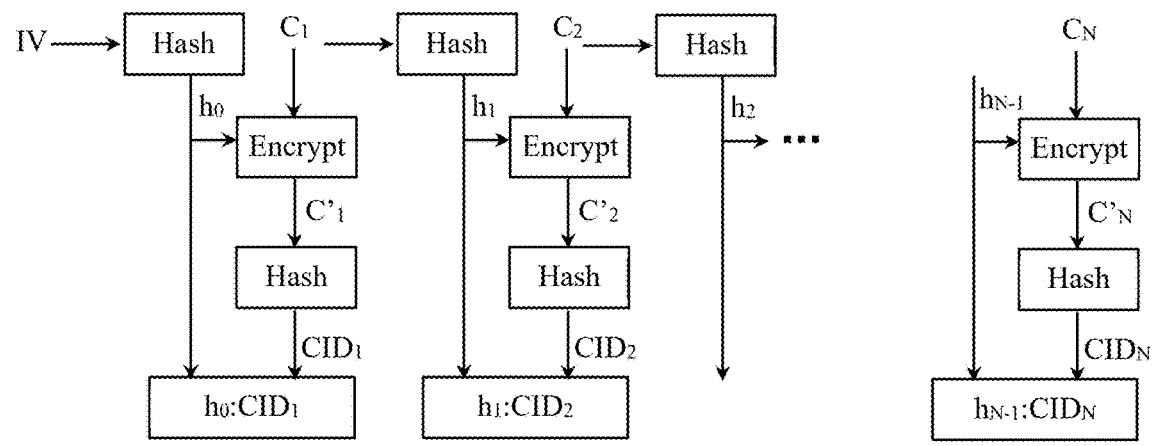
FIG. 18A illustrates a method for encoding and storing data.

In FIG. 18A, an IV is hashed to produce an initial hash value $h_0$. The hash $h_0$ might be employed in an encryption key to encrypt a first coded data part $C_1$ to produce a first encrypted coded data part $C'_1$. The $C'_1$ can be hashed in a process that produces a corresponding CID (e.g., $CID_1$). The hash $h_0$ and $CID_1$ are linked (such as in a linked data structure via a linking function denoted by $h_0:CID_1$. $C_1$ is hashed to produce $h_1$, and a similar process as above is performed to produce linked data $h_1:CID_2$. Similar operations can be performed on the rest of the coded data, the last linked data pair being $h_{N-1}:CID_N$. The encrypted coded data might be stored in a decentralized network, such as by delivering each coded data part to a different network node. The linked data structure might be stored by the sender, delivered to the recipient, stored on a blockchain, and/or stored off-chain (such as in a file sharing network or in a non-public server). The IV might be encrypted. The (encrypted) IV might be sent to the recipient, stored on a blockchain, and/or stored off-chain (such as in a file sharing network or in a non-public server).

Figure 18B:
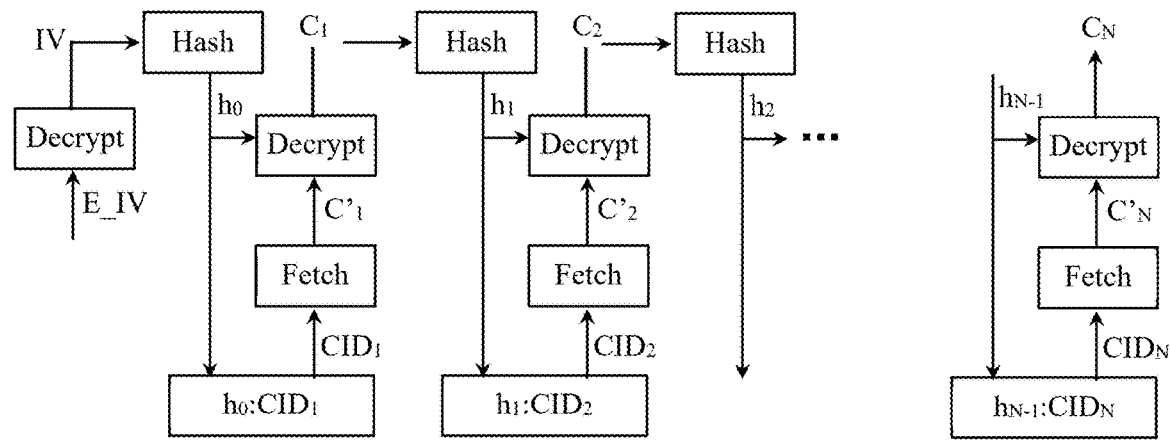
FIG. 18B illustrates a method for retrieving stored data and decoding the retrieved data.

In FIG. 18B a recipient receives the encrypted IV (E_IV) and decrypts E_IV to recover the IV. The IV is hashed to produce the initial hash value $h_0$, which is used to retrieve the corresponding CID (i.e., $CID_1$) from a function or linked-data structure. The $CID_1$ is used to retrieve its data $C'_1$, and the $C'_1$ is decrypted (e.g., using $h_0$ and/or any other appropriate key) to recover the first coded data part $C_1$. Each (n) coded data part $C_1$ to at least $C_{N-1}$ is hashed in a serial process, and hashes $h_1, \ldots, h_{N-1}$ are used to retrieve the next (n+1) encrypted coded data part ($C'_2$ to at least $C'_N$) CID ($CID_2, \ldots, CID_N$) from the linked data structure and/or function ($h_n:CID_{n+1}$).

In some aspects, the recipient might perform an integrity check on the decrypted coded data (e.g., $C_1, \ldots, C_N$), such as disclosed herein. The recipient can decode the decrypted coded data ($C_1, \ldots, C_N$) and possibly a received AONT part.

Layer 2 is a collective term for solutions designed to help scale applications by handling transactions off the Ethereum Mainnet (Layer 1) while taking advantage of the robust decentralized security model of Mainnet. Layer 2 takes transactions away from the main Ethereum chain, rolls them in neat bundles, then sends the bundles back to Ethereum. Doing so releases pressure on Ethereum but adds layers of complexity that might compromise security.

As the economy and number of transactions increase and the Ethereum network becomes very crowded, a question arises: is there really a need to record all the transactions on the main Ethereum chain, on-chain? The structure of blockchain can allow processing the transactions off-chain, and then recording data on the main Ethereum chain in a compressed way.

Ethereum L2 runs on top of Ethereum Layer 1 (L1), which supports the running of the network. Operating on L2 frees up the L1; i.e., it takes transactions off the main chain, offloading it to another layer, L2, enabling them to interact, and then recording the remainder of the whole transactions back to L1. Due to transactions being processed off-chain on L2, they benefit from higher transaction processing capacity, faster confirmation times, and lower gas fees.

Rollups are solutions that perform transaction execution outside the main Ethereum chain (layer 1) but post transaction data on layer 1. As transaction data is on layer 1, rollups are secured by layer 1. Inheriting the security properties of layer 1 while performing execution outside of layer 1 is a defining characteristic of rollups.

In disclosed aspects, a smart contract can maintain the state of all transactions and corresponding data (e.g., NFT content files) on layer 2, and this state can be updated with a validity proof based on disclosed linear network coded data. This means that the NFT content files themselves are rolled up into the validity proof. A "zero knowledge proof" approach can be used to present and publicly record the validity of each layer-2 block to the Ethereum blockchain. Zero knowledge reduces computing and storage resources for validating the blocks by reducing the amount of data needed to be recorded; e.g., zero knowledge of the entire data is needed. A smart contract might deconstruct and verify all of the transfers held in a single transaction.

In one aspect, two types of users might be employed: transactors and relayers. Transactors create their transactions and broadcast the transactions to the network. Relayers collect the transactions and corresponding content (original data) to create a rollup. It is the relayers' job to generate the coded data and the AONT and/or proof therefrom. The AONT and/or proof might comprise a hash or AONT value that represents the delta of the blockchain state. State refers to "state of being". A proof might compares a snapshot of the blockchain before the transactions to a snapshot of the blockchain after the transactions, and might report only the changes in a verifiable hash to the mainnet. In disclosed aspects, rollups of AONTs and/or proofs may be performed. A rollup might roll up multiple rollups. Recoding can be employed here. The original parts of a set of coded parts might themselves comprise coded parts. In some aspects, multiple different levels of coding via recoding might be provisioned for creating a rollup. For example, original data might be encoded with previously coded data, and/or different levels of recoded data might be encoded (i.e., recoded) together. Such aspects can provide for dynamically configurable rollups and proofs.

The scalability trilemma in blockchain technology is all about bandwidth. In most blockchain networks today, given a fixed amount of bandwidth per node, increasing the node count will increase the amount of time necessary to propagate all the data to all nodes. In disclosed aspects, the blocks themselves can be provisioned as coded data parts, each comprising a fraction of the block size. The coded data parts can be distributed among the blockchain nodes such that each node stores only a fraction of the size of each block. Due to the coefficient vector of each coded data part being conveyed as a hash function(s) of at least one other coded data part, original data can be encoded into a larger number of smaller coded data parts without substantially increasing the bandwidth (and storage) overhead associated with transmitting and storing the coefficient (i.e., code) vectors.

In one example, disclosed aspects may transmit data using UDP only, optionally with a transmit control protocol overlay, and might implement a random path per packet through the network as leaders (block producers) stream their data. The leader breaks the block into coded packets up to 64 KB in size. For a 128 MB block, the leader produces 2,000 64 KB coded packets, and transmits each packet to a different validator. In turn, each validator retransmits coded packets to a group of peers referred to as a neighborhood. The network can comprise a tree of neighborhoods. Each neighborhood is responsible for transmitting a portion of its coded data to each neighborhood below it. Recoding might be employed at each of these neighborhood levels (e.g., branch nodes). Each validator need only receive, store, and retransmit a subset of the total number of coded packets. Routing paths may be randomized by the routing path being selected based on the digital signature (e.g., hash) of each coded packet.

Archivers might be used for data storage. For example, coded data might be offloaded from validators to a network of nodes known as Archivers. These nodes can be lightweight (e.g., laptops) and can be subject to checks to ensure they are storing correct coded data.

Disclosed coding aspects might be implemented as a Verifiable Delay Function, which could be used as a proof of history (PoH), among other applications. In one example, disclosed coding, being implemented as a sequential process that employs the previous (n) coded data part (e.g., its hash) to produce the next (n+1) coded data part might be implemented as a loop, wherein each output is the next input. The loop might be sampled, and the number of iterations and state can be recorded. The recorded samples represent the passage of time encoded as a verifiable data structure. In addition, this loop can be used to record events. Messages that reference any of the samples are guaranteed to have been created after the sample. Messages can be inserted into the loop and hashed together with the state. This guarantees that a message was created before the next insert. This data structure guarantees both time and order of events embedded within. Recoding can be employed here.

Figure 19A:
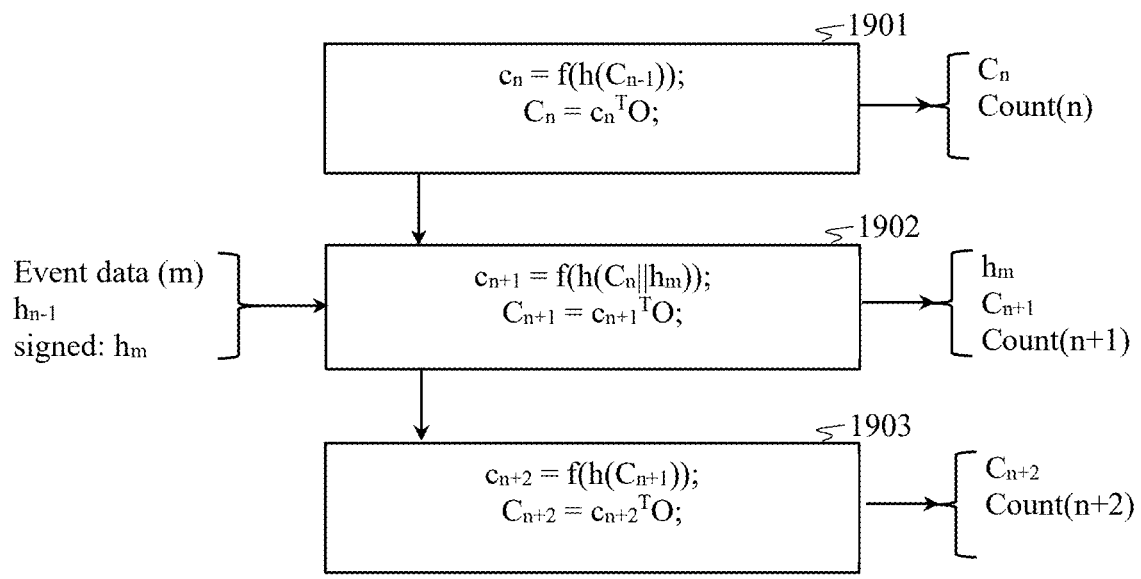
FIG. 19A illustrates a part of a sequence of operations that generates coded data parts in a proof-of-history configuration.

FIG. 19A illustrates a part of a sequence of operations 1901-1903 that generates coded data parts (e.g., $C_n$, $C_{n+1}$, $C_{n+2}$). In operation 1901, for example, coefficients $c_n$ are generated as a function of hashes of the previous coded data, $C_{n-1}$. The $n^{th}$ coded data is generated from $C_n=c_n^T O$. The output of 1901 includes at least $C_n$, and might include other information, such as a counter value (Count(n)) and/or hash value $h_{n-1}=h(C_{n-1})$. In operation 1902, a message (such as some event data) might be input. In one example, user-signed data is generated with hash hm and can be used to link hash hm to the next generated coded data, $C_{n+1}$.

Data might be inserted into the sequence by appending the hash hm of the data to the previous generated state (i.e., coded data $C_n$). The state, input data or its hash ($h_m$), and count may be published. Appending the input $h_m$ causes all future output to change unpredictably. It is still impossible to parallelize, and as long as the hash function h( ) is pre-image and collision resistant, it is computationally infeasible to create an input that would generate a desired hash in the future, or create an alternative history with the same hashes. Thus, a verifier can verify that time passed between any two append operations, and the verifier can verify the order of such events.

Figure 19B:
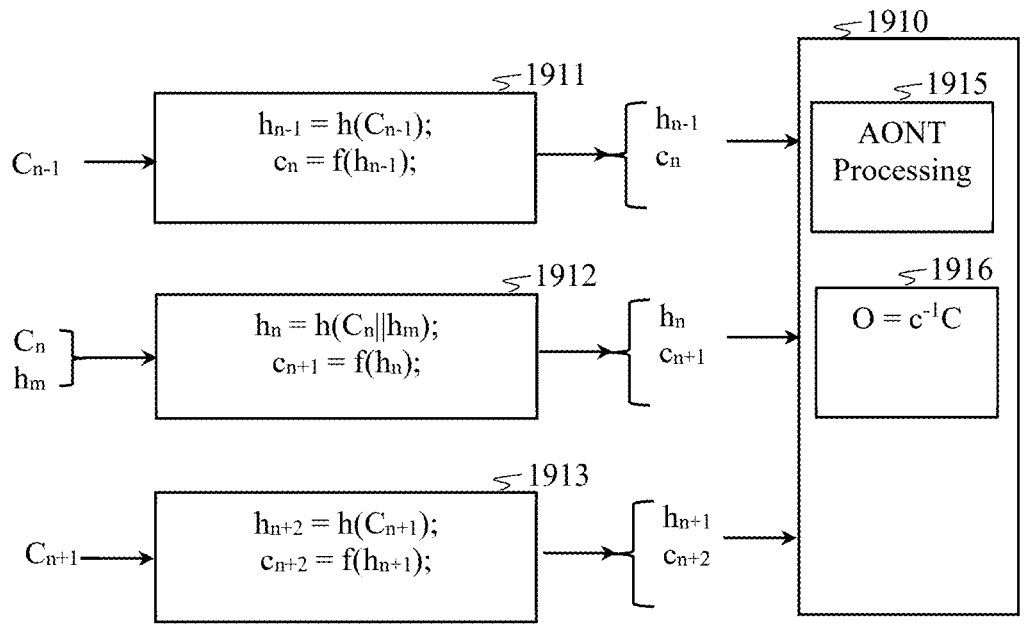
FIG. 19B illustrates a part of a sequence of operations that can decode coded data parts that were generated in a proof-of-history configuration.

While the outputs of the operations must be generated sequentially (e.g., serially, thus run on one processor core), the outputs can be verified in parallel (e.g., it can be parallelized to run on multiple processor cores). In FIG. 19B, a set of verifier cores 1911-1913 can be configured to function in parallel for computing the hashes (e.g., $h_{n-1}$, $h_n$, $h_{n+1}$) of the coded data (e.g., $C_{n-1}$, $C_n$, $C_{n+1}$) and deriving the coefficient vectors (e.g., $c_n$, $c_{n+1}$, $c_{n+2}$) from the hashes. This can be followed by downstream processing 1910, such as AONT processing 1915, which can compute an IV from an input AONT packet and the hashes, and Gaussian elimination (or some equivalent process that solves a linear system of equations) 1916 from an input of the IV, the coded data, and the coefficient vectors.

In disclosed aspects wherein signatures or encryption are mentioned, it should be appreciated that group signatures can be employed. A group signature scheme is a method for allowing a member of a group to anonymously sign a message on behalf of the group. In a group signature scheme, a group manager might add group members and might have the ability to reveal the original signer. In some systems, the responsibilities of adding members and revoking signature anonymity are separated and given to a membership manager and revocation manager, respectively.

In a group signature scheme, one or more of the following requirements can be provisioned. Valid signatures by group members always verify correctly, and invalid signatures always fail verification. Only members of the group can create valid group signatures. Given a message and its signature, the identity of the individual signer cannot be determined without the group manager's secret key. Given any valid signature, the group manager should be able to trace which user issued the signature. This and the previous requirement imply that only the group manager can break users' anonymity. Given two messages and their signatures, we cannot tell if the signatures were from the same signer or not. Even if all other group members (and the managers) collude, they cannot forge a signature for a non-participating group member. The revocation manager cannot falsely accuse a signer of creating a signature he did not create. A colluding subset of group members cannot generate a valid signature that the group manager cannot link to one of the colluding group members.

In disclosed aspects wherein signatures or encryption are mentioned, it should be appreciated that any of the following signature schemes might be employed. A ring signature excludes the requirement of a group manager and provides true anonymity for signers. Algorithms might maintain some "restricting" properties, such as traceability or linkability. A threshold signature involves a fixed-size quorum (threshold) of signers. Each signer must be a genuine group member with a share of a group secret signing key. A (t,n) threshold signature scheme supports n potential signers, any t of which can on behalf of the group. Threshold signatures reveal nothing about the t signers; no one can trace the identity of the signers (not even a trusted center who have set up the system). A multisignature represents a certain number of signers signing a given message. The number of signers need not be fixed, and signers' identities are evident from a given multi-signature. A multisignature can be shorter (sometimes a constant) than the simple collection of individual signatures. A proxy signature allows a delegator to give partial signing rights to other parties called proxy signers. Proxy signatures do not offer anonymity. Identity Escrow Schemes are an interactive dual of group signatures. Instead of off-line generation, a signature is directly generated by a signer based on a challenge provided by the verifier.

A number of Byzantine Fault Tolerant (BFT) protocols are known in the art. These protocols in some cases may be viewed as belonging to a sub-field of computer science referred to as "distributed computing." For example, BFT protocols may be used to allow a set of machines (e.g., servers) that are mutually distrusting to reach agreement. Such agreement is also referred to as "consensus." Usually, BFT protocols in this context are able to operate properly as long as no more than a maximum threshold number of the servers are corrupt (e.g., may behave arbitrarily and may attempt to prevent the network from reaching consensus). Conventional BFT protocols include the Nakamoto consensus protocols utilized in cryptocurrencies, such as Bitcoin and Ethereum.

Classical consensus protocols that do not use proof-of-work typically rely on an all-to-all broadcast mechanism, usually facilitated by a leader. These protocols typically but not necessarily incur quadratic message complexity cost. In addition, the presence of a leader typically imposes a performance bottleneck. Some conventional protocols of this type require many rounds of communication until a consensus is reached, with all-to-all communication being required in each round. For these and other reasons, conventional approaches generally do not scale to large numbers of servers.

Protocols in the illustrative aspects can scale well with network size and are highly efficient in message complexity, providing higher throughput and lower latency than conventional systems. Such protocols comprise programmable functionality that transforms a general-purpose processing system (e.g., computer or computer network) into a special-purpose processing system having measurably improved performance. Such improved performance in how processing system aspects operate is quantified by reduced time for the processing system to complete a specific task, reduced number of operations each node in the processing system must perform, reduced amount of data each node must store, reduced amount of communication bandwidth overhead required in the processing system's network, improved network performance metrics corresponding to reduced and/or distributed demand for network resources, and the like. Different aspects can achieve different performance benefits.

Some aspects can be configured to employ swarm intelligence, such as wherein each node implements a low-complexity set of operations, and the aggregate effect of such implementations results in highly complex behavior that would otherwise require exceptionally high-complexity processing (and communication overhead) to achieve.

By provisioning a validator to randomly (or pseudo-randomly) select other validators in order to ask them what their preferences are, participants in a consensus protocol build confidence in the correct decision shared by nodes in the network. With enough confidence, a decision can be finalized immediately. This process can be improved by weighting each node's preference based on that node's trustworthiness, and summing the weighted preferences to produce a confidence measure. A node's trustworthiness might be determined by the node's peers based on the accuracy of the node's previous preferences. Furthermore, node trustworthiness might be used to weight the selection of other validators in order to skew the selection toward more trustworthy nodes, which can finalize the decision more rapidly.

In one aspect, the following method might be employed:
1. A validator is presented with a set of transactions that have been issued and is asked to decide which transactions to "Accept."

There's no mining or polling to get new blocks. Transactions are broadcast to the network, which then hears them and begins voting. If there are no transactions to vote on, the nodes in the network don't do anything except listen until new transactions are heard. Validators listen for transactions. When they hear a transaction, they vote on whether a transaction is to be "Accepted", and if it is not, it is marked "Rejected". Transactions that appear virtuous will be voted on as "Accepted" by a validator. If it is conflicting, the transaction will be voted on as "Rejected". Each node might use the same process to determine whether a decision is virtuous and how likely they are in consensus with the rest of the network.

2. The node client presents the virtual machines (VMs) with their transactions, and the VMs can provide information to help the client determine which transactions are acceptable.
3. The validator selects a subset of these transactions that do not conflict, marks them as preferred, and attempts to accept them over the network.
4. Any nodes that query the validator receive its latest preferred choice for this decision.
5. The validator might make a selection of a number (K) of nodes from a validator list to query for their preferred decision.

The validator list (or one or more separate lists) can comprise a trustworthiness weight for each validator node. Each trustworthiness weight might be computed as an average of trustworthiness weights computed by the validator node's peers. Each trustworthiness weight might be determined by consensus among the validator node's peers. In some aspects, the probability of selection of each node might be weighted by the node's trustworthiness. For example, a pseudo-random selection might be performed by first ranking a number J of randomly selected candidate nodes using a random ranking process such that each candidate node has a rank number. Then the rank number is weighted by the node's trustworthiness weight. A subset K<J of the nodes corresponding to the K highest weighted rank numbers can be selected.

In one aspect, a validator sees a decision, makes its initial decision, and then collaborates with the rest of the network to determine whether the network agrees with this decision.
   6. Each queried validator responds with its preferred decision (vote). Responsive to the received decisions from the queried validators, the querying validator may update its decision.
      a. Each vote can be weighted by the voting node's stake amount and/or trustworthiness.
      b. The validator can record each received vote and update the trustworthiness weight of each voting node based on the correctness of its vote.
      c. In aspects where each validator maintains its own (e.g., local) trustworthiness list of other nodes, a validator may go into a "gossip" mode, whereby it polls other (e.g., trustworthy) validators for their trustworthiness decisions.
      d. The validator may update its local trustworthiness weights of other nodes based on information it receives during gossip mode.
   7. Meanwhile, other nodes are also selecting (pseudo-) random validators from the validator set to be queried for their preferred response and updating their answers accordingly.

A validator randomly (or pseudo-randomly) selects other validators to query. This might be repeated using new randomly (or pseudo-randomly) selected nodes until it builds up enough data to determine that its probability of being correct is above a threshold value. Once the node sees a high probability of agreement across the network, the node locks in its vote and accepts a transaction as final.
   8. This continues for at least M rounds or until a sufficient confidence threshold is reached, whichever comes last, with K validators being selected randomly in each round.

Decisions can be made in $O(1)$ (constant number) of messages per node. Classical protocols take $O(n^2)$ messages to reach consensus.
   9. Once a confidence threshold is reached, the decision on the transaction is locked in as final.
   10. If "Accepted", the transaction is sent to the VM to be handled; if "Rejected", the transaction is removed from consensus.

Furthermore, some aspects may implement techniques which amortize cost by constructing a directed acyclic graph (DAG) or other data structure that allows a single network polling to implicitly vote for several transactions at once, although it is to be appreciated that use of a DAG or other type of data structure to amortize cost is not required. Examples of other types of data structures that may be used in illustrative embodiments include a linked list of transactions and a hash-linked chain of transactions. In some embodiments, a DAG is implemented in the form of a linearly ordered, chained data structure configured not only to resolve transaction conflicts, but also to provide a platform in which a consistent totally-ordered log is replicated across the network.

In FIG. 20A, an apparatus comprises a first processing node (e.g., Validator) configured to participate in a consensus protocol with a plurality of additional processing nodes (e.g., other Validators). The first processing node is further configured in conjunction with its participation in the consensus protocol to implement repeated polling of respective selected subsets of the additional processing nodes, to resolve a state for a given transaction to a particular one of a plurality of possible states for the given transaction responsive to results of the repeated polling, and to initiate at least one automated action based at least in part on the resolved state for the given transaction.

By way of example, the first processing node might receive multiple transactions 2001. Each transaction might comprise a proof or problem to solve. The first processing node functions as a Verifier to perform 2002 verification of the transactions. The first processing node produces 2003 a list or group of verified transactions. The first processing node might employ trustworthiness weights for selecting K additional processing nodes (i.e., Validators). The first processing node might poll 2005 the K Validators and receive votes (i.e., results) from the K Validators.

Resolving the state for a given transaction in some aspects comprises utilizing the trustworthiness-weighted results of repeated polling 2005 to make a determination as to whether or not the given transaction should be accepted as a valid transaction. Such accepting of a given transaction as a valid transaction is considered an example of what is more generally referred to herein as "resolving the state" for the given transaction. A wide variety of other types of transactions, each having multiple possible states subject to consensus-based resolution to a particular state can be processed in other aspects.

In some aspects, the polling 2005 is repeated for a plurality of iterations, where a given one of the iterations comprises selecting a sample of the additional processing nodes, and sending queries to respective ones of the selected additional processing nodes. The sample in some aspects (e.g., FIG. 20B) comprises a probabilistic sample of J processing nodes (2011), illustratively selected at random, then ranked 2012 according to a randomly generated ranking number. The rank of each processing node is then weighted 2013 according to its corresponding trustworthiness. The sample may then be filtered by selecting 2014 a subset of K<J processing nodes based on their ranks (e.g., the K top-ranked nodes out of the J nodes can be selected). As another example, the sample can be selected deterministically, possibly using a seed.

Responsive to receipt of at least a threshold number of responses to the queries, the first processing node determines if at least a designated portion of the received responses indicate a particular state for the given transaction that differs from a current state for the given transaction in the first processing node. Alternatively, such a determination can be made responsive to a particular timeout being reached, if sufficient responses are not received prior to the particular timeout being reached.

Responsive to the designated portion of the received responses indicating a particular state for the given transaction that differs from a current state for the given transaction in the first processing node, the first processing node might update its current state for the given transaction to the particular state.

Additionally or alternatively, the first processing node might be configured to maintain a DAG of transactions that characterizes relationships between the given transaction and a plurality of other transactions, with the transactions being partitioned into mutually exclusive conflict sets. In such an aspect, maintaining the DAG illustratively can comprise (possibly employing trustworthiness for) selecting a sample of the additional processing nodes, sending queries to respective ones of the selected additional processing nodes, and updating the DAG based at least in part on (optionally trustworthiness-weighted) responses to the queries. The updating of the DAG might comprise inserting one or more additional transactions into the DAG, updating confidence values for respective ones of the transactions of the DAG, and/or repartitioning the transactions of the DAG into mutually exclusive conflict sets. Again, other types of data structures, such as linked lists and hash-linked chains, can be used in other aspects.

In FIG. 20C, the first processing node collects 2021 votes from the additional (queried) processing nodes. Each vote is weighted 2022 by the additional processing node's trustworthiness weight. The weighted votes are tallied 2023, and the tally might be used by the processing node to update its current state for the given transaction, or at least update 2006 the confidence of a given state for the transaction. The vote(s) from each of the additional processing nodes might be stored 2024 and later compared 2024 to the final decision produced by the consensus mechanism. Responsive to the comparison 2024, the trustworthiness weights may be correspondingly updated 2008.

In one aspect, an apparatus comprises:
a first processing node comprising a processor coupled to a memory;
the first processing node being configured to participate in a consensus protocol with additional processing nodes;
the first processing node being further configured in conjunction with its participation in the consensus protocol:
to implement repeated polling of respective selected subsets of the additional processing nodes;
to resolve a state for a given transaction to a particular one of a plurality of possible states for the given transaction responsive to results of the repeated polling; and
to initiate at least one automated action based at least in part on the resolved state for the given transaction;
wherein node trustworthiness of each of the additional processing nodes is employed for at least one of:
selecting the respective selected subsets of the additional processing nodes, and
weighting the results of the repeated polling.
In some aspects,
The first processing node might develop at least one of a local version and a shared version of the node trustworthiness.
The first processing node might update its local version of the node trustworthiness by comparing the results of the repeated polling to the state for the given transaction.
The first processing node might employ a consensus mechanism with other nodes to update the shared version of the node trustworthiness.
The first processing node might share its local version of the node trustworthiness with the additional processing nodes.
The first processing node might poll the additional processing nodes for their node trustworthiness information.

The node trustworthiness information might be stored on a blockchain or decentralized ledger.

The first processing node might collect node trustworthiness information stored on a blockchain or decentralized ledger.

Updates to node trustworthiness might be implemented via a state change, such as on a blockchain or decentralized ledger.

The first processing node might update its local version of node trustworthiness based on node trustworthiness information received from the additional processing nodes.

The first processing node might employ a gossip mode whereby the first processing node broadcasts its local version of the node trustworthiness to the additional processing nodes and/or listens to node trustworthiness broadcasts from the additional processing nodes.

The consensus protocol might be configured to provide Byzantine fault tolerance.

The at least one automated action might comprise adding an entry characterizing the given transaction to a distributed ledger collectively maintained by the first and additional processing nodes.

The entry might comprise a block, and the distributed ledger might comprise a blockchain.

Participation of the first and additional processing nodes in the consensus protocol might be controlled in accordance with at least one specified control mechanism requiring submission of one or more designated proofs by each of the first and additional processing nodes.

The designated proof might comprise a proof other than a proof-of-work.

A given instance of the repeated polling might comprise polling a random sample of the additional processing nodes.

A given instance of the repeated polling might comprise polling a pseudo-random sample of the additional processing nodes.

A given instance of the repeated polling might comprise polling a deterministic sample of the additional processing nodes.

The repeated polling might be repeated for a plurality of iterations with each such iteration polling a different selected subset of the additional processing nodes.

The first processing node might be configured to utilize the results of the repeated polling to maintain a data structure that characterizes relationships between the given transaction and a plurality of other transactions, the data structure comprising at least one of a directed acyclic graph, a linked list, and a hash-linked chain.

Resolving the state for a given transaction responsive to results of the repeated polling might comprise utilizing the results of the repeated polling to make a determination as to whether or not the given transaction should be accepted as a valid transaction.

The repeated polling might be repeated for a plurality of iterations, a given one of the iterations comprising: selecting a sample of the additional processing nodes; sending queries to respective ones of the selected additional processing nodes; responsive to receipt of at least a threshold number of responses to the queries, determining if at least a designated portion of the received responses indicate a particular state for the given transaction that differs from a current state for the given transaction in the first processing node; and responsive to the designated portion of the received responses indicating a particular state for the given transaction that differs from a current state for the given transaction in the first processing node, updating the current state for the given transaction in the first processing node to the particular state.

Resolving the state for the given transaction responsive to results of the repeated polling might comprise resolving the state for the given transaction to the current state at the completion of the plurality of iterations.

The first processing node might be configured to maintain a conviction strength counter that indicates a number of consecutive iterations of the repeated polling for which at least a designated portion of the received responses indicate the particular state for the given transaction.

Resolving the state for the given transaction responsive to results of the repeated polling might comprise resolving the state for the given transaction to the particular state responsive to the conviction strength counter exceeding a threshold.

The first processing node might be configured to maintain confidence counters for respective ones of the possible states for the given transaction, with each of the confidence counters indicating a total number of queries over multiple ones of the iterations that have yielded responses indicating the corresponding state.

Resolving the state for the given transaction responsive to results of the repeated polling might comprise resolving the state for the given transaction to one of the possible states responsive to the confidence counter for that possible state exceeding the confidence counter for at least one other one of the possible states.

The first processing node might be configured to maintain a directed acyclic graph of transactions that characterizes relationships between the given transaction and a plurality of other transactions with the transactions being partitioned into mutually exclusive conflict sets.

Maintaining the directed acyclic graph might comprise: selecting a sample of the additional processing nodes; sending queries to respective ones of the selected additional processing nodes; and updating the directed acyclic graph based at least in part on responses to the queries; wherein updating the directed acyclic graph comprises one or more of: inserting one or more additional transactions into the directed acyclic graph; updating confidence values for respective ones of the transactions of the directed acyclic graph; and repartitioning the transactions of the directed acyclic graph into mutually exclusive conflict sets.

Resolving the state for the given transaction responsive to results of the repeated polling might comprise resolving the state responsive to the given transaction being the only transaction in its conflict set and the given transaction having a confidence value that exceeds a threshold.

Resolving the state for the given transaction responsive to results of the repeated polling might comprise resolving the state to one of the possible states responsive to a confidence counter for that possible state exceeding a confidence counter for at least one other one of the possible states.

Each transaction in a blockchain is signed by the rightful owner of the resource being traded in the transaction. When new resources are provisioned, they are assigned to an owner. This owner, in turn, can prepare new transactions that send those resources to others by simply embedding the new owner's public key in the transaction and then signing the transaction with the owner's private-key. In this way, a verifiable link of transactions is created; each new transaction, with a new owner, pointing to the previous transaction, with the previous owner.

Transactions, by their very nature, can do more than just send resources from owner A to owner B. In fact, the very act of doing so can be described as a very simple program: the sender might produce a computation (transaction) that can only be performed if the receiver produces, at some point in the future, the right inputs. For example, the right input might be the proof of ownership from the receiver. In other words, the receiver can only utilize (e.g., consume or transact) resources he received if he proves he is the rightful owner of those resources.

A blockchain essentially encodes state transitions. Whenever someone sends a resource to someone else, the global state of the blockchain is changed. Blockchains are configured for reaching consensus for decentralized computations, and it does not necessarily matter what those computations are.

In disclosed aspects, the resources can comprise physical resource blocks (e.g., PRBs) employed for communicating in a wireless communication network, for example. Any of such network resources described in 3GPP TS 36.211 V13.2.0, ETSI TS 138 211 V15.3.0 (which are incorporated by reference in their entireties), and/or other 3GPP technical specifications or IEEE technical specifications may be employed herein. Network resources can include, but are not limited to, spatial channels, MIMO channels, layers, streams, bandwidth parts (BWPs), multiple-access channels, subspace channels, spectrum, code spaces, resource elements, etc. Network resources might comprise network permissions and/or operating parameters, including (but not limited to) Quality of Service, bandwidth, power, routing priority, network path(s), maximum latency, error-rate (e.g., bit-error-rate, packet error rate, etc.) guarantee, etc. Network resources might comprise virtual machine resources, such as memory, processors, network ports, network services, and/or any of various software-defined resources, such as SDN resources, SDR resources, etc.

Figure 21:
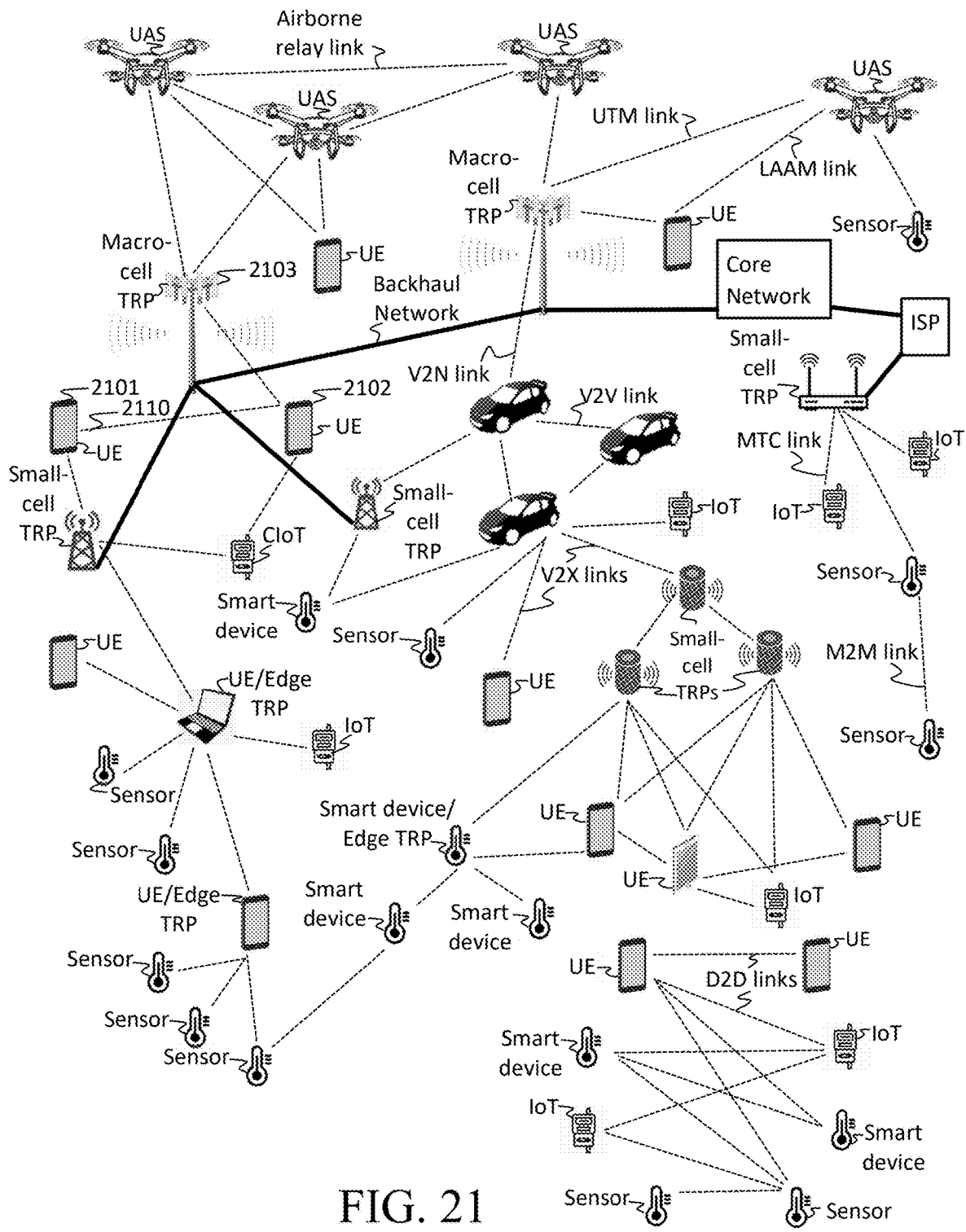
FIG. 21 shows a communication network comprising multiple types of networks, any of which might comprise an information processing system configured for implementing any of the methods disclosed herein.

In some aspects, a blockchain node and/or file sharing network node might comprise any network node in a wireless communication network, such as any one or more of the devices shown in FIG. 21 and disclosed herein and/or disclosed in Ser. No. 16/751,946, and/or any of the wireless networks disclosed in any of the other patent documents mentioned herein. For example, the wireless network may be a new radio (NR) or 5G network. Devices, such as UEs, relays, and/or TRPs, may be configured in various network topologies and/or services. Some examples of the method, apparatus, and non-transitory computer-readable medium described herein may be used in eNMB, MTC, URLLC, mmWave, D2D, ProSe, mobile edge computing, vehicular networks, or IoT communications. D2D and ProSe includes use cases wherein a UE supports ProSe Discovery and/or ProSe Communication (e.g., a ProSe-enabled UE). 3GPP Services working group defined use cases and scenarios for ProSe in TR 22.803, which is incorporated by reference in its entirety. Configuration signaling described herein can include ProSe discovery and/or communications signaling. Various types of network-to-device links and D2D links may be supported in the wireless communication system. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), vehicle-to-network (V2N) links, and V2X links. Broadcast links may include, without limitation, V2V links, V2X links, M2M links, and MTC links. In some aspects, V2V and V2N communication may be considered as examples of V2X communication.

In some aspects, network resource management might employ decentralized management of the resources, in whole or in part. Wireless nodes could be configured as mobile ad-hoc blockchains to transact network resources between different devices. In one instance, a UE or TRP or some other wireless device might allocate or schedule a network resource to a different UE or TRP or some other wireless device via a blockchain transaction that transfers ownership of the network resource to the different UE or TRP or some other wireless device. In one instance, a UE or TRP or some other wireless device might release a network resource by instantiating a blockchain transaction that transfers ownership of the network resource to a different UE or TRP or some other wireless device. In some instances, the network resource might be held by a smart contract in the blockchain. Accessing one or more methods in the smart contract might cause the smart contract to allocate or schedule the network resource(s) as a blockchain transaction to at least one UE, TRP, and/or some other wireless device or wireless network (e.g., possibly a subnetwork). Accessing one or more methods in the smart contract might cause the smart contract to de-allocate or remove the network resource(s) (via a blockchain transaction) from at least one UE, TRP, and/or some other wireless device or wireless network (e.g., possibly a subnetwork).

A node might create a transaction that assigns an address to a smart contract. After this initial transaction, the contract can become a permanent part of the blockchain, and its address may never change. Whenever a node wants to call any of the methods defined by the contract, it can send a message to the address for the contract, specifying data as input and the method to be called. The contract will run as part of the creation of newer blocks (up to the gas limit or completion). Contract methods can return a value or store data. This data is part of the state of the blockchain. As network resources are allocated, deallocated, reassigned, reserved, scheduled, or released, the state of the blockchain changes. Verifying a transaction might entail verifying that the sender has ownership of the resource being transferred (e.g., a proof of ownership). Verifying a transaction might entail verifying that the intended recipient has a right to ownership of the resource being transferred (e.g., a proof of ownership). In one example, the sender (current owner) can embed the recipient's (i.e., new owner's) public key in the transaction and then sign the transaction with the sender's private-key. In some instances, only the peers participating in transactions might process the blockchain data (and/or corresponding off-chain data). In such instances, the authority to operate as a blockchain node and/or file-sharing network node might be transacted, possibly as a token (e.g., an NFT). Such tokens might be transferred, created, stored, and/or destroyed as the network topology changes. In some instances, local ad-hoc mobile blockchains might be provisioned within geographical boundaries within which certain network resources are available for scheduling. As a mobile wireless node transits, or as the node's channel state information changes, the node might join or exit an ad-hoc mobile blockchain, or switch between ad-hoc mobile blockchains.

Disclosed aspects can be implemented, for example, in the form of information processing systems comprising computer networks or other arrangements of networks, clients, servers, processing devices and other components. It should be understood, however, that aspects of the disclosure are more generally applicable to a wide variety of other types of information processing systems and associated networks, clients, servers, processing devices, and/or other components. Accordingly, the term "information processing system" as used herein is intended to be broadly construed so as to encompass these and other arrangements. The term "processing device" as used herein is similarly intended to broadly construed, so as to further encompass, for example, robots and other automata.

FIG. 21 shows an information processing system that can be configured for implementing any of the methods disclosed herein. In one example, a consensus protocol for metastable Byzantine agreement might be implemented. The system comprises a plurality of consensus protocol nodes, such as including UE 2101 and TRP 2103. The consensus protocol nodes are configured to communicate with one another over at least one network 2110. The system 100 further comprises a plurality of client devices, including UE 2102, which can be coupled directly to the network 2110 or indirectly via respective consensus protocol nodes. Numerous other arrangements are possible.

In one example, each of the client devices is coupled to the network 2110 via a corresponding one of the consensus protocol nodes 2101 or 2103. As another example, one or more of the client devices may have a corresponding one of the consensus protocol nodes incorporated therein. In other examples, client devices might be provisioned in subnetworks and/or edge networks. Consensus protocol nodes might be gateways, access points, TRPs, and/or other devices in the subnetworks and/or edge networks.

In some instances, the network 2110 might comprise multiple network slices. 5G network slicing is a network architecture that enables the multiplexing of virtualized and independent logical networks on the same physical network infrastructure. Each network slice is an isolated end-to-end network tailored to fulfill diverse requirements requested by a particular application. The realization of this service-oriented view of the network leverages on the concepts of software-defined networking (SDN) and network function virtualization (NFV) that allow the implementation of flexible and scalable network slices on top of a common network infrastructure.

In one aspect, a first network slice can be provisioned to support a first set of service level requirements tailored for implementing blockchain-related operations disclosed herein, which might include consensus protocol operations. At least a second network slice can be provisioned to support at least a second set of service level requirements for other communication services. The first network slice may be used for transacting network resources employed in the at least second network slice. Each of a plurality of network nodes might be configured to operate in the first network slice for requesting, receiving, and releasing network resources and might be configured to operate in the at least second network slice that employs said network resources. Each network slice may be provisioned by a different mobile virtual network operator (MVNO). An MVNO might autonomously deploy multiple network slices that are customized to the various applications provided to its own users. In some aspects, an MVNO might deploy blockchain operations, such as operations that include a consensus protocol, in a separate network slice.

Certain applications, such as mobile broadband, machine-to-machine communications (e.g. in manufacturing or logistics), or smart cars, can benefit from leveraging different aspects of 5G technology. One application might require higher speeds, another low latency, and yet another access to edge computing resources. By creating separate slices that prioritize specific resources, a 5G operator can offer tailored solutions to particular industries. In the aforementioned first network slice, a blockchain protocol can be configured to manage resources for multiple ones of the at least second network slice, wherein the blockchain protocol is configured to prioritize provisioning of the network resources according to the service level requirements of each of the multiple ones of the at least second network slice. In other aspects, each of the multiple ones of the at least second network slice (e.g., a 5G application slice) might be paired with a corresponding resource-management network slice configured to manage the network resources of the 5G application slice. The resource-management network slice can employ blockchain technology disclosed herein.

In some aspects, cross-chain technology might be implemented to enable interoperability between multiple blockchain-based resource-management network slices. Cross-chain technology can enable the communication of state and other information between blockchains. Cross-Chain Interoperability Protocol (CCIP) provides a universal, open standard for developers to build secure services and applications that can send messages, transfer tokens, and initiate actions across multiple networks. In one example, a smart contract from a first resource-management network slice (first blockchain) invokes Chainlink's Messaging Router, which will leverage Chainlink DONs to securely send the message to a destination chain (e.g., second resource-management network slice), where another Messaging Router validates it and sends it to at least one of the destination chain's smart contracts. In such aspects, cross-chain technology can be configured to transact network resources from the first resource-management network slice to the second resource-management network slice.

The client devices coupled directly to the network can each be configured, for example, to incorporate a consensus protocol node as an internal component thereof, in combination with other types of internal components configured to perform various other functions. In some aspects, the client devices coupled directly to the network might be eliminated altogether.

The consensus protocol nodes are examples of what are more generally referred to herein as "processing nodes" each comprising a processor coupled to a memory. Such processing nodes in some aspects are implemented as respective processing devices, or as portions of respective processing devices. Examples of processing nodes as that term is broadly used herein comprise computers, servers and other types of machines. As a more particular example, in some embodiments, at least a subset of the consensus protocol nodes are implemented as respective servers.

Each of the consensus protocol nodes is configured to participate in a consensus protocol with other ones of the consensus protocol nodes, as disclosed herein. A given processing device can implement a consensus protocol node as well other related functionality.

One or more of the client devices can each comprise, for example, a laptop computer, tablet computer or desktop personal computer, a mobile telephone, or another type of computer or communication device, embedded device, or robot, a UE, a TRP, a relay, a remote radio head, as well as combinations of multiple such devices. In some aspects, a client device might be a virtual machine. At least one of the client devices can implement a corresponding one of the consensus protocol nodes. The client devices illustratively generate transactions that are processed by the consensus protocol nodes. The client devices are more generally referred to herein as respective "clients."

Communications between the various elements of system are assumed to take place over one or more networks, such as shown in FIG. 21. The network can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The consensus protocol node can comprise a processor, a memory, and a network interface. The processor is operatively coupled to the memory and to the network interface. The processor is configured to execute software program code for implementing functionality associated with a consensus protocol for metastable Byzantine agreement.

The processor may comprise, for example, a microprocessor, an application-specific integrated circuit (ASIC), a field-programmable gate array (FPGA), a central processing unit (CPU), an arithmetic logic unit (ALU), a graphics processing unit (GPU), a digital signal processor (DSP), or other similar processing device component, as well as other types and arrangements of processing circuitry, in any combination. At least portions of the software program code executed by the processor are also stored in the memory and retrieved therefrom by the processor for execution.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other aspects.

In addition, disclosed aspects may be implemented in the form of integrated circuits comprising processing circuitry configured to implement processing operations associated with a consensus protocol for metastable Byzantine agreement as disclosed herein.

The network interface can be configured to allow the consensus protocol node to communicate over the network with other system elements, and illustratively comprises one or more network transceivers.

The consensus protocol node can further comprise a subsampled polling module, conviction and/or confidence counters, and a directed acyclic graph (DAG) of known transactions. At least portions of one or more of subsampled polling module, counters, and DAG, of the consensus protocol node, can be implemented, at least in part, utilizing software stored in memory and executed by a processor. For example, a consensus protocol for metastable Byzantine agreement as disclosed herein illustratively involves sampling other ones of the consensus protocol nodes using the subsampled polling module, as well as maintaining the counters and the DAG 134.

As indicated previously, the term "directed acyclic graph" or DAG as used herein is intended to broadly construed. Moreover, various non-DAG data structures can be used in other embodiments, or the use of a DAG or other data structure can be eliminated altogether, for example, in aspects involving singleton decisions. It is therefore to be appreciated that the DAG can be replaced with other types of data structures or eliminated completely in other aspects.

In operation, each of the consensus protocol nodes can interact with selected subsets of the other ones of the consensus protocol nodes in carrying out a consensus protocol of the type disclosed herein. For example, the consensus protocol node, via its subsampled polling module, can implement repeated polling of respective selected subsets of the other consensus protocol nodes, resolve a state for a given transaction to a particular one of a plurality of possible states for the given transaction responsive to results of the repeated polling, and initiate at least one automated action based at least in part on the resolved state for the given transaction. The repeated polling may be over subsets of nodes chosen probabilistically (i.e., at random) or deterministically. The repeated polling can employ a trustworthiness metric for each node to select the subsets.

In some aspects, the given transaction comprises a network resources transaction, although a wide variety of other types of transactions can be supported. The term "transaction" as used herein is therefore intended to be broadly construed. For example, resolving a state for a given transaction, as that term is broadly used herein, can comprise determining a particular one of a plurality of possible values for a variable, determining whether or not a command or script should be executed, whether a physical or virtual wireless communication resource (e.g., a PRB, BWP, frequency spectrum, etc.) should be transferred from one UE, TRP, network, or network slice to another, and so on. The given transaction can therefore comprise any type of information element having multiple possible states suitable for consensus-based resolution to a particular one of the possible states by the consensus protocol nodes.

It is to be appreciated in this regard that some aspects can be configured to support multiple value consensus and/or multiple transaction consensus, as well as other arrangements involving different numbers of candidates. Accordingly, illustrative aspects can resolve state among one, two, or more than two candidates, and should not be viewed as limited to any particular bivalent examples disclosed herein.

Disclosed coding can generate coded data units from any two or more coded or uncoded data units locally and on the fly. Such aspects can advantageously exploit simple linear algebraic operations, as well as random (or pseudo-random) generation of its linear coefficients. This allows the code (i.e., the coefficients) to be carried within its data units, hence enabling fully distributed and/or decentralized operation.

Coding can be implemented to employ classical and/or sliding window encoding. Applications include streaming, D2D, TCP, and SDN. Coding can be implemented in a multi-hop network topology. Applications include edge caches, wireless mesh networks, multicast, satellite networks, relay topologies, and SDN. Coding might be implemented across multiple network paths and or multiple networks. Applications include multi-source streaming, multi-path TCP, channel bonding, heterogeneous network combining, and SDN. Coding can be configured for multi-source, multi-destination, and/or mesh network topologies. Applications include distributed Cloud storage and/or computing, instantiating and/or adapting decentralized virtual machines, advance mesh application (e.g., IoT, V2X, M2M, smart grid, etc.), mobile ad-hoc blockchains, and SDN. Coding can be applied to the wide scope of topologies required by emerging applications.

Disclosed coding can be used as a block, convolutional, or rateless code in a point-to-point (P2P) and/or multicast setting, while extending the functionality of both source and channel coding. Disclosed aspects can be configured for distributed network environments, i.e., network coding. As such, disclosed coding can uniquely enable intermediate nodes to participate in network reliability with minimal coordination 3#

Disclosed aspects can be configured for linear network coding in communication networks, such as: to provide for error correction and thereby correct for missing or corrupted data packets; encode data in a sliding window to configure the coding to match protocol behavior as well as to enable fewer retransmissions; configure each code (e.g., code vector) to be conveyed as a function (e.g., cryptographic hash) of each coded data packet, thereby reducing or eliminating tracking overhead; enable composability without decoding (e.g., add incremental redundancy when and where it is needed); and/or provision completely distributed coding operations, thereby enabling stateless management. Coding in a sliding window and in a composable way (e.g., recoding) are enabled by the flexibility and reduced structure of the disclosed coding techniques.

Latency reduction in latency-sensitive applications, such as over-the-top (OTT) video streaming are made possible by adapting the coding to a sliding-window implementation. Coding in a sliding window presents a number of advantages over traditional block coding. In block coding, packet blocks are usually predefined. Disclosed coding can generate redundancy (i.e., coded packets) from each block independently. When round trip times (RTTs) are high, redundancy rates are usually fixed. However, for low enough RTTs, redundancy rates can fluctuate dynamically with channel state information (CSI) or depend on feedback information. Sliding window coding therefore allows for rateless coding with dynamic block sizes.

For each block, unlike legacy block codes (such as Reed Solomon), disclosed coding techniques can generate useful coded packets from incomplete coded/uncoded blocks. This means that redundancy can be generated before the block is complete. This technique is termed on-the-fly coding and allows for removing coding delays at transmit buffers.

This can result in significant latency reduction for on-chain data storage because the coding doesn't have to wait for all the original data packets (e.g., transaction data) to become available in order to fill a block. This means data can be written to a blockchain before the block is filled, so the blockchain effectively becomes a sliding-window chain, Instead of hashes (just) linking blocks together, the coded data packets are linked together by their hashes. In a sliding-window coding scheme, the size of the window might change according to the rate that transactions (data) are being generated. Recoding can enable the windows to be configured to overlap. In some instances, a coded data part might reside in more than one window.

Disclosed aspects might make blockchain more adaptable to dynamic environments, such as mobile ad-hoc and IoT networks, where channel state information and congestion can change rapidly and by substantial amounts.

The problem with structured codes is their rigidity: blocks do not overlap and are often fixed in size. As a result, packets from a given block cannot be passed to higher layers, (e.g., the application layer), as reliable goodput before a sufficient number of original and/or coded packets is received. This creates a lower limit in latency and decoding complexity that can affect delay-sensitive applications, such as streaming or control.

Disclosed aspects include a more flexible technique, referred to as sliding window coding, where coding can be performed across a dynamic set of packets. Sliding window coding removes the limitation of fixed blocks by creating a variable-sized sliding window. Source, or native, packets can be added or removed from the sliding window dynamically. Coded packets associated to a given sliding window position (i.e., first packet index) and size can be inserted into the stream. The window definition, window size, redundancy rate, and transmission policy may depend on a number of factors, such as receiver feedback, streaming requirements, CSI, congestion control, load control, etc.

Sliding window coding can be configured in the context of coded Transmission Control Protocol (TCP). This enables the coded TCP source to transmit coded representations of its congestion window, thus stabilizing the flow and avoiding connection breakdowns due to the random packet losses or RTT swings seen at the transport layer. Sliding window coding brings significant latency reduction in a number of applications, such as Over The Top (OTT) streaming and transport over any topology.

Recoding enables intermediate transport nodes and storage caches to combine coded packets/sectors to create new coded packets/sectors that are effective representations of all original packets/sectors involved in the first coding stage. With recoding, coded symbols (i.e., packet/file/drive chunks) can be recombined without decoding. This feature is possible owing to the portability of the coding coefficients and the random nature of code selection. Recoding involves the linear combination of coded packets and the recalculation of new coding coefficients. It is a flexible process where data can be encoded as it becomes available. For example, recoding can combine a previously encoded packet with a previously absent original packet. Such aspects may be employed in multi-hop, mesh, and cache networks. Recoding can enable intermediate nodes to compensate for dynamic losses locally without returning to the source.

In some aspects, recoding allows intermediate nodes to bring a sufficient number of degrees of freedom to the receiver with little need for coordination. The amount of redundancy may depend on multiple factors, such as path/link losses, path/link capacity, device capability, etc. This can enable the capacity of multiple paths to be combined dynamically.

Recoding can be provisioned as a dynamic caching enabler that is particularly suitable for mobile caching or fast storage repair. In some aspects, the caches may not be allowed to have enough degrees of freedom to decode the original pieces, which can provide for information-theoretic security.

In multicast networks, the number of receivers increases, managing feedback with individual receivers is not scalable, hence the advent of complex multicasting protocols such as NACK Oriented Reliable Multicast (NORM). Disclosed coding aspects enable significant reduction of feedback while enabling high-QoE broadcast solutions. This can be especially useful in decentralized networks, such as blockchain networks, file-sharing networks, 5G edge networks, and content delivery networks.

By generating coded data units from any source units on the fly, disclosed aspects can be configured to provision coding schemes where latency, bandwidth, complexity, and/ or reliability can be tuned dynamically to match link conditions and network requirements. This inherent flexibility enables a wider scope of tradeoffs and optimizations compared to conventional coding techniques, making it suitable for high Round Trip Time (RTT) environments.

Recoding can create coded sectors from other coded (and uncoded) sectors without decoding first. This enables storage nodes and intermediate caches to generate additional redundancy on demand and in a decentralized fashion, leading to tremendous reductions in required transportation, overall storage, energy.

Disclosed aspects can be employed in distributed storage applications, including multi-drive storage, edge caching, and hybrid cloud applications. Such storage solutions can be configured for Peer-to-Peer (P2P) networks and applications, Content Delivery Networks (CDN), cloud services, and cloud security.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. .sctn. 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 20.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for transacting a record in a blockchain, comprising:
    performing linear network coding on the record or on a data file corresponding to the record, to produce a plurality of coded data parts;
    communicating fewer than the plurality of coded data parts to each blockchain node, each file-sharing network node, or each Cloud storage network node; and
    storing the fewer than the plurality of coded data parts on the each blockchain node, the each file-sharing network node, or the each Cloud storage network node;
    wherein each of the plurality of coded data parts is smaller than the record or the data file; and wherein the linear network coding derives linear network coding coefficients from a one-way function of at least one of the plurality of coded data parts.

2. The method of claim 1, wherein storing comprises employing fewer than the plurality of coded data parts to effect a state change on the blockchain.

3. The method of claim 1, wherein each of the plurality of coded data parts comprises an index corresponding to chronology of production of the plurality of coded data parts.

4. The method of claim 1, wherein each of the plurality of coded data parts comprises an identifier that associates the each of the plurality of coded data parts with the data file.

5. The method of claim 1, wherein at least one of the plurality of coded data parts comprises an initialization vector.

6. The method of claim 1, further comprising performing an all-or-nothing transform on a plurality of original data parts produced from the data file, or the plurality of coded data parts.

7. The method of claim 1, further comprising encrypting the data file, at least one of the plurality of coded data parts, or the data file and at least one of the plurality of coded data parts.

8. An apparatus for transacting a record in a blockchain, comprising:
    at least one processor; and
    at least one computer-readable memory in electronic communication with the at least one processor, and instructions stored in the at least one computer-readable memory, the instructions executable by the at least one processor for:
        performing linear network coding on the record or on a data file corresponding to the record, to produce a plurality of coded data parts;
        communicating fewer than the plurality of coded data parts to each blockchain node, each file-sharing network node, or each Cloud storage network node; and storing the fewer than the plurality of coded data parts on the each blockchain node, the each file-sharing network node, or the each Cloud storage network node;

wherein each of the plurality of coded data parts is smaller than the record or the data file; and wherein the linear network coding derives linear network coding coefficients from a one-way function of at least one of the plurality of coded data parts.

9. The apparatus of claim 8, wherein storing comprises employing the fewer than the plurality of coded data parts to effect a state change on the blockchain.

10. The apparatus of claim 8, wherein each of the plurality of coded data parts comprises an index corresponding to chronology of production of the coded data parts.

11. The apparatus of claim 8, wherein each of the plurality of coded data parts comprises an identifier that associates the each of the plurality of coded data parts with the data file.

12. The apparatus of claim 8, wherein at least one of the plurality of coded data parts comprises an initialization vector.

13. The apparatus of claim 8, further comprising instructions stored in the at least one computer-readable memory, the instructions executable by the at least one processor for: performing an all-or-nothing transform on a plurality of original data parts produced from the data file, or the plurality of coded data parts.

14. The apparatus of claim 8, further comprising instructions stored in the at least one computer-readable memory, the instructions executable by the at least one processor for: encrypting the data file, at least one of the plurality of coded data parts, or the data file and at least one of the plurality of coded data parts.

15. A computer program product, comprising: a non-transitory computer-readable memory having computer-readable program code stored thereon, the computer-readable program code containing instructions executable by at least one processor for:

performing linear network coding on the record or on a data file corresponding to the record, to produce a plurality of coded data parts;

communicating fewer than the plurality of coded data parts to each blockchain node, each file-sharing network node, or each Cloud storage network node; and storing the fewer than the plurality of coded data parts on the each blockchain node, the each file-sharing network node, or the each Cloud storage network node;

wherein each of the plurality of coded data parts is smaller than the record or the data file; and wherein the linear network coding derives linear network coding coefficients from a one-way function of at least one of the plurality of coded data parts.

16. The computer program product of claim 15, wherein storing comprises employing the fewer than the plurality of coded data parts to effect a state change on the blockchain.

17. The computer program product of claim 15, wherein each of the plurality of coded data parts comprises an index corresponding to chronology of production of the plurality of coded data parts.

18. The computer program product of claim 15, wherein each of the plurality of coded data parts comprises an identifier that associates the each coded data part with the data file.

19. The computer program product of claim 15, wherein at least one of the plurality of coded data parts comprises an initialization vector.

20. The computer program product of claim 15, wherein the computer-readable program code further comprises instructions executable by the at least one processor for: performing an all-or-nothing transform on at least one of a plurality of original data parts produced from the data file, or the plurality of coded data parts.

* * * * *